US008286863B1

(12) United States Patent
Brooks

(10) Patent No.: US 8,286,863 B1
(45) Date of Patent: Oct. 16, 2012

(54) SYSTEM AND COMPUTER PROGRAM PRODUCT TO ISSUE A RETAIL PREPAID CARD INCLUDING A USER-DESIGNED EXTERNAL FACE USING A CHIT AND RELATED COMPUTER IMPLEMENTED METHODS

(75) Inventor: Jason Brooks, Atlanta, GA (US)

(73) Assignee: Metabank, Sioux Falls, SD (US)

( * ) Notice: Subject to any disclaimer, the term of this patent is extended or adjusted under 35 U.S.C. 154(b) by 358 days.

(21) Appl. No.: 12/700,681

(22) Filed: Feb. 4, 2010

Related U.S. Application Data

(60) Provisional application No. 61/149,969, filed on Feb. 4, 2009.

(51) Int. Cl.
- G06K 19/00 (2006.01)
- G06K 19/06 (2006.01)
- G06K 5/00 (2006.01)
- G06Q 40/00 (2012.01)
- G06Q 30/00 (2012.01)
- G06Q 90/00 (2006.01)
- G07D 11/00 (2006.01)
- G07F 19/00 (2006.01)
- G06F 17/00 (2006.01)

(52) U.S. Cl. ........ 235/380; 235/487; 235/492; 235/493; 235/379; 705/14.17; 705/500

(58) Field of Classification Search .................. 235/380, 235/487, 492, 493, 379; 705/41, 43, 64, 705/65, 14.17, 500
See application file for complete search history.

(56) References Cited

U.S. PATENT DOCUMENTS

| | | | |
|---|---|---|---|
| 3,752,904 | A | 8/1973 | Waterbury |
| 4,247,759 | A | 1/1981 | Yuris et al. |
| 4,334,307 | A | 6/1982 | Bourgeois et al. |
| 4,439,636 | A | 3/1984 | Newkirk et al. |
| 4,449,040 | A | 5/1984 | Matsuoka et al. |

(Continued)

FOREIGN PATENT DOCUMENTS

EP 0348932 1/1990

(Continued)

OTHER PUBLICATIONS

Office action from co-pending U.S. Appl. No. 12/338,497 dated Aug. 18, 2011.

(Continued)

*Primary Examiner* — Daniel Walsh
(74) *Attorney, Agent, or Firm* — Bracewell & Giuliani, LLP

(57) ABSTRACT

Embodiments of systems, computer program product, and related computer implemented methods to issue a closed-loop retail prepaid card including a user-designed external face using a chit, the chit being defined by an identification mechanism representing a financial commitment to issue a closed-loop retail prepaid card in an amount associated with a value paid for the chit, are provided. Embodiments of the present invention advantageously provide a service that enables a consumer to purchase, at the storefront of a retail establishment, a chit card that the consumer can subsequently redeem through a graphical user interface of an Internet website for a closed-loop retail prepaid card with a user-designed external face. The user-designed closed-loop retail prepaid card, for example, can be subsequently printed and delivered to an intended recipient. Advantageously, such a service can be made available to any retail establishment that uses a point-of-sale system.

16 Claims, 14 Drawing Sheets

U.S. PATENT DOCUMENTS

| | | | |
|---|---|---|---|
| 4,528,643 A | 7/1985 | Freeny, Jr. |
| 4,532,416 A | 7/1985 | Berstein |
| 4,577,061 A | 3/1986 | Katzaff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |
| 4,722,054 A | 1/1988 | Yorozu et al. |
| 4,727,243 A | 2/1988 | Savar |
| 4,750,201 A | 6/1988 | Hodgson et al. |
| 4,797,540 A | 1/1989 | Kimizu |
| 4,827,113 A | 5/1989 | Rikuna |
| 4,868,900 A | 9/1989 | McGuire |
| 4,877,947 A | 10/1989 | Mori |
| 4,879,744 A | 11/1989 | Tasaki et al. |
| 4,884,212 A | 11/1989 | Stutsman |
| 4,951,308 A | 8/1990 | Bishop et al. |
| 4,968,873 A | 11/1990 | Dethloff et al. |
| 5,012,077 A | 4/1991 | Takano |
| 5,048,085 A | 9/1991 | Abraham et al. |
| 5,050,207 A | 9/1991 | Hitchcock |
| 5,068,891 A | 11/1991 | Marshall |
| 5,101,098 A | 3/1992 | Naito |
| 5,138,650 A | 8/1992 | Stahl et al. |
| 5,146,067 A | 9/1992 | Sloan et al. |
| 5,148,481 A | 9/1992 | Abraham et al. |
| 5,155,342 A | 10/1992 | Urano |
| 5,163,086 A | 11/1992 | Ahearn et al. |
| 5,192,947 A | 3/1993 | Neustein |
| 5,220,593 A | 6/1993 | Zicker et al. |
| 5,221,838 A | 6/1993 | Gutman et al. |
| 5,225,666 A | 7/1993 | Amarena et al. |
| 5,264,689 A | 11/1993 | Maes et al. |
| 5,265,155 A | 11/1993 | Castro |
| 5,266,782 A | 11/1993 | Alanärä et al. |
| 5,272,320 A | 12/1993 | Hakamada |
| 5,278,752 A | 1/1994 | Narita et al. |
| 5,285,382 A | 2/1994 | Muehlberger et al. |
| 5,327,482 A | 7/1994 | Yamamoto |
| 5,334,821 A | 8/1994 | Campo et al. |
| 5,340,969 A | 8/1994 | Cox |
| 5,352,876 A | 10/1994 | Watanabe et al. |
| 5,359,182 A | 10/1994 | Schilling |
| 5,409,092 A | 4/1995 | Itako et al. |
| 5,416,306 A | 5/1995 | Imahata |
| 5,438,186 A | 8/1995 | Nair et al. |
| 5,442,567 A | 8/1995 | Small |
| 5,448,044 A | 9/1995 | Price et al. |
| 5,477,038 A | 12/1995 | Levine et al. |
| 5,504,808 A | 4/1996 | Hamrick, Jr. |
| 5,511,114 A | 4/1996 | Stimson et al. |
| 5,513,117 A * | 4/1996 | Small ........................... 700/233 |
| 5,550,358 A | 8/1996 | Tait et al. |
| 5,577,109 A | 11/1996 | Stimson et al. |
| 5,577,112 A | 11/1996 | Cambray et al. |
| 5,661,254 A | 8/1997 | Steuer et al. |
| 5,696,908 A | 12/1997 | Muehlberger et al. |
| 5,699,528 A | 12/1997 | Hogan |
| 5,732,136 A | 3/1998 | Murphree et al. |
| 5,814,798 A | 9/1998 | Zancho |
| 5,841,365 A | 11/1998 | Rimkus |
| 5,859,419 A | 1/1999 | Wynn |
| 5,875,437 A | 2/1999 | Atkins |
| 5,878,141 A | 3/1999 | Daly et al. |
| 5,893,907 A | 4/1999 | Ukuda |
| 5,897,620 A | 4/1999 | Walker et al. |
| 5,920,848 A | 7/1999 | Schutzer et al. |
| 5,923,016 A | 7/1999 | Fredregill et al. |
| 5,933,812 A | 8/1999 | Meyer et al. |
| 5,963,921 A | 10/1999 | Longfield |
| 6,000,608 A | 12/1999 | Dorf |
| 6,012,635 A | 1/2000 | Shimada et al. |
| 6,021,397 A | 2/2000 | Jones et al. |
| 6,032,859 A | 3/2000 | Muehlberger et al. |
| 6,041,308 A | 3/2000 | Walker et al. |
| 6,065,679 A | 5/2000 | Levie et al. |
| 6,112,191 A | 8/2000 | Burke |
| 6,144,948 A | 11/2000 | Walker et al. |
| 6,154,738 A | 11/2000 | Call |
| 6,189,787 B1 | 2/2001 | Dorf |
| 6,208,978 B1 | 3/2001 | Walker et al. |
| 6,249,773 B1 | 6/2001 | Allard et al. |
| 6,253,998 B1 | 7/2001 | Ziamo |
| 6,304,860 B1 | 10/2001 | Martin et al. |
| 6,467,684 B2 | 10/2002 | Fite et al. |
| 6,704,714 B1 | 3/2004 | O'Leary et al. |
| 6,739,506 B1 | 5/2004 | Constantine |
| 6,865,544 B1 | 3/2005 | Austin |
| 6,999,943 B1 | 2/2006 | Johnson et al. |
| 7,010,507 B1 | 3/2006 | Anderson et al. |
| 7,031,939 B1 | 4/2006 | Gallagher et al. |
| 7,072,862 B1 | 7/2006 | Wilson |
| 7,127,452 B1 | 10/2006 | Yashiro |
| 7,177,829 B1 | 2/2007 | Wilson |
| 7,206,761 B2 | 4/2007 | Colvin |
| 7,252,223 B2 | 8/2007 | Schofield |
| 7,258,273 B2 | 8/2007 | Griffin |
| 7,370,076 B2 * | 5/2008 | Friedman et al. ............. 709/203 |
| 7,398,919 B2 | 7/2008 | Cooper |
| 7,426,492 B1 | 9/2008 | Bishop et al. |
| 7,451,920 B1 | 11/2008 | Rose |
| 7,509,286 B1 | 3/2009 | Bent et al. |
| 7,546,945 B1 | 6/2009 | Bucci et al. |
| 7,567,936 B1 | 7/2009 | Peckover et al. |
| 7,606,918 B2 | 10/2009 | Holzman et al. |
| 7,607,570 B1 | 10/2009 | Constantine |
| 7,628,319 B2 | 12/2009 | Brown et al. |
| 7,653,591 B1 | 1/2010 | Dabney |
| 7,702,583 B1 | 4/2010 | Hamilton et al. |
| 7,702,587 B2 * | 4/2010 | Nguyen et al. .................. 705/41 |
| 7,757,944 B2 | 7/2010 | Cline et al. |
| 7,783,571 B2 | 8/2010 | Fish et al. |
| 7,792,717 B1 | 9/2010 | Hankins et al. |
| 7,810,735 B2 | 10/2010 | Madani |
| 7,813,955 B2 | 10/2010 | Ariff et al. |
| 7,814,012 B2 | 10/2010 | Johnson |
| 7,865,434 B2 | 1/2011 | Sheets |
| 7,899,750 B1 | 3/2011 | Klieman et al. |
| 7,904,333 B1 | 3/2011 | Perkowski |
| 7,933,833 B2 | 4/2011 | Hotz et al. |
| 7,954,704 B1 | 6/2011 | Gephart et al. |
| 8,024,242 B2 | 9/2011 | Galit |
| 8,046,256 B2 | 10/2011 | Chien et al. |
| 8,051,006 B1 | 11/2011 | Rourk |
| 8,055,557 B2 | 11/2011 | Sorbe et al. |
| 8,065,187 B2 | 11/2011 | Ahlers et al. |
| 8,069,085 B2 | 11/2011 | Ahlers et al. |
| 8,086,494 B2 * | 12/2011 | Dooley et al. ................ 705/26.5 |
| 8,090,649 B2 | 1/2012 | Galit et al. |
| 8,103,549 B1 | 1/2012 | Ahlers et al. |
| 8,108,272 B2 | 1/2012 | Sorbe et al. |
| 8,108,279 B2 | 1/2012 | Galit et al. |
| 8,108,977 B1 | 2/2012 | Miller |
| 8,150,764 B2 | 4/2012 | Crowe et al. |
| 2001/0021925 A1 | 9/2001 | Ukigawa et al. |
| 2001/0034676 A1 | 10/2001 | Vasic |
| 2001/0042785 A1 | 11/2001 | Walker et al. |
| 2002/0002075 A1 | 1/2002 | Rowe |
| 2002/0032612 A1 | 3/2002 | Williams et al. |
| 2002/0038285 A1 | 3/2002 | Golden et al. |
| 2002/0042744 A1 * | 4/2002 | Kohl .............................. 705/14 |
| 2002/0055909 A1 | 5/2002 | Fung et al. |
| 2002/0077971 A1 | 6/2002 | Allred |
| 2002/0107797 A1 | 8/2002 | Combaluzier |
| 2002/0152161 A1 | 10/2002 | Aoike |
| 2002/0194122 A1 | 12/2002 | Knox et al. |
| 2002/0194124 A1 | 12/2002 | Hobbs et al. |
| 2003/0004997 A1 * | 1/2003 | Parker et al. .................. 707/513 |
| 2003/0055782 A1 | 3/2003 | Slater |
| 2003/0061170 A1 | 3/2003 | Uzo |
| 2003/0074311 A1 | 4/2003 | Saylors et al. |
| 2003/0097331 A1 | 5/2003 | Cohen |
| 2003/0135459 A1 | 7/2003 | Abelman et al. |
| 2003/0144935 A1 | 7/2003 | Sobek |
| 2003/0158811 A1 | 8/2003 | Sanders et al. |
| 2003/0167225 A1 | 9/2003 | Adams |
| 2003/0191702 A1 | 10/2003 | Hurley |

| | | |
|---|---|---|
| 2003/0191714 A1 | 10/2003 | Norris |
| 2003/0197059 A1 | 10/2003 | Tidball et al. |
| 2003/0200118 A1 | 10/2003 | Lee et al. |
| 2003/0208443 A1 | 11/2003 | Mersky |
| 2003/0217003 A1 | 11/2003 | Weinflash et al. |
| 2004/0036215 A1 | 2/2004 | Butler, II |
| 2004/0047459 A1* | 3/2004 | Diaz ................ 379/144.01 |
| 2004/0098351 A1 | 5/2004 | Duke |
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0153407 A1 | 8/2004 | Clubb et al. |
| 2004/0199463 A1 | 10/2004 | Deggendorf |
| 2004/0210484 A1* | 10/2004 | Lee ........................... 705/14 |
| 2004/0211830 A1 | 10/2004 | Algiene |
| 2004/0215554 A1 | 10/2004 | Kemper et al. |
| 2004/0225545 A1 | 11/2004 | Turner et al. |
| 2004/0230523 A1 | 11/2004 | Johnson |
| 2004/0235542 A1* | 11/2004 | Stronach et al. ............ 463/6 |
| 2004/0236646 A1 | 11/2004 | Wu et al. |
| 2005/0004839 A1 | 1/2005 | Bakker et al. |
| 2005/0015332 A1 | 1/2005 | Chen |
| 2005/0021363 A1 | 1/2005 | Stimson et al. |
| 2005/0075939 A1 | 4/2005 | Bao et al. |
| 2005/0082364 A1 | 4/2005 | Alvarez et al. |
| 2005/0108121 A1 | 5/2005 | Gravett et al. |
| 2005/0167481 A1 | 8/2005 | Hansen et al. |
| 2005/0167487 A1* | 8/2005 | Conlon et al. ............ 235/380 |
| 2005/0173520 A1 | 8/2005 | Jaros et al. |
| 2005/0177489 A1 | 8/2005 | Neff et al. |
| 2005/0203837 A1 | 9/2005 | Leigh et al. |
| 2005/0205663 A1 | 9/2005 | Algiene |
| 2005/0228724 A1 | 10/2005 | Frangiosa |
| 2005/0278188 A1* | 12/2005 | Thomson et al. ............ 705/1 |
| 2005/0278347 A1 | 12/2005 | Wolf et al. |
| 2005/0283436 A1 | 12/2005 | Greer et al. |
| 2006/0059085 A1 | 3/2006 | Tucker |
| 2006/0085269 A1* | 4/2006 | Guilfoyle ................ 705/17 |
| 2006/0085334 A1 | 4/2006 | Murphy |
| 2006/0149665 A1 | 7/2006 | Weksler |
| 2006/0149670 A1 | 7/2006 | Nguyen et al. |
| 2006/0161499 A1 | 7/2006 | Rich et al. |
| 2006/0190322 A1 | 8/2006 | Oehlerking et al. |
| 2006/0206402 A1 | 9/2006 | Sullivan |
| 2006/0212392 A1 | 9/2006 | Brown |
| 2006/0212393 A1 | 9/2006 | Brown |
| 2006/0224502 A1 | 10/2006 | McGowan |
| 2006/0249570 A1 | 11/2006 | Seifert et al. |
| 2006/0259957 A1 | 11/2006 | Tam et al. |
| 2006/0282356 A1 | 12/2006 | Andres et al. |
| 2006/0282374 A1 | 12/2006 | Stone |
| 2006/0293966 A1 | 12/2006 | Inouye |
| 2007/0000997 A1 | 1/2007 | Lambert et al. |
| 2007/0011089 A1 | 1/2007 | DeSchryver |
| 2007/0038515 A1 | 2/2007 | Postrel |
| 2007/0038924 A1* | 2/2007 | Beyer et al. ............ 715/507 |
| 2007/0045401 A1 | 3/2007 | Sturm |
| 2007/0061206 A1 | 3/2007 | LeFebvre |
| 2007/0083462 A1 | 4/2007 | Cubillo et al. |
| 2007/0087819 A1 | 4/2007 | Van Luchene et al. |
| 2007/0090183 A1 | 4/2007 | Hursta et al. |
| 2007/0100745 A1 | 5/2007 | Keiser |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175984 A1 | 8/2007 | Khandaker et al. |
| 2007/0198352 A1 | 8/2007 | Kannegiesser |
| 2007/0198354 A1 | 8/2007 | Senghore et al. |
| 2007/0198403 A1 | 8/2007 | Aloni et al. |
| 2007/0233596 A1 | 10/2007 | Ambrose |
| 2007/0244778 A1 | 10/2007 | Bailard |
| 2007/0250380 A1 | 10/2007 | Mankoff |
| 2007/0260536 A1 | 11/2007 | Stone |
| 2007/0262140 A1 | 11/2007 | Long, Sr. |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis |
| 2007/0276736 A1* | 11/2007 | Guilfoyle ................ 705/17 |
| 2007/0282740 A1 | 12/2007 | Wendt |
| 2008/0005001 A1 | 1/2008 | Davis et al. |
| 2008/0021772 A1 | 1/2008 | Aloni et al. |
| 2008/0040261 A1 | 2/2008 | Nix et al. |
| 2008/0040265 A1 | 2/2008 | Rackley et al. |
| 2008/0052189 A1 | 2/2008 | Walker et al. |
| 2008/0059363 A1 | 3/2008 | Hotz et al. |
| 2008/0065532 A1 | 3/2008 | De la Motte |
| 2008/0091519 A1 | 4/2008 | Foss |
| 2008/0103970 A1 | 5/2008 | Books |
| 2008/0120129 A1 | 5/2008 | Seubert et al. |
| 2008/0140561 A1 | 6/2008 | Neel |
| 2008/0140568 A1 | 6/2008 | Henry |
| 2008/0162271 A1* | 7/2008 | Benjamin ................ 705/10 |
| 2008/0210753 A1 | 9/2008 | Plozay et al. |
| 2008/0228643 A1 | 9/2008 | Hall |
| 2008/0235095 A1* | 9/2008 | Oles et al. ................ 705/14 |
| 2008/0270298 A1 | 10/2008 | McElroy et al. |
| 2008/0281734 A1 | 11/2008 | Longe et al. |
| 2008/0294977 A1* | 11/2008 | Friedman et al. ......... 715/224 |
| 2008/0301162 A1 | 12/2008 | Wall et al. |
| 2009/0048963 A1 | 2/2009 | Bishop et al. |
| 2009/0063297 A1* | 3/2009 | Dooley et al. ................ 705/26 |
| 2009/0063342 A1 | 3/2009 | Beckers |
| 2009/0063351 A1 | 3/2009 | Schmeyer et al. |
| 2009/0157220 A1 | 6/2009 | Walker et al. |
| 2009/0164362 A1 | 6/2009 | Moore |
| 2009/0164363 A1 | 6/2009 | Ahlers |
| 2009/0171775 A1* | 7/2009 | Cashion et al. ............ 705/14 |
| 2009/0192934 A1 | 7/2009 | Chu et al. |
| 2009/0222367 A1 | 9/2009 | Jenkins et al. |
| 2009/0228307 A1 | 9/2009 | Sorbe |
| 2009/0254431 A1 | 10/2009 | Crowe et al. |
| 2010/0030687 A1 | 2/2010 | Panthaki et al. |
| 2010/0057554 A1 | 3/2010 | Lanford |
| 2010/0057609 A1 | 3/2010 | Sibson |
| 2010/0076875 A1 | 3/2010 | Ernst et al. |
| 2010/0106555 A1 | 4/2010 | Mneimneh et al. |
| 2010/0222132 A1 | 9/2010 | Sanford et al. |
| 2010/0280949 A1 | 11/2010 | Van Rensburg |
| 2010/0306104 A1 | 12/2010 | Johnson |
| 2010/0312684 A1 | 12/2010 | Kemper et al. |
| 2011/0047039 A1* | 2/2011 | Crames et al. ................ 705/18 |
| 2011/0106698 A1* | 5/2011 | Isaacson et al. ............ 705/41 |
| 2011/0270664 A1* | 11/2011 | Jones ........................ 705/14.33 |

FOREIGN PATENT DOCUMENTS

| | | |
|---|---|---|
| EP | 0397512 | 11/1990 |
| EP | 0397512 A2 | 11/1990 |
| EP | 0619565 | 10/1994 |
| EP | 0619565 A1 | 10/1994 |
| EP | 0348932 A2 | 5/1995 |
| JP | 2-238593 | 9/1990 |
| JP | 2-238593 A | 9/1990 |
| JP | 2-278495 | 11/1990 |
| JP | 2-278495 A | 11/1990 |
| JP | 3-100791 | 4/1991 |
| JP | 3-100791 A | 4/1991 |
| JP | 4-165588 | 6/1992 |
| JP | 4-165588 A | 6/1992 |
| KR | 2010010217 | 2/2010 |
| WO | WO 86/02757 A1 | 5/1986 |
| WO | WO8602757 | 5/1986 |
| WO | WO 86/07647 A1 | 12/1986 |
| WO | WO8607647 | 12/1986 |
| WO | WO 88/03297 A1 | 5/1988 |
| WO | WO8603297 | 5/1988 |
| WO | WO 89/08899 A1 | 9/1989 |
| WO | WO8908899 | 9/1989 |
| WO | WO 91/09370 A1 | 6/1991 |
| WO | WO9109370 | 6/1991 |
| WO | WO 93/09515 A1 | 5/1993 |
| WO | WO9309515 | 5/1993 |
| WO | WO 94/10649 A1 | 5/1994 |

| | | |
|---|---|---|
| WO | WO9410649 | 5/1994 |
| WO | WO 94/28498 A1 | 12/1994 |
| WO | WO9428498 | 12/1994 |
| WO | WO 95/03570 A2 | 2/1995 |
| WO | WO9503570 | 2/1995 |
| WO | WO 97/46986 A1 | 12/1997 |
| WO | WO9746986 | 12/1997 |
| WO | WO0060487 | 10/2000 |
| WO | WO2007133315 | 11/2007 |
| WO | 2008102329 A2 | 8/2008 |
| ZA | 200709282 | 10/2007 |

OTHER PUBLICATIONS

Notice of Allowance of co-pending U.S. Appl. No. 12/417,199 dated Aug. 18, 2011.
Notice of Allowance of co-pending U.S. Appl. No. 12/417,211 dated Aug. 22, 2011.
Wolfe, Daniel, "An E-Variation on Payday Loan Theme", American Banker, Jul. 28, 2005.
"Letter of Credit Explained: What is Letter of Credit?", Dec. 26, 2005, pp. 1-2 (Office Action from co-pending U.S. Appl. No. 12/338,540 dated Sep. 1, 2011).
Office Action from U.S. Appl. No. 12/338,540 dated Sep. 1, 2011.
Notice of Allowance of U.S. Appl. No. 12/338,365 dated Sep. 1, 2011.
Office Action dated Jul. 9, 2010 for U.S. Appl. No. 12/338,365.
Office Action dated Jul. 9, 2010 for U.S. Appl. No. 12/338,645.
Congressional Budget Office, "Emerging Electronic Methods for Making Payments" (Jun. 1996), CBO.
Coady et al., "Targeted anti-poverty intervention: A selected annotated bibliography" (Apr. 2002), World Bank.
Notice of Allowance from co-pending U.S. Appl. No. 12/609,896 dated Jan. 3, 2012.
Notice of Allowance from co-pending U.S. Appl. No. 13/233,268 dated Dec. 13, 2011.
Office Action from co-pending U.S. Appl. No. 12/367,187 dated Jan. 6, 2012.
Office Action from co-pending U.S. Appl. No. 12/731,852 dated Dec. 22, 2011.
Business Dateline, Q Comm Expands Calling Card Products with Best Telecom Point-of-Sale Activated Cards; All Q Comm VeriFone Merchants Can Now Deliver Durable Calling Cards (Dec. 6, 2010), Business Wire (Dec. 8, 2011).
Notice of Allowance from co-pending U.S. Appl. No. 12/465,803 dated Dec. 20, 2011.
MasterCard Electronic prepaid (Oct. 2003). The Nilson Report, (798), (Dec. 9, 2011), The Banking Source (Document ID 474833171).
Co-pending U.S. Appl. No. 12/562,331, filed Sep. 18, 2009, titled Computerized Extension of Credit to Existing Demand Deposit Accounts, Prepaid Cards and Lines of Credit Based on Expected Tax Refund Proceeds, Associated Systems and Computer Program Products.
VeriFone TCL Terminal Control Language Programmer's Manual, VeriFone Part No. 00368-01, Revision G. Manual Revision 8.0, Aug. 1992, 362 pages.
VeriFone Tranz 330 Reference Manual, Verifone Part No. 00483- Revision D, Manual Revision 3.01, Apr. 1990, 144 pages.
MicroTrax Ltd. Omni 490M (and 490ML) Operation Manual for Integrated and Non-Integrated Configurations, 1994, 60 pages.
MicroTrax Electronic Payment Systems: The MicroTrax Pinstripe Lane Equipment Users Guide, MicroTrax Ltd., Newport Beach, CA 1991, 54 pages.
IBM 4680-4690 Supermarket Application—Electronic Funds Transfer Feature Enhancement: User's Guide, IBM Corp., Research Triangle Park, NC, Sep. 1995, 318 pages.
IBM 4680 General Sales Application Electronic Funds Transfer User's Guide, IBM Corp., Research Triangle Park, NC, Dec. 1990, 260 pages.
IBM 4680 General Sales Application Electronic Funds Transfer User's Guide, IBM Corp., Research Triangle Park, NC, Mar. 1991, 263 pages.
IBM 4680 General Sales Application: Guide to Operations, Research Triangle Park, NC, Jun. 1991, 429 pages.
Office Action from co-pending U.S. Appl. No. 12/626,349, dated Nov. 22, 2011.
International Search Report from co-pending PCT Application No. PCT/US09/056072 dated Oct. 20, 2009.
Office Action dated Mar. 4, 2011, in co-pending U.S. Appl. No. 12/338,684.
Office Action dated Mar. 17, 2011, in co-pending U.S. Appl. No. 12/417,199.
Office Action dated Mar. 17, 2011, in co-pending U.S. Appl. No. 12/465,803.
Office Action dated Mar. 22, 2011, in co-pending U.S. Appl. No. 12/338,584.
Office Action dated Mar. 29, 2011, in co-pending U.S. Appl. No. 12/417,211.
Office Action dated Mar. 29, 2011, in co-pending U.S. Appl. No. 12/407,320.
Orszag, Peter, "Unemployment Insurance as an Economic Stimulus", Center for Budget and Policy Priorities, Nov. 15, 2011.
Powell, Robert L., "Statewide Electronic Commerce Program Status Report", State of North Carolina Office of the State Controller, Mar. 7, 2007.
Parrott, James, "Jittery Wall Street, Calm City?", Gotham Gazette, Apr. 16, 2007.
Zandi, Mark, "Washington Throws the Economy a Rope", Moody's Economy.com, Jan. 22, 2008.
Blair, Christine E., et al., "Challenges to the Dual Banking System: The Funding of Bank Supervision", FDIC Bank Review, Mar. 31, 2006.
Office Action for co-pending U.S. Appl. No. 12/367,187 dated Jun. 27, 2011.
"Developing Asia and the World", Asian Development Bank 2002.
Notice of Allowance in co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Financial Advice Investment Money Oct. 1, 2009 at 5:50pm, HSBC Offshore Internet Banking.
Financial Advice Investment Money Oct. 1, 2009 at 7:25am, HSBC Offshore Internet Banking.
Final Office Action in co-pending U.S. Appl. No. 12/338,584 dated Sep. 15, 2011.
Final Office Action in co-pending U.S. Appl. No. 12/338,684 dated Sep. 23, 2011.
Lazarus, David, "120% rate for Wells' Advances", Oct. 16, 2004, San Francisco Chronicle.
Office Action in co-pending U.S. Appl. No. 12/397,113 dated Sep. 30, 2011.
Notice of Allowance in U.S. Appl. No. 12/338,645 dated Oct. 3, 2011.
Office Action in co-pending U.S. Appl. No. 12/417,182 dated Sep. 28, 2011.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Office Action dated Sep. 28, 2010 for co-pending U.S. Appl. No. 12/338,402, filed Dec. 18, 2008
Office Action dated Sep. 3, 2010 for co-pending U.S. Appl. No. 12/417,162, filed Apr. 2, 2009.
Office Action in co-pending U.S. Appl. No. 12/417,162 dated Apr. 13, 2011.
Office Action in co-pending U.S. Appl. No. 12/609,896 dated Apr. 5, 2011.

Final Office Action dated Jan. 26, 2011, in co-pending U.S. Appl. No. 12/338,365.
Final Office Action dated Jan. 26, 2011, in co-pending U.S. Appl. No. 12/338,645.
Final Office Action dated Jan. 19, 2011, in co-pending U.S. Appl. No. 12/417,162.
Office Action dated Feb. 1, 2011, in co-pending U.S. Appl. No. 12/389,749.
Co-pending U.S. Appl. No. 12/814,405, filed Jun. 11, 2010 titled Environmental-Friendly Fuel Credit Card System, Program Product, and Computer-Implemented Methods.
Co-pending U.S. Appl. No. 12/877,490, filed Sep. 8, 2010 titled System, Program Product, and Method for Debit Card and Checking Account Autodraw.
Co-pending U.S. Appl. No. 12/877,524, filed Sep. 8, 2010 titled System, Program Product, and Method for Debit Card and Checking Account Autodraw.
Co-pending U.S. Appl. No. 12/562,331, filed Sep. 18, 2009 titled Computerized Extension of Credit to Existing Demand Deposit Accounts, Prepaid Cards and Lines of Credit Based on Expected Tax Refund Proceeds, Associated Systems and Computer Program Products.
Krino, Gary, et al., A Birthday Card That Pays Off, The Orange County Register, Jul. 19, 1996, 2 pages.
Cohen, Bruce, Alternative to Cash Gains Ground, The Financial Post, Apr. 22, 1994, 2 pages.
Bank of Boulder POS Debit Solution at the Table Now in Beta: First Bank to Certify IVI Spirit C2000 on MAPP (R), Business Wire, Aug. 3, 1994, 1 page.
Co-pending U.S. Appl. No. 12/700,681, filed Feb. 4, 2010.
Co-pending U.S. Appl. No. 12/889,281, filed Sep. 23, 2010.
Co-pending U.S. Appl. No. 12/892,847, filed Sep. 28, 2010.
Co-Pending U.S. Appl. No. 12/731,852, filed Mar. 25, 2010
MicroTrax Ltd., PC Electronic Payment Systems Reference Manuel, 1995 (381 pages).
John P. Caskey and Gordon H. Selton, Jr., Is the Debit Card Revolution Finally Here?, Federal Reserve Bank of Kansas City, Economic Review, Fourth Quarter 1994, pp. 70-95, vol. 79 #4 (17 pages).
Laura Castaneda, Business Promote Services to Customers Day in and Day Out, The Dallas Morning News, Nov. 26, 1994, 3 pages.
Margaret Mannix, Checkout Tech, U.S. News & World Report, Feb. 27, 1995, 6 pages.
Credit Terminals to be Used at Canadian Liquor Outlets, Card News, Jan. 23, 1995, 1 page.
Debit Card Popularity on the Rise, Chain Store Age Executive, Jan. 1994, 1 page.
Debit Goes to Dinner, Credit Card Management, New York, Oct. 1994, 2 pages.
Alan Peppard, Down and Dirty in Deep Ellum, The Dallas Morning News, Dec. 3, 1994, 2 pages.
Everest Reference Manual, VeriFone Part No. 25399, Revision A, Manual Revision 1.0, Jul. 1995, 66 pages.
Express Cards and Trains, Chain Store Age Executive Edition, Jan. 1995, 1 page.
Suzanne Brown, Goodnight Amy, Meg, Beth and Jo, Rocky Mountain News, Dec. 8, 2994, 1 page.
Robert J. Klein, Here Comes the Debit Card, D&B Reports, Jul./Aug. 1990, 2 pages.
Hypercom S7C Advertisement, Chain Store Age, Sep. 1995, 4 pages.
Hypercom S7SC Advertisement, Chain Store Age, Feb. 1996, 2 pages.
IBM 4680-4690 Advanced Payment System for Chain Drug Sales Application User's Guide, Nov. 1996, 256 pages.
IBM 4680-4690 Advanced Payment System for Chain Drug Sales Application User's Guide, Jul. 1996, 248 pages.
IBM 4680-4690 Advanced Payment System for Supermarket Application User's Guide, Sep. 1996, 222 pages.
Fox, Linda A., Keep an Eye on Your Credit Card, The Toronto Sun, Aug. 9, 1996, 1 page.
Pyatt, Rudolph A., Jr., Mobil Stations to Permit Use of Bank Cards, The Washington Post.
NCR 4430-5000 MSR/PIN User's Guide, 1994, 265 pages.
Nieman Marcus: High-Tech for the Holidays, ADWEEK, Dec. 5, 1994, 1 page.
Neiman Marcus Offers Electronic Gift Certificate, Card Fax, Jan. 23, 1995, 1 page.
Neiman Marcus to Lauch NM Express Automated Gift Card, PR Newswire, Nov. 22, 1994, 1 page.
NM Express Card Advertisement, The New Yorker, Dec. 12, 1994, 3 pages.
Service Mark Registration No. 1,981,044 for "NM Express Card", registered Jun. 18, 1996, 1 page.
Omni 480/490 Programmer's Guide, VeriFone Part No. 12924—Revision A, Manual Revision 1.0, Oct. 1993, 228 pages.
One Company's Diversification Shakes Up Peripherals Market, Chain Store Age, Jun. 1996, 3 pages.
O'Keefe, Michael, Portable POS Debit Terminal Mean Greater Convenience, Bank Systems & Technology, Nov. 1994, 2 pages.
POS Terminal Can Handle Direct Debits, ABA Banking Journal, Sep. 1984, 2 pages.
Racal Corp. Advertisement, POS Terminal Eliminates Credit Card Vouchers, ABA Banking Journal, Nov. 1985, 2 pages.
Szabo, Joan C., The Changing World of Financial Services, Nation's Business, Oct. 1994, 7 pages.
VeriFone Everest Advertisement, Stores, May 1995, 2 pages.
VeriFone Folio (TM) Brings Credit and Debit Card Payment to the Restaurant Table, PR Newswire, May 16, 1994, 3 pages.
David B. Barnes, VeriFone Introduces Everest (TM) Customer Activated Payment System to Multi-Lane Retail Market, PR Newswire, Feb. 20, 1995, 2 pages.
VeriFone Introduces Pinpad (TM) 1000 to Point-of-Sale Debit Market, M2 Presswire, Apr. 21, 1995, 1 page.
Co-pending U.S. Appl. No. 13/036,076, filed Feb. 28, 2011, titled Machine, Program Product, and Computer Implemented Method to Construct a Person-To-Person Loan.
Office Action dated Feb. 18, 2011, in co-pending U.S. Appl. No. 12/338,402.
Office Action for co-pending U.S. Appl. No. 12/607,780 dated Mar. 19, 2012.
Notice of Allowance for co-pending U.S. Appl. No. 12/465,803 dated Mar. 20, 2012.
Notice of Allowance for co-pending U.S. Appl. No. 12/562,331 dated Mar. 20, 2012.
Final Office Action for co-pending U.S. Appl. No. 12/338,540 dated Mar. 15, 2012.
Final Office Action for co-pending U.S. Appl. No. 12/389,749 dated Mar. 29, 2012.
Final Office Action for co-pending U.S. Appl. No. 12/731,852 dated Apr. 5, 2012.
Final Office Action for co-pending U.S. Appl. No. 12/465,306 dated Apr. 11, 2012.
Notice of Allowance for co-pending U.S. Appl. No. 13/349,423 dated Apr. 13, 2012.
Office Action for co-pending U.S. Appl. No. 12/877,490 dated Apr. 18, 2012.
Office Action for co-pending U.S. Appl. No. 12/892,847 dated Apr. 30, 2012.
Final Office Action for co-pending U.S. Appl. No. 12/338,440 dated Jan. 19, 2012.
Office Action for co-pending U.S. Appl. No. 12/465,306 dated Nov. 10, 2011.
Downes, How to avoid exchange charges Wasting Money A foreign currency bank account could be the answer, The Daily Telegraph, London (UK), Mar. 10, 2007.
Office Action for co-pending U.S. Appl. No. 13/232,405 dated Feb. 2, 2012.
Final Office Action for co-pending U.S. Appl. No. 12/465,277 dated Feb. 28, 2012.
Notice of Allowance for co-pending U.S. Appl. No. 12/417,182 dated Feb. 14, 2012.
Final Office Action for co-pending U.S. Appl. No. 12/338,497 dated Mar. 1, 2012.
Office Action for co-pending U.S. Appl. No. 12/877,524 dated Feb. 14, 2012.

Jane Boon Pearlstine, Lenders, Borrowers Hook Up Over The Web: Prosper.com and Other Sites Provide Forum for Individual Bidders Willing to Offer Small Loans, Wall Street Journal, May 20, 2006.

United Nations Conference on Trade and Development, E-Finance and Small and Medium-Size Enterprises (SMEs) in Developing and Transition Economies, UNCTAD Expert Meeting, Oct. 17, 2001.

Tim Jones, Paradigms lost, RSA Journal, Oct. 2006, pp. 28-31.

Diego Rumiany, Internet Bidding for Microcredit: making it work in the developed world, conceiving it for the developing world, Mar. 2007.

Stefan Heng, Thomas Meyer, and Antje Stobbe, Implications of Web 2.0 for financial institutions: Be a driver, not a passenger, Munich Personal RePEc Archive, Jul. 31, 2007.

Matt Flannery, Kiva and the Birth of Person to Person Microfinance, Innovations, pp. 31-56, Winter & Spring 2007.

Michael K. Hulme and Colette Wright, Internet Based Social Lending: Past, Present and Future, Social Futures Observatory, Oct. 2006.

Richard W. Coleman, Is the Future of the Microfinance Movement to be Found on the Internet?, International Trade and Finance Association Working Papers 2007.

Amanda Scott and Patrick Towell, The Web We Weave, Financial World, pp. 12-15, Nov. 2006.

Prosper, Access and Transparency Through Person-to-Person Lending, FDIC Advisory Committee on Economic Inclusion, Mar. 28, 2007.

Sam Y. Cross, All About . . . The Foreign Exchange Market in the United States, 1998, Federal Reserve Bank of New York.

Foreign Exchange Market, http://en.wikipedia.org.

Bank Deals-Best Rates and Deals: EverBank's World Currency CDs—My Interview with EverBank's Executive Frank Trotter, http://bankdeals.blogspot.com, Jul. 29, 2007.

VIP Gift Receives Investment From Summit Partners and Bridgescale Parnters, Nov. 11, 2008, Chattanooga, TN and Palo Alto, CA.

Avoid Gift Card Pitfalls, ConsumerReports.org.

Co-pending U.S. Appl. No. 12/338,402, filed Dec. 18, 2008, titled "Transfer Account Systems, Computer Program Products, and Associated Computer-Implemented Methods".

Co-pending U.S. Appl. No. 12/338,440, filed Dec. 18, 2008, titled "Transfer Account Systems, Computer Program Products, and Associated Computer-Implemented Methods".

Co-pending U.S. Appl. No. 12/338,497, filed Dec. 18, 2008, titled "Private Label Promotion Card System, Program Product, and Associated Computer-Implemented Methods".

Co-pending U.S. Appl. No. 12/338,540, filed Dec. 18, 2008, titled "Private Label Promotion Card System, Program Product, and Associated Computer-Implemented Methods".

Co-pending U.S. Appl. No. 12/338,584, filed Dec. 18, 2008, titled "Transfer Account Systems, Computer Program Products, and Methods to Prioritize Payments From Preselected Bank Accounts".

Co-pending U.S. Appl. No. 12/338,645, filed Dec. 18, 2008, titled "Transfer Account Systems, Computer Program Products, and Methods to Prioritize Payments From Preselected Bank Accounts".

Co-pending U.S. Appl. No. 12/338,684, filed Dec. 18, 2008, titled "Transfer Account Systems, Computer Program Products, and Associated Methods".

Co-pending U.S. Appl. No. 12/338,712, filed Dec. 18, 2008, titled "Computer-Implemented Methods, Program Product, and System to Enhance Banking Terms Over Time".

Co-pending U.S. Appl. No. 12/338,365, filed Dec. 18, 2008, titled "Transfer Account Systems, Computer Program Products, and Associated Computer-Implemented Methods".

Co-pending U.S. Appl. No. 12/397,113, filed Mar. 3, 2009, titled "Person-to-Person Lending Program Product, System, and Associated Computer-Implemented Methods".

Co-pending U.S. Appl. No. 12/389,749, filed Feb. 20, 2009, titled "Methods to Advance Loan Proceeds on Prepaid Cards, Associated Systems and Computer Program Products".

Co-pending U.S. Appl. No. 12/417,199, filed Apr. 2, 2009, titled "System, Program Product, and Associated Methods to Autodraw for Micro-Credit Attached to a Prepaid Card".

Co-pending U.S. Appl. No. 12/417,211, filed Apr. 2, 2009, titled "System, Program Product, and Associated Methods to Autodraw for Micro-Credit Attached to a Prepaid Card".

Co-pending U.S. Appl. No. 12/417,182, filed Apr. 2, 2009, titled "System, Program Product, and Methods to Authorize Draw for Retailer Optimization".

Co-pending U.S. Appl. No. 12/407,320, filed Mar. 19, 2009, titled "Computerized Extension of Credit to Existing Demand Deposit Accounts, Prepaid Cards and Lines of Credit Based on Expected Tax Refund Proceeds, Associated Systems and Computer Program Products".

Co-pending U.S. Appl. No. 12/417,162, filed Apr. 2, 2009, titled "System, Program Product, and Method for Debit Card and Checking Account Autodraw".

Co-pending U.S. Appl. No. 12/367,187, filed Feb. 6, 2009, titled "Government Targeted-Spending Stimulus Card System, Program Product and Computer-Implemented Methods".

Co-pending U.S. Appl. No. 12/465,277, filed May 13, 2009, titled "System, Program Product, and Computer-Implemented Method for Loading a Loan on a Pre-Paid Card".

Co-pending U.S. Appl. No. 12/465,306, filed May 13, 2009, titled "System, Program Product, and Computer-Implemented Method for Loading a Loan on an Existing Pre-Paid Card".

Co-pending U.S. Appl. No. 12/465,803, filed May 14, 2009, titled "System, Program Product, and Method for Loading a Loan on a Pre-Paid Card".

Co-pending U.S. Appl. No. 12/553,659, filed Sep. 4, 2009, titled "System, Method, and Program Product for Foreign Currency Travel Account".

Co-pending U.S. Appl. No. 12/562,331, filed Sep. 18, 2009, titled "Computerized Extension of Credit to Existing Demand Deposit Accounts, Prepaid Cards and Lines of Credit Based on Expected Tax Refund Proceeds, Associated Systems and Computer Program Products".

Co-pending U.S. Appl. No. 12/554,432, filed Sep. 4, 2009, titled "System, Method, and Program Product for Retail Activation and Reload Associated with Partial Authorization Transaction".

Co-pending U.S. Appl. No. 12/607,780, filed Oct. 28, 2009, titled "Shopping Center Gift Card Offer Fulfillment Machine, Program Product, and Associated Methods".

Co-pending U.S. Appl. No. 12/609,896, filed Oct. 30, 2009, titled "Machine Methods, and Program Product for Electronic Order Entry".

Co-pending U.S. Appl. No. 12/626,349, filed Nov. 25, 2009, titled "Machine, Methods, and Program Product for Electronic Inventory Tracking".

Co-pending U.S. Appl. No. 12/731,852, filed Mar. 25, 2010, titled "Machine, Program Product, and Computer-Implemented Methods for Confirming a Mobile Banking Request".

International Search Report from co-pending PCT Application No. PCT/US09/034692 dated Apr. 14, 2009.

International Search Report from co-pending PCT Application No. PCT/US09/039495 dated May 18, 2009.

International Search Report from co-pending PCT Application No. PCT/US08/087689 dated Jun. 17, 2009.

International Search Report from co-pending PCT Application No. PCT/US09/039492 dated May 14, 2009.

International Search Report from co-pending PCT Application No. PCT/US09/043988 dated Jul. 14, 2009.

International Search Report from co-pending PCT Application No. PCT/US09/039512 dated Jun. 8, 2009.

International Search Report from co-pending PCT Application No. PCT/US09/039504 dated May 27, 2009.

International Search Report from co-pending PCT Application No. PCT/US09/043978 dated Jun. 30, 2009.

* cited by examiner

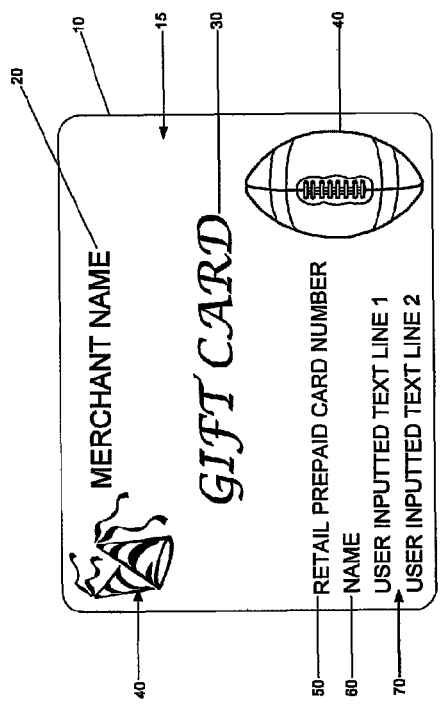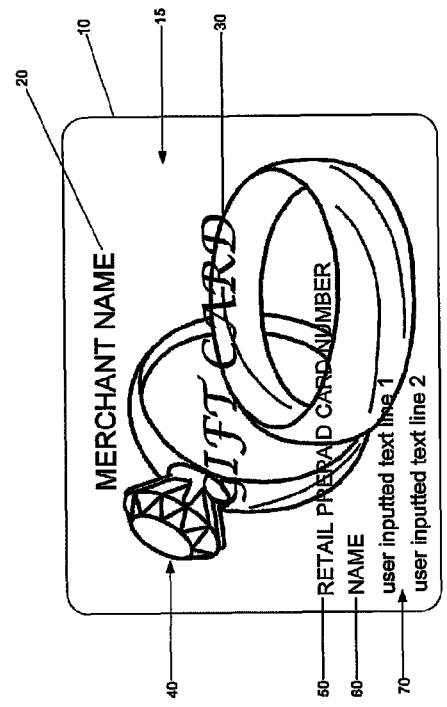

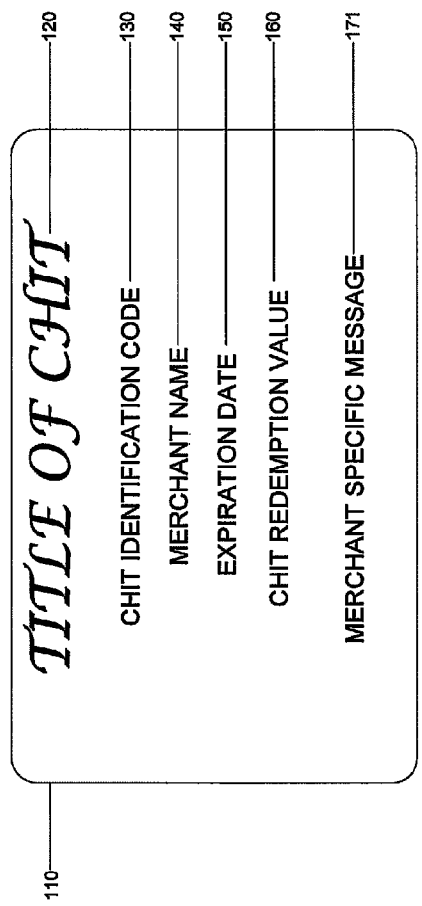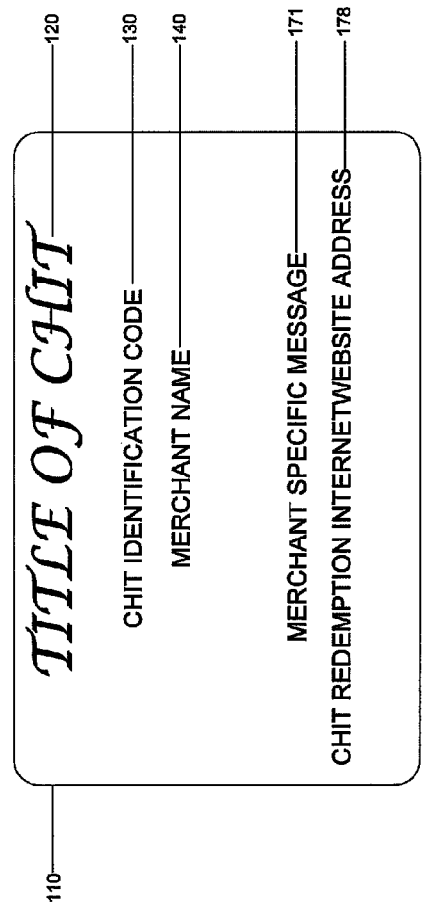

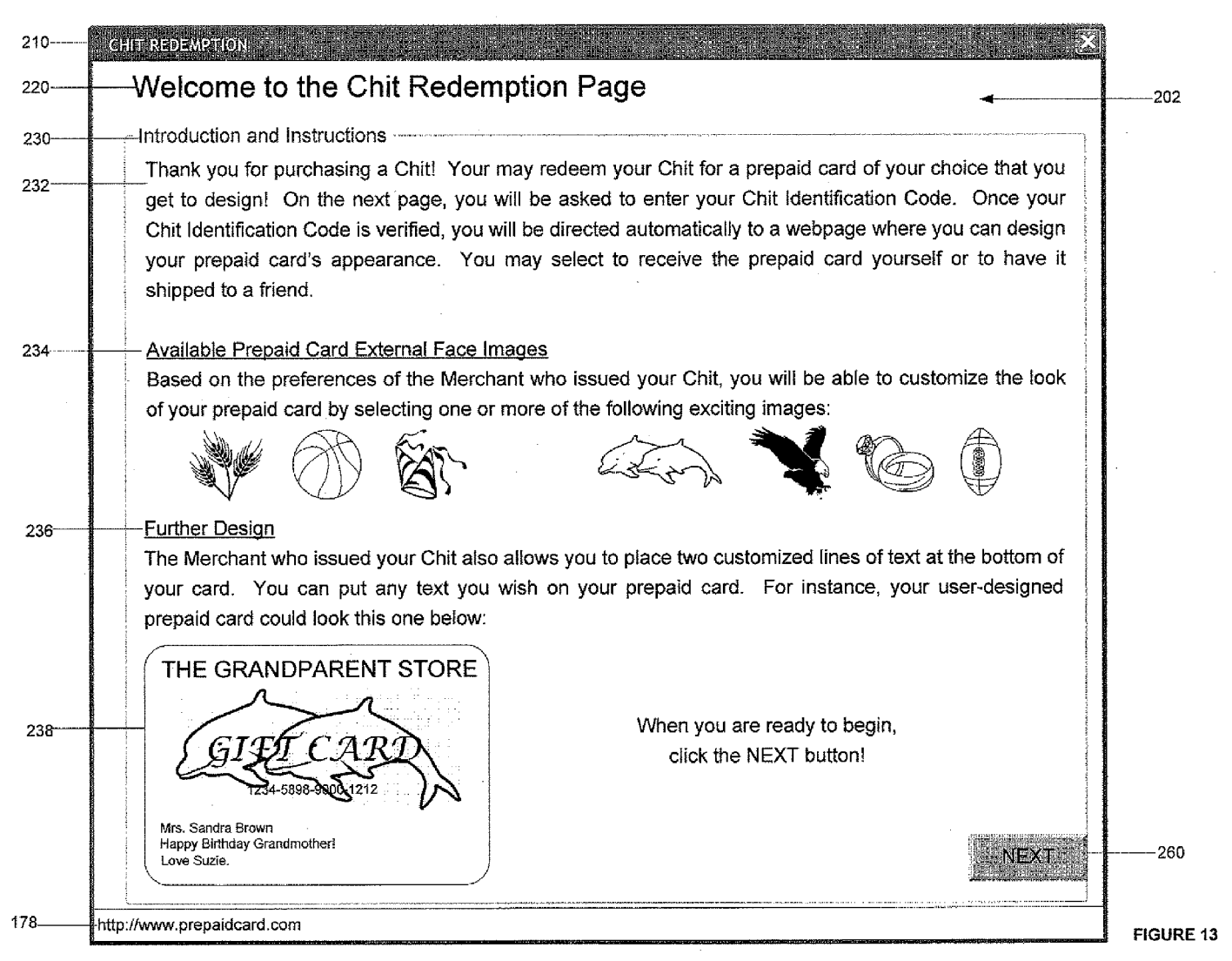

CHIT REDEMPTION

Welcome to the Chit Redemption Page

Introduction and Instructions

Thank you for purchasing a Chit! Your may redeem your Chit for a prepaid card of your choice that you get to design! On the next page, you will be asked to enter your Chit Identification Code. Once your Chit Identification Code is verified, you will be directed automatically to a webpage where you can design your prepaid card's appearance. You may select to receive the prepaid card yourself or to have it shipped to a friend.

Available Prepaid Card External Face Images

Based on the preferences of the Merchant who issued your Chit, you will be able to customize the look of your prepaid card by selecting one or more of the following exciting images:

Further Design

The Merchant who issued your Chit also allows you to place two customized lines of text at the bottom of your card. You can put any text you wish on your prepaid card. For instance, your user-designed prepaid card could look this one below:

THE GRANDPARENT STORE
GIFT CARD
1234-5898-9800-1212

Mrs. Sandra Brown
Happy Birthday Grandmother!
Love Suzie.

When you are ready to begin, click the NEXT button!

NEXT http://www.prepaidcard.com

FIGURE 13

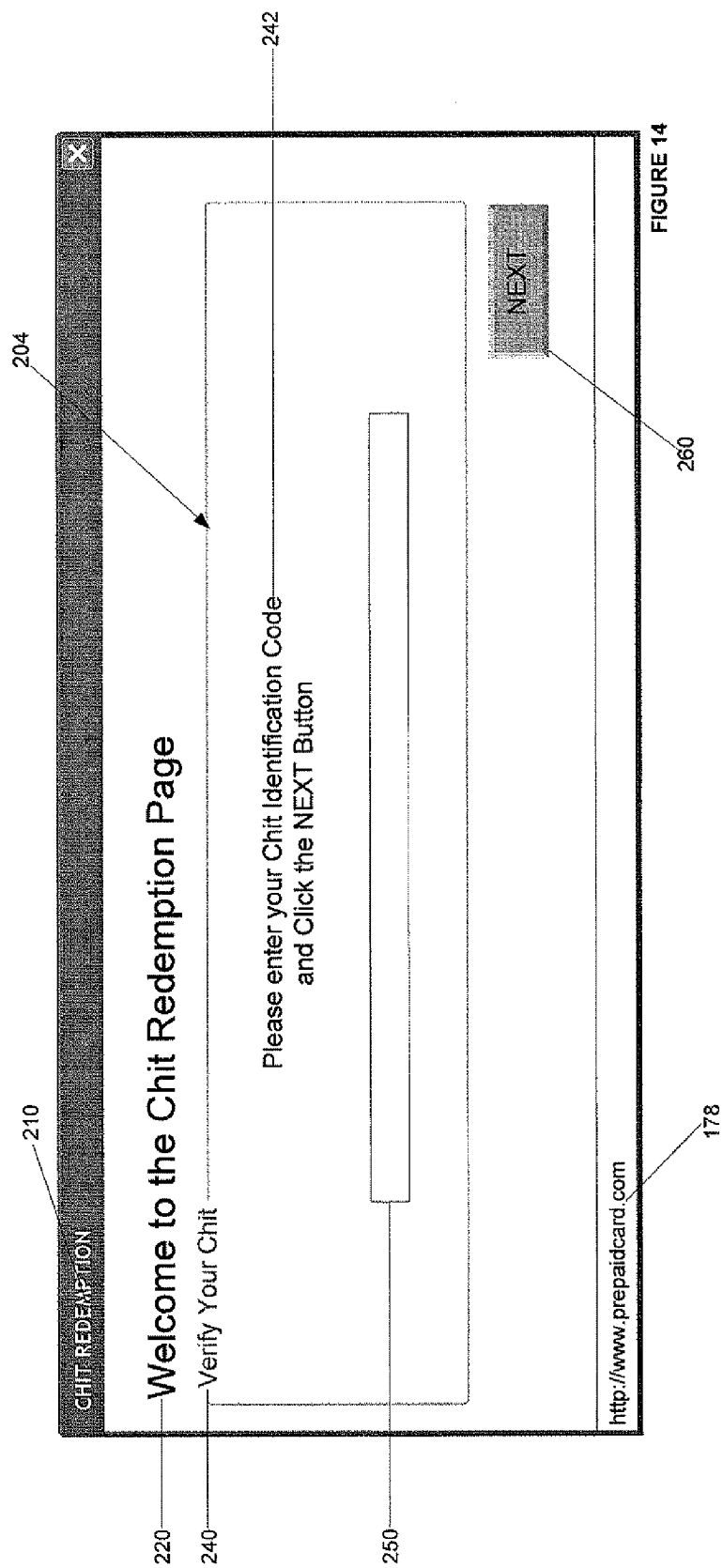

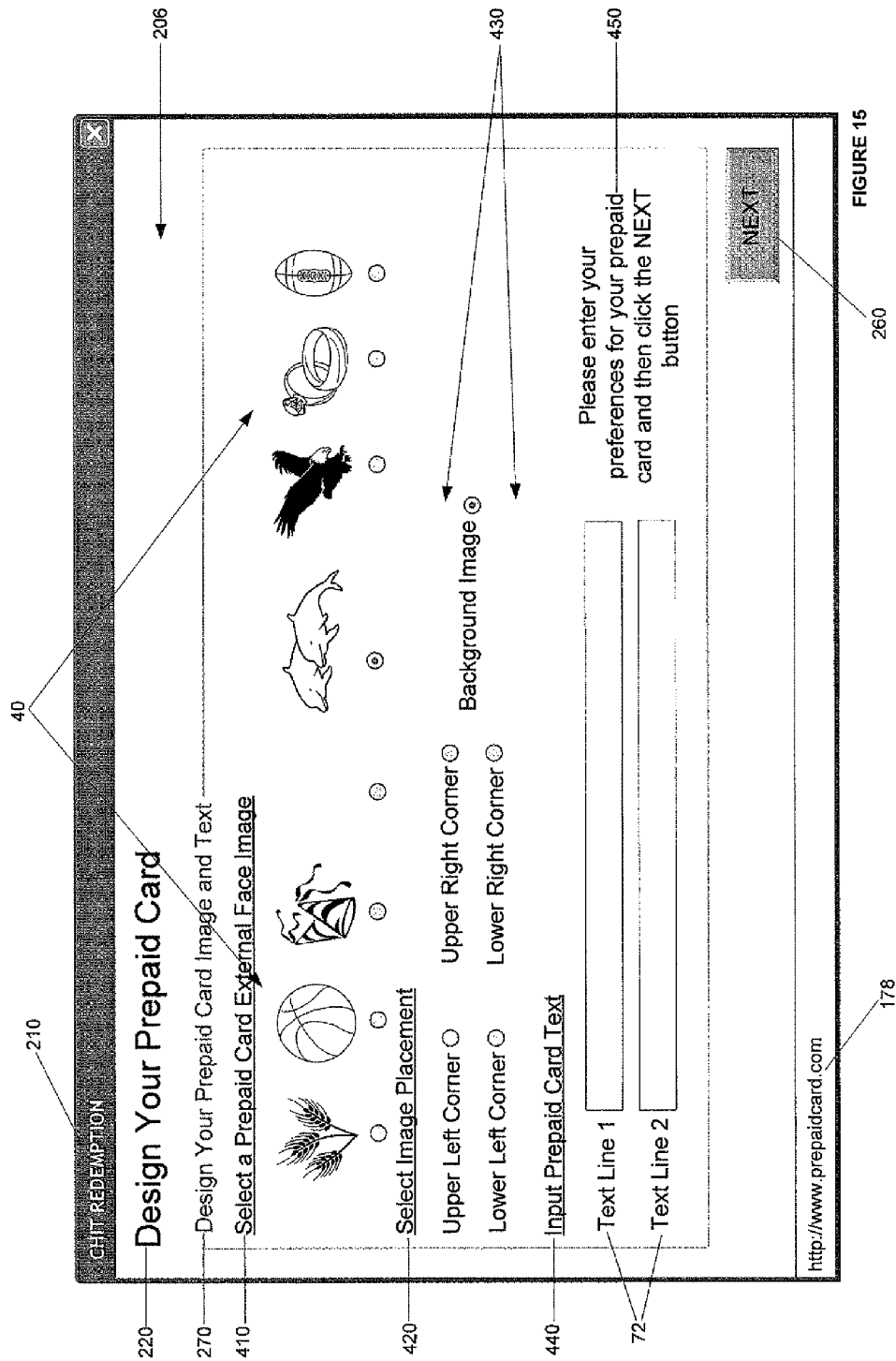

SYSTEM AND COMPUTER PROGRAM PRODUCT TO ISSUE A RETAIL PREPAID CARD INCLUDING A USER-DESIGNED EXTERNAL FACE USING A CHIT AND RELATED COMPUTER IMPLEMENTED METHODS

This application claims priority to U.S. Provisional Patent Application No. 61/149,969 entitled "System and Computer Program Product To Issue A Retail Prepaid Card Including A User-Designed External Face Using A Chit And Related Computer Implemented Methods" filed on Feb. 4, 2009, U.S. Non-Provisional patent application Ser. No. 12/609,896, filed Oct. 30, 2009, titled "Machine, Methods, And Program Product For Electronic Order Entry," and U.S. Non-Provisional patent application Ser. No. 12/554,432, filed Sep. 4, 2009, titled "System, Method, and Program Product for Retail Activation and Reload Associated with Partial Authorization Transactions," each incorporated herein by reference in its entirety.

BACKGROUND OF THE INVENTION

1. Field of the Invention

The present invention relates generally to the retail prepaid card industry. More specifically, the present invention relates the field of issuing retail prepaid cards including a user-designed external face using a chit, where the chit is defined by an identification mechanism representing a financial commitment to issue a retail prepaid card in an amount associated with a value paid for the chit.

2. Description of Related Art

As retail establishments, such as department stores, discount stores, grocery stores, shopping centers, chain stores and restaurants transition from electronic cash register systems to Internet-enabled point-of-sale systems, the availability of, and demand for, closed-loop retail prepaid cards, otherwise known as gift cards, has increased dramatically. Where retail establishments once relied on paper gift certificates signed by the merchant and redeemable only by the presentation of the paper certificate, most retail establishments now use electronic closed-loop retail prepaid cards that can be redeemed both in person and over the Internet for products and services. Today, retail-prepaid cards are highly popular and rank as the second-most common gift given by consumers in the United States, according to a study conducted by Consumer's Union in 2007. Moreover, in the same study, retail prepaid cards ranked as the most-wanted gift by women and the third-most wanted gift by men.

Retail prepaid cards have become increasingly popular in part because the gift of a retail prepaid card relieves the donor of the task of selecting a specific gift. In other words, the gift of a retail prepaid card releases the donor from the stress that accompanies the search for the perfect individual gift because the recipient can now select his or her favorite gift from the selection of merchandise and services offered by the particular retail establishment associated with the given retail prepaid card. Nevertheless, the gift of retail prepaid cards is widely criticized as impersonal or unthoughtful. Giving a good gift is often difficult because it requires thought regarding the recipient's tastes, personality, style, and needs, among other criteria. A retail prepaid card may avoid the fear of giving a bad gift, but to some, it does so in a remote and sterile manner.

Specifically, most retail prepaid cards are physically designed such that an image selected by the associated retail establishment is printed on the external face of the card along with the logo of the particular associated retail establishment and a retail prepaid card identification number. For example, a retail prepaid card for a steakhouse may feature a picture of a steak on the grill, the name of the steakhouse, and a retail prepaid card identification number. Other retail establishments, such as a discount store, for instance, may sell several differently designed retail prepaid cards that each feature a different select image such as one of the store's inventory or a novelty image such as a birthday hat and streamers on retail prepaid cards intended to be purchased as birthday gifts. Accordingly, purchasers of retail prepaid cards are often forced to select from a narrow assortment of impersonal external designs, and purchasers have no ability to design the retail prepaid card to reflect their personal tastes or the personality and preferences of the intended recipient.

Additionally, present retail prepaid card systems often limit customers to subset of pre-designed retail prepaid cards that are in stock at the retail storefront when the customer seeks to make the purchase. For instance, a retail establishment may have thirty different retail prepaid card designs but at any given time, may only have 5 different designs in stock at the retail storefront. For example, a customer seeking a retail prepaid card as a gift for a boy's birthday would likely not be satisfied with pre-designed retail prepaid cards featuring pink balloons, wedding rings, dolls, a kitchen knife set, or jewelry. Keeping the full range of pre-designed retail prepaid card external face designs in stock may be prohibitively expensive for retail establishments and may not be a resourceful use of shelf space.

Alternatively, a consumer can purchase a retail prepaid card from a retail establishment's Internet website. While some consumers may be able to find a retail prepaid card that meets their criteria when provided with the full range of pre-designed retail prepaid cards for selection and purchase, others customers will continue to suffer from the inability to design the external face of a retail prepaid card that meets their personal tastes or the personality and preferences of the intended recipient. Moreover, in the case of an Internet website, retail establishments may lose sales attributed to impulse purchases, that is, those purchases a consumer makes after seeing an item, such as a retail prepaid card, on display at a retail storefront. Accordingly, recognized is the need for systems, computer program product, and related computer implemented methods to issue a retail prepaid card in a manner which provides the purchaser with the opportunity to design the appearance of the external face of the retail prepaid card while at the same time maintaining or even increasing the revenue of the retail establishment derived from the in-store sale of retail prepaid cards, including sales attributed to impulse purchases.

SUMMARY OF THE INVENTION

In view of the foregoing, various embodiments of the present invention advantageously provide systems, computer program product, and related computer implemented methods to issue a closed-loop retail prepaid card including a user-designed external face using a chit, the chit being defined by an identification mechanism representing a financial commitment to issue a closed-loop retail prepaid card in an amount associated with a value paid for the chit. Various embodiments of the present invention advantageously provide a service that enables a consumer to purchase, at the storefront of a retail establishment, a chit card that the consumer can subsequently redeem through a graphical user interface of an Internet website for a closed-loop retail prepaid card with a user-designed external face. The Internet website, for example, can facilitate the graphical design of the external face of the closed-loop retail prepaid card through one or more pages prompting the consumer to select one or more images stored in a database and prompting the consumer to enter one or more lines of user inputted text. The user-designed closed-loop retail prepaid card, for example, can be subsequently printed and delivered to an intended recipient. Advantageously, such a service can be made available to any retail establishment that uses a point-of-sale system.

More specifically, an example of a computer-implemented system to issue a closed-loop retail prepaid card including a user-designed external face using a chit can comprise a prepaid card provider computer, a merchant computer, a point-of-sale or point-of-transaction terminal, a chit user computer, and a communications network. Particularly, according to this example, the prepaid card provider computer can be positioned remote from and in communication with the merchant computer and the chit user computer via a communications network. The prepaid card provider computer, may, for example, have a processor, a computer readable storage medium, a memory element, and at least one database stored in the computer readable storage medium.

The prepaid card provider computer can, for example, create a plurality of chit data files, receive from the merchant computer a chit identification mechanism and a chit redemption value, verify and activate responsive to receiving the chit identification mechanism and the chit redemption value one of the plurality of chit data files stored in the first database and associated with the chit identification mechanism, store the chit redemption value in the chit data file associated with the chit identification mechanism, and facilitate through an Internet website accessible via the communications network the graphical design by a user of the external face of a closed-loop retail prepaid card and the issuance of the externally user-designed closed-loop retail prepaid card in an amount equal to the chit redemption value. According to this exemplary embodiment of the present invention, the at least one database, for example, can including first, second, third, and fourth databases. The first database can include, for example, a plurality of chit data files stored therein. The second database can include, for example, a plurality of merchant data files stored therein. The third database can include, for example, a plurality of closed-loop retail prepaid card external face images and a plurality of associated merchant identification codes stored therein. The fourth database can include, for example, a plurality of closed-loop retail prepaid card data files stored therein where each retail card data file, for example, can include at least a retail prepaid card number and a merchant identification code.

Furthermore, according to this exemplary embodiment of the present invention, the merchant computer, for example, can be placed in communication with a point-of-sale terminal and can be placed remote from and in communication with the prepaid card provider computer via the communications network. The merchant computer, for example, can have a processor, a memory element, a computer readable storage medium, at least one database stored in the computer readable storage medium, a user interface device, and a computer readable program product readable by the merchant computer and stored in the memory element thereof. The at least one database can, for example, store a plurality of chit activation codes.

The computer readable program product stored on the merchant computer can, according to an exemplary embodiment of the present invention, include a financial transaction module and a chit activation module. The financial transaction module can, for example, receive from the point-of-sale terminal the chit redemption value and personal financial information, verify the personal financial information, approve the purchase of the chit, and transmit the chit purchase confirmation code to the point-of-sale terminal responsive to the purchase of the chit. Likewise, the chit activation module can be, for example, transmit via the communications network to the prepaid card provider computer the chit identification mechanism and the chit redemption value to activate a chit, receive from the prepaid card provider computer via the communications network the chit activation code responsive to activation of the chit and associated with the chit identification mechanism, and store the chit activation code in the at least one database stored on the merchant computer.

A computer-implemented system according to this exemplary embodiment of the present invention can also include a point-of-sale terminal remote from and in communication the merchant computer having at least a processor and a user interface device to receive from a chit purchaser a chit redemption value and personal financial information, to transmit the chit redemption value and personal financial information to the merchant computer to thereby purchase a chit, and to receive a chit purchase confirmation code responsive to the purchase of the chit from the merchant computer.

Additionally, the system according to this exemplary embodiment of the present invention can further include a chit user computer positioned remote from the merchant computer and remote from and in communication with the prepaid card provider computer through the Internet website via the communications network. The chit user computer, for example, can include a processor, a memory element, and a user interface device. The chit user computer can, for instance, transmit through the Internet website via the communications network a chit identification mechanism to the prepaid card provider computer, design through the Internet website via the communications network the graphical appearance of the external face of the closed-loop retail prepaid card associated with the chit identification mechanism, and transmit through the Internet website via the communications network delivery information to facilitate the delivery of the externally designed closed-loop retail prepaid card associated with the chit identification mechanism in an amount equal to the chit redemption value. Moreover, the communications network can be, for example, in communication with the prepaid card provider computer, the merchant computer, and the chit user computer.

Furthermore, this exemplary embodiment of a computer-implemented system according to the present invention can also include a computer readable program product readable by the prepaid card provider computer and stored in the memory element of the prepaid card provider computer. The computer readable program product readable by the prepaid card provider computer can, for example, include two main component parts, a chit initialization and purchase module, and a closed-loop retail prepaid card design and issuance module. The chit initialization and purchase module can include, for example, a chit creator, a chit deliverer, and a chit activator, and the closed-loop retail prepaid card design and issuance module can, for example, include an Internet website, a chit verifier, a chit redeemer, a closed-loop retail prepaid card external face designer, and a closed-loop retail prepaid card deliverer.

The chit initialization and purchase module, for example, can include a chit creator to receive from the merchant computer via the communications network a merchant name, a merchant Internet website, one or more merchant specific messages including a chit redemption Internet website address, a plurality of closed-loop retail prepaid card external face images, and merchant specific instructions. The merchant specific instructions can, for example, include an image allotment code, an image placement code, an image size code, a user inputted text placement code, a user inputted text allotment code, a user inputted text size code, a user inputted text font code, and a user inputted text line distance code. Secondly, the chit creator can, for example, associate the merchant name, the merchant Internet website, the one or more merchant specific messages, the plurality of closed-loop retail prepaid card external face images, and the merchant specific instructions with a merchant identification code. Thirdly, the chit creator can create and associate a merchant data file with the merchant identification code and store the merchant data file in the second database. Fourthly, the chit creator can, for example, store in the merchant data file the merchant identification code, the merchant name, the merchant Internet website, the one or more merchant specific messages, and the merchant specific instructions. Fifthly, the chit creator can, for example, store the plurality of closed-loop retail prepaid card external face images and the associated merchant identification code in the third database. Sixthly, the chit creator can, for example, create the plurality of chit data files to be associated with the merchant identification code where each of the plurality of chit data files is associated with a chit card and the chit identification mechanism associated with each of the plurality of chit data files is printed on the chit card and is used to identify the chit card. And lastly, the chit creator can, for example, store the plurality of chit data files in the first database where each chit data files includes a plurality of data fields to store a chit identification mechanism, a chit activation code, a chit redemption code, a chit redemption value, a merchant name, a merchant identification code, a chit expiration date, and an associated retail card prepaid number.

The chit initialization and purchase module, according to an embodiment of the present invention, can also include a chit deliverer to print on each of a plurality of chit cards the merchant name and the one or more merchant specific messages stored in the merchant data file associated with the merchant identification code stored in the chit data file associated with the chit identification mechanism that identifies the chit card, and to deliver the plurality of chit cards to the merchant identified by the merchant identification code stored in the chit data file and associated with the chit identification mechanism that identifies the chit card. Additionally, the chit initialization and purchase module can further include, for example, a chit activator to receive from the merchant computer via the communications network a chit identification mechanism and a chit redemption value, together indicating that the chit has been purchased via the point-of-sale terminal; to activate one of the plurality of chit data files associated with the chit identification mechanism received from the merchant computer via the communications network responsive to the purchase of the chit card via the point-of-sale terminal; to store a chit activation code responsive to the activation of the chit card and the chit redemption value in the one of the plurality of chit data files associated with the chit identification mechanism; and to transmit to the merchant computer via the communications network the chit activation code responsive to the activation of the chit and associated with the chit identification mechanism.

The closed-loop retail prepaid card design and issuance module can include, for example, an Internet website accessible via the communications network through the chit user computer to provide a graphical user interface to verify the activation of a chit card by receiving through the graphical user interface the chit identification mechanism printed on the chit card; to redeem the chit for a closed-loop retail prepaid card associated with the chit identification mechanism and responsive to the chit redemption; to graphically design the external face of the closed-loop retail prepaid card; and to facilitate delivery of the closed-loop retail prepaid card by collecting chit delivery data. Additionally, the closed-loop retail prepaid card design and issuance module can include, for example, a chit verifier to receive a chit identification mechanism from the chit user computer through the Internet website accessible via the communications network and to verify that the chit identification mechanism received from the chit user computer through the Internet website is associated with one of the plurality of chit data files and that the associated one of the plurality of chit data files includes a chit activation code.

According to an embodiment of the present invention, a closed-loop retail prepaid card design and issuance module can also include, for example, a chit redeemer. The chit redeemer can, for example, store responsive to the verification, a chit redemption code in the one of the plurality of chit data files associated with the chit identification mechanism received from the chit user computer through the Internet website. Secondly, the chit redeemer can, for example, associate the one of the plurality of chit data files identified by the chit identification mechanism received from the chit user computer through the Internet website with one of the plurality of closed-loop retail prepaid card data files identified by a retail prepaid card number and stored in the fourth database. Thirdly, the chit redeemer can, for example, store in the associated one of the plurality of closed-loop retail prepaid card data files the chit redemption value and the merchant identification code stored in the one of the plurality of chit data files associated with the chit identification mechanism to thereby activate the associated one of the plurality of closed-loop retail prepaid card data files. Lastly, the chit redeemer can, for example, store the retail prepaid card number stored in the associated one of the plurality of closed-loop retail prepaid card data files in the one of the plurality of chit data files associated with the chit identification mechanism received from the chit user computer.

The closed-loop retail prepaid card design and issuance module, according to an exemplary embodiment of the present invention, can include, for example, a closed-loop retail prepaid card external face designer. The closed-loop retail prepaid card external face designer can, for instance, display on the Internet website accessible to the chit user computer via the communications network one or more of the plurality of closed-loop retail prepaid card external face images stored in the third database and associated with the merchant identification code stored in the one of the plurality of chit data files associated with the chit identification mechanism received from the chit user computer through the Internet website. Secondly, the closed-loop retail prepaid card external face designer can, for instance, receive a selection of one or more of the plurality of closed-loop retail prepaid card external face images from the chit user computer through the Internet website. Thirdly, the closed-loop retail prepaid card external face designer can, for example, receive one or more lines of user inputted text from the chit user computer through the Internet website. Fourthly, the closed-loop retail prepaid card external face designer can associate the selected one or more of the plurality of closed-loop retail prepaid card external face images and the one or more lines of user inputted text with the associated one of the plurality of closed-loop retail prepaid card data files stored in the fourth database. Fifthly, the closed-loop retail prepaid card external face designer can, for example, receive delivery information, including at least a name and a postal mailing address, from the chit user computer through the Internet website. And lastly, the closed-loop retail prepaid card external face designer can, for instance, store the selected one or more of the plurality of closed-loop retail prepaid card external face images, the one or more lines of user inputted text, and the delivery information in the associated one of the plurality of closed-loop retail prepaid card data files.

Moreover, the closed-loop retail prepaid card design and issuance module, according to an embodiment of the present invention, can include a closed-loop retail prepaid card deliverer to print on a closed-loop retail prepaid card the merchant name, the retail prepaid card number, the selected one or more of the plurality of closed-loop retail prepaid card external face images, and the one or more lines of user inputted text stored in the associated one of the plurality of closed-loop retail prepaid card data files, and to deliver the closed-loop retail prepaid card to a closed-loop retail prepaid card user at a location defined by the delivery information stored in the associated one of the plurality of closed-loop retail prepaid card data files. According to an embodiment of the present invention, the number of, placement of, and size of the selected one or more of the closed-loop retail prepaid card external face images is determined by the merchant specific instructions stored in the merchant data file associated with the merchant identification code stored in the associated one of the plurality of closed-loop retail prepaid card data files. Likewise, for example, the number of, and placement of, size of, and font of the one or more lines of user inputted text is determined by the merchant specific instructions stored in the merchant data file associated with the merchant identification code stored in the associated one of the plurality of closed-loop retail prepaid card data files. Additionally, according to an embodiment of the present invention, the Internet website can be accessible, for example, via the communications network.

An example of an embodiment of a computer readable program product stored in a tangible computer medium to issue a closed-loop retail prepaid card including a user-designed external face using a chit can include, for example, instructions that when executed by a computer cause the computer to perform the operations of initializing a plurality of chit data files and facilitating the purchase of a chit, verifying a chit identification mechanism and redeeming the associated one of the plurality of chit data files, and issuing a user-designed closed-loop retail prepaid card.

The operation of initializing a plurality of chit data files and facilitating the purchase of a chit can further include, for example, instructions that when executed by a computer cause the computer to perform the operations of receiving from the merchant computer via the communications network a merchant name, a merchant Internet website, one or more merchant specific messages including a chit redemption Internet website address, a plurality of closed-loop retail prepaid card external face images, and merchant specific instructions including an image allotment code, an image placement code, an image size code, a user inputted text placement code, a user inputted text allotment code, a user inputted text size code, a user inputted text font code, and a user inputted text line distance code; associating the data received from the remote merchant computer with a merchant identification code; creating and associating a merchant data file with the merchant identification code; storing the merchant data file in a database; storing the plurality of closed-loop retail prepaid card external face images and the associated merchant identification code in a database and storing the other data received from the remote merchant computer in the merchant data file. The operation of initializing a plurality of chit data files and facilitating the purchase of a chit can further include, for example, instructions that when executed by a computer cause the computer to perform the operation of creating a plurality of chit data files to be associated with the merchant identification code where each of the plurality of chit data files is associated with a chit card and the chit identification mechanism associated with each of the plurality of chit data files is printed on the chit card and is used to identify the chit card; storing the plurality of chit data files in a database; and printing on each of a plurality of chit cards the merchant name and the one or more merchant specific messages stored in the merchant data file associated with the merchant identification code stored in the chit data file associated with the chit identification mechanism that identifies the chit card. According to an embodiment of the present invention, for example, each of the plurality of chit data files can include a plurality of data fields to store a chit identification mechanism, a chit activation code, a chit redemption code, a chit redemption value, a merchant name, a merchant identification code, a chit expiration date, and an associated retail card prepaid number.

The operation of initializing a plurality of chit data files and facilitating the purchase of a chit can further include, for example, instructions that when executed by a computer cause the computer to perform the operations of receiving from the remote merchant computer via the communications network a chit identification mechanism and a chit redemption value, together indicating that the chit has been purchased via the point-of-sale terminal; activating one of the plurality of chit data files associated with the chit identification mechanism received from the remote merchant computer via the communications network responsive to the purchase of the chit; storing a chit activation code responsive to the activation of the chit and the chit redemption value in the one of the plurality of chit data files associated with the chit identification mechanism; and transmitting to the remote merchant computer via the communications network the chit activation code responsive to the activation of the chit and associated with the chit identification mechanism.

The operation of verifying a chit identification mechanism and redeeming the associated one of the plurality of chit data files can include, for example, instructions that when executed by a computer cause the computer to perform the operations of receiving a chit identification mechanism from a remote chit user computer through the Internet website; verifying that the chit identification mechanism received from the remote chit user computer through the Internet website is associated with one of the plurality of chit data files and that the associated one of the plurality of chit data files includes a chit activation code; and storing, responsive to the verification, a chit redemption code in the one of the plurality of chit data files associated with the chit identification mechanism received from the remote chit user computer through the Internet website. The operation of verifying a chit identification mechanism and redeeming the associated one of the plurality of chit data files can also include, for example, instructions that when executed by a computer cause the computer to perform the operations of associating the one of the plurality of chit data files associated with the chit identification mechanism received from the remote chit user computer through the Internet website with one of the plurality of closed-loop retail prepaid card data files identified by a retail prepaid card number; storing in the associated one of the plurality of closed-loop retail prepaid card data files the chit redemption value and the merchant identification code stored in the one of the plurality of chit data files associated with the chit identification mechanism; and storing the retail prepaid card number stored in the associated one of the plurality of closed-loop retail prepaid card data files in the one of the plurality of chit data files associated with the chit identification mechanism received from the remote chit user computer. According to an embodiment of the present invention, the computer readable instruction that causes the operation of storing the chit redemption value and the merchant identification code in the associated one of the plurality of closed-loop retail prepaid card data files can, for example, signify the activation of the associated one of the plurality of closed-loop retail prepaid card data files.

Additionally, the operation of issuing a user-designed closed-loop retail prepaid card can include, for example, instructions that when executed by a computer cause the computer to perform the operation of displaying on the Internet website one or more of the plurality of closed-loop retail prepaid card external face images associated with the merchant identification code stored in the one of the plurality of chit data files associated with the chit identification mechanism received from the remote chit user computer through the Internet website. According to this exemplary embodiment of the present invention, the operation of issuing a user-designed closed-loop retail prepaid card can also include, for example, instructions that when executed by a computer cause the computer to perform the operations of receiving a selection of one or more of the plurality of closed-loop retail prepaid card external face images from the remote chit user computer through the Internet website; receiving one or more lines of user inputted text from the remote chit user computer through the Internet website; associating the selected one or more of the plurality of closed-loop retail prepaid card external face images and the one or more lines of user inputted text with the associated one of the plurality of closed-loop retail prepaid card data files; receiving delivery information, including at least a name and a postal mailing address, from the remote chit user computer through the Internet website; and storing the selected one or more of the plurality of closed-loop retail prepaid card external face images, the one or more lines of user inputted text, and the delivery information in the associated one of the plurality of closed-loop retail prepaid card data files; and printing on a closed-loop retail prepaid card the merchant name, the retail prepaid card number, the selected one or more of the plurality of closed-loop retail prepaid card external face images, and the one or more lines of user inputted text stored in the associated one of the plurality of closed-loop retail prepaid card data files.

According to this exemplary embodiment of the present invention, the number of, placement of, and size of the selected one or more of the closed-loop retail prepaid card external face images is determined by the merchant specific instructions stored in the merchant data file associated with the merchant identification code stored in the associated one of the plurality of closed-loop retail prepaid card data files, and the number of, and placement of, size of, and font of the one or more lines of user inputted text is determined by the merchant specific instructions stored in the merchant data file associated with the merchant identification code stored in the associated one of the plurality of closed-loop retail prepaid card data files.

Embodiments of the present invention provide at least seven primary benefits: (1) consumers are provided a greater selection of retail prepaid card external face designs; (2) consumers can design the external appearance of the retail prepaid card, including selecting an image and inputting text lines to be printed on the retail prepaid card; (3) merchants can offer a more robust retail prepaid card program with less storefront space dedicated to displaying retail prepaid cards; (4) merchants can closely tailor the extent to which purchasers can design the external face of a purchased retail prepaid card; (5) inventory costs are reduced for merchants; (6) merchants' revenue derived from the in-store sale of retail prepaid cards, including sales attributed to impulse purchases, is maintained or increased; and (7) fraud is reduced. Specifically, embodiments of the present invention beneficially afford merchants with the opportunity to display chit cards at the retail storefront. The chit cards, for example, can have a single external face design advertising the ability of the consumer purchaser to redeem the chit card for a retail prepaid card that can be externally designed by the purchaser. The singular chit card design can, for example, allow merchants to reduce shelf space once devoted to displaying a plurality of retail prepaid card external face designs. Alternatively, in an embodiment according to the present invention, a merchant can display chit cards with a variety of different external face designs showing, for example, the large variety of ways a purchaser can design the external face of a purchased retail prepaid card.

In addition to reducing shelf space devoted to retail prepaid cards, embodiments of the present invention beneficially provide consumers the unique opportunity to design the external face of a purchased retail prepaid card. Purchasers can, for example, select one or more images from a library of images stored on a database to be printed on the external face of their purchased retail prepaid card. In addition to selecting one or more images to be printed on the purchased retail prepaid card, purchasers can also beneficially select the size of the images and the location of the images on the retail prepaid card. Furthermore, purchasers, for example, can beneficially input into an Internet website design tool one or more lines of text. Beneficially, these lines of text inputted by the purchaser can be printed on the retail prepaid card at a location specified by the particular merchant associated with the retail prepaid card. Therefore, purchasers of retail prepaid cards using a chit according to an embodiment of the present invention can design the external face of a retail prepaid card in order to meet their personal tastes or the personality and preferences of the intended recipient.

Beneficially, merchants can closely tailor the extent to which a purchaser of a retail prepaid card can design the external face of the retail prepaid card. For example, according to an embodiment of the present invention, a plurality of merchants can join or subscribe to the retail prepaid card service. During the signup process for the service, each merchant can beneficially input merchant specific data, including, for example, data directed to the design of the external face of the retail prepaid card. For instance, each merchant can input a plurality of retail prepaid card external face images to add to the image library database. Beneficially, each merchant can also input, for example, an image allotment code to specify the allowed number of retail prepaid card external face images that may be printed on a purchased retail prepaid card, an image placement code to specify the allowed placement of retail prepaid card external face images on the retail prepaid card, an image size code to specify the allowed size of retail prepaid card external face images printed on the purchased retail prepaid card, a user inputted text placement code to specify the position of the text on the purchased retail prepaid card, a user inputted text allotment code to specify the number of lines or characters of user inputted text that the merchant will allow to be printed on the retail prepaid card, a user inputted text font code to specify the fonts that the merchant will allow to be printed on the retail card, a user inputted text size code to specify the size of the text on the purchased retail prepaid card, and a user inputted text line distance code to specify the length of each horizontal line of text across the purchased retail prepaid card. Additionally, each merchant can beneficially provide, for example, one or more merchant specific messages and a merchant Internet website to be printed on each chit card associated with the merchant. Therefore, embodiments of the present invention beneficially provide merchants with a vast array of tools to tailor the user-designed retail prepaid card service using a chit to meet their individual business needs and objectives.

Beneficially, embodiments of the present invention provide users enhanced opportunities to design the external face of a purchased retail prepaid card while simultaneously reducing shelf space devoted to retail prepaid card displays. By reducing the amount of shelf space devoted to retail prepaid cards, retail establishments can, for example, place additional product lines in that shelf space thereby resulting in increased sales of that product line and increased overall revenue. Additionally, embodiments of the present invention do not remove all evidence of retail prepaid cards from the storefront. Rather, embodiments of the present invention beneficially allow merchants to continue to promote the purchase of retail prepaid cards by displaying chit cards. Particularly in the case of impulse purchases, a chit card display can have the same beneficial effect on a purchaser as a retail prepaid card display. An impulse purchase is an unplanned or otherwise spontaneous purchase. The display of a chit card according to embodiments of the present invention can beneficially prompt the spontaneous purchase of a retail prepaid card in the same manner as a display of actual retail prepaid cards. Therefore, the display of a chit card according to embodiments of the present invention beneficially maintains or increases the revenue of retail establishments derived from the in-store sale of retail prepaid cards, including sales attributed to impulse purchase, while simultaneously providing customers with the unique and beneficial opportunity to design the external face of the purchased retail prepaid card.

Moreover, embodiments of the present invention also beneficially reduce incidences of fraud related to transactions involving retail prepaid cards. For example, many retail establishments currently display retail prepaid cards on store shelves. Typically, these retail prepaid cards must be activated before such cards can be used in a transaction. However, in many cases it is possible to use a magnetic stripe writer to activate a retail prepaid card by either encoding a certain prepaid dollar amount on the retail prepaid card or encoding an activated retail prepaid card number on the retail prepaid card. In either case, it is possible to defraud a retail establishment's retail prepaid card transaction system by transforming an otherwise inactive retail prepaid card into an activate retail prepaid card. Beneficially, embodiments of the present invention replace displays of retail prepaid cards on store shelves with chits. While a retail prepaid card can be removed from a retail establishment and fraudulently activated and used to complete a transaction, a chit cannot be fraudulently activated and subsequently used to complete a transaction. Beneficially, a chit must be redeemed for a retail prepaid card, and without the step of redemption, a chit cannot be used to complete a transaction. Accordingly, incidences of fraud resulting from uses of inactive retail prepaid cards to complete a transaction are beneficially reduced.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 7 is a schematic diagram illustrating an exemplary user-designed closed-loop retail prepaid card with two closed-loop retail prepaid card images printed in the top-left and bottom-right corners of the card respectively in accordance with the specifications of the merchant associated with the closed-loop retail prepaid card according to an embodiment of the present invention.

FIG. 8 is a schematic diagram illustrating an exemplary user-designed closed-loop retail prepaid card with one closed-loop retail prepaid card image largely printed in the center of the card in accordance with the specifications of the merchant associated with the closed-loop retail prepaid card according to an embodiment of the present invention.

FIG. 9 is a schematic diagram illustrating an exemplary chit card including a chit identification mechanism, a merchant name, an expiration date, a chit redemption value, and one or more merchant specific messages according to an embodiment of the present invention.

FIG. 10 is a schematic diagram illustrating an exemplary chit card including a chit identification mechanism, a merchant name, one or more merchant specific messages, and a chit redemption Internet website address according to an embodiment of the present invention.

FIG. 13 is a schematic diagram of an exemplary graphical user interface of a chit redemption Internet website introductions and instructions webpage according to an embodiment of the present invention.

FIG. 14 is a schematic diagram of an exemplary graphical user interface of a chit redemption Internet website chit verification webpage according to an embodiment of the present invention.

FIG. 15 is a schematic diagram of an exemplary graphical user interface of a chit redemption Internet website external card face design webpage according to an embodiment of the present invention.

DETAILED DESCRIPTION

Figure 1:
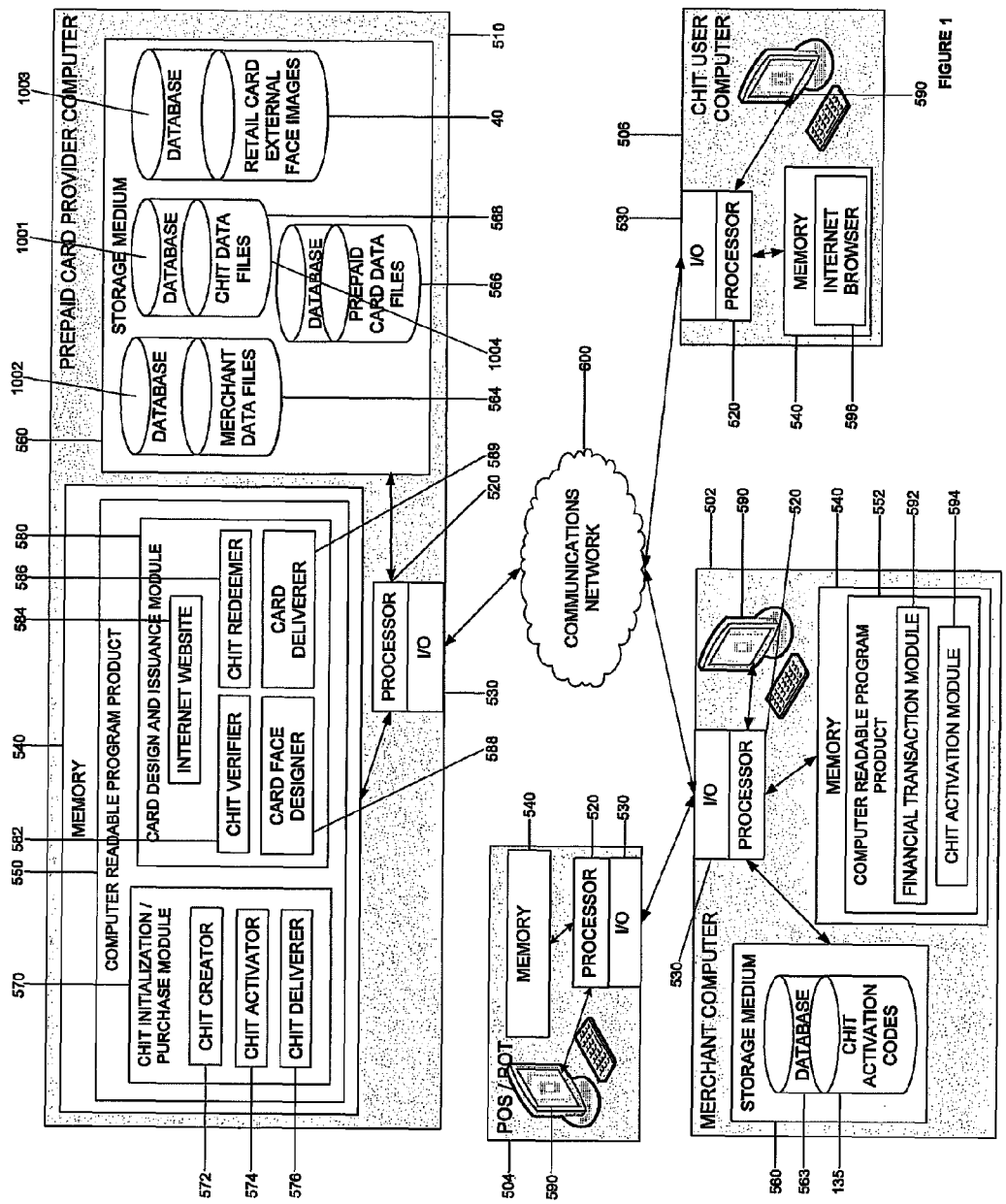
FIG. 1 is a schematic block diagram illustrating an exemplary system architecture of a computer-implemented system to issue a closed-loop retail prepaid card including a user-designed external face using a chit according to an embodiment of the present invention.

In the drawings and description that follows, like parts are marked throughout the specification and drawings with the same reference numerals, respectively. The drawings are not necessarily to scale. Certain features of the disclosure may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Figure 5:
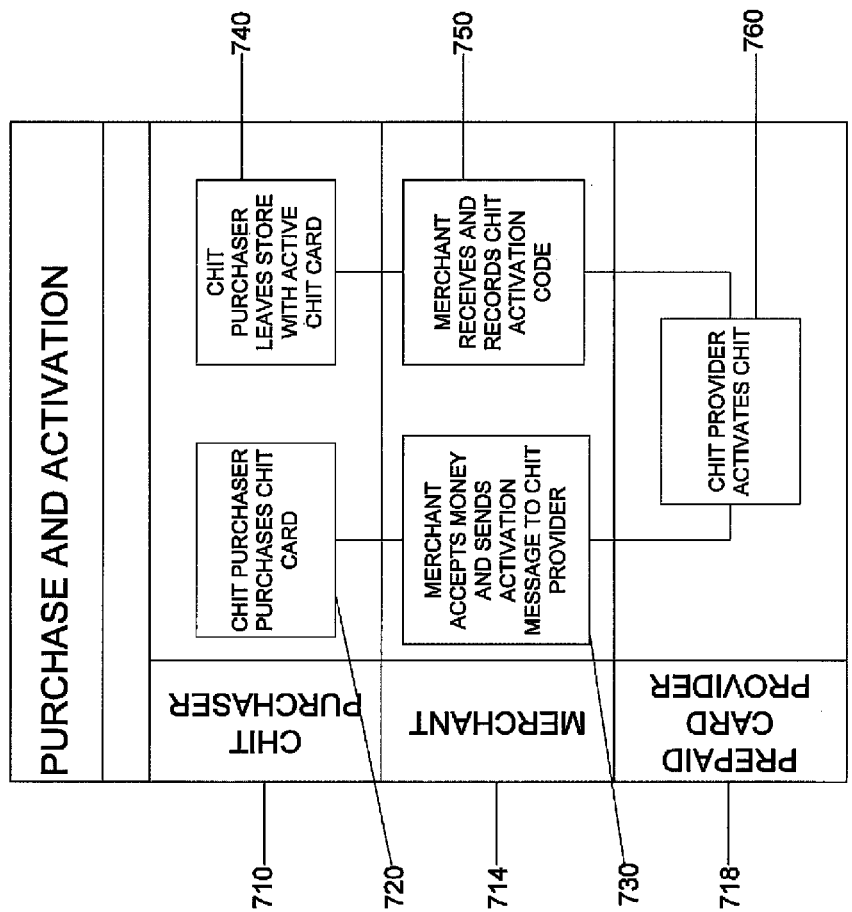
FIG. 5 is a schematic block diagram illustrating steps or operations facilitating the purchase and activation of a chit card by a chit purchaser at a retail establishment storefront according to an embodiment of the present invention.

Embodiments of the present invention advantageously provide, for example, systems, computer program product, and related computer implemented methods to issue a closed-loop retail prepaid card including a user-designed external face using a chit, the chit being defined as an identification mechanism representing a financial commitment to issue a closed-loop retail prepaid card in an amount associated with value paid for the chit. As perhaps best illustrated in FIGS. 5 through 10, embodiments of the present invention advantageously provide a service that facilitates the purchase and activation of a chit at the storefront of a retail establishment by a chit purchaser 710 and the subsequent redemption of the chit for a user-designed closed-loop retail prepaid card 10 of equivalent value using an Internet website accessed by a chit user 712 via a communications network. The chit, for example, can be in the form of a chit card 110, an electronic Internet website chit 115, or an electronic mail chit 118. Moreover, a chit can be printed on, or otherwise included in, a receipt provided by a merchant 714 to a chit purchaser 710 responsive to the purchase and activation of a chit. More specifically, FIG. 5 is a schematic block diagram illustrating steps or operations facilitating the purchase and activation of a chit card 110 by a chit purchaser 710 at a retail establishment storefront according to an embodiment of the present invention. For example, chit purchaser 710 can purchase a chit card 710 at the storefront of a retail establishment. A retail establishment can be, for example a grocery store, a discount store, a department store, a gas station, a franchise store, a restaurant, a salon, an electronics store, a big box store, a superstore, a megastore, a supercenter, an airline, or any other business establishment that offers products or services to consumers. The term storefront, as used throughout, shall refer to retail shops and stores that are located in a building as opposed to those that are located online and accessible through an Internet web browser via a communications network. The term merchant 714, as used throughout, shall refer to both a retail establishment and the one or more persons that operate a retail establishment.

FIGS. 9 and 10 are schematic diagrams each illustrating an exemplary chit card 110 according to an embodiment of the present invention. A chit card 110, can, for example, be a plastic or paper card of dimensions similar to that of a standard credit, debit, or identification card with printing on its external face. The printing on the external face of the chit card 110 can include, for example, a title of the chit card 120, a chit identification mechanism 130, the merchant 714 or retail establishment name associated with the chit card 140, the expiration date of the chit card 150, the chit redemption value 160, a chit redemption Internet website address 178, and any merchant specific message 171. The merchant specific message 170 can include, for instance, a message instructing the chit purchaser 710 as to how to redeem the chit card 110 for a closed-loop retail prepaid card 10 or can include a message thanking the chit purchaser 710 for purchasing the chit card 110. Each merchant can, for example, have its own individual merchant specific message 171 and this merchant specific message 171 can be unique from merchant specific messages 171 of other merchants. The title of the chit card 120 can, for example, be the name of the merchant 714 from which the chit card 110 was purchased.

The chit identification mechanism 130, for example, can be any series of letters or number, or any series of letters and numbers, that uniquely identify a chit card 110 according to an embodiment of the present invention. For example, a chit identification mechanism 130 can be a series of numbers similar to that of a credit or debit card number The chit identification mechanism 130 can, for example, take the form of a bar code or may be embedded in a magnetic stripe, a RFID device, a smart chip, or any other similar device embedded or carried on a card, paper, receipt, or the like, as known and understood to those skilled in the art. The chit redemption Internet website address, can for example, be the address of an Internet website hosted by a prepaid card provider 718 associated with the chit card 110 or it may be the address of an Internet website hosted by the merchant 714 associated with the chit card 110. In cases where the chit redemption Internet website address 178 is the address of an Internet website hosted by the merchant 714 associated with the chit card 110, the Internet website can, for example, link internally to an Internet website hosted by the prepaid card provider 718 associated with the chit card 110.

Beneficially, the prepaid card provider 718 can be, for example, a banking institution. As used throughout, the term banking institution refers to any institution that provides banking services, including banks, credit unions, savings and loan associations, non-banking financial companies, and insurance companies, just to name a few. Additionally, as used throughout, the term bank refers to any financial institution whose primary activity is to act as a payment agent for customers and to borrow and lend money. According to an embodiment of the present invention, for example, a banking institution, as a prepaid card provider 718, can be responsible for, coordinate, oversee, and direct all aspects of issuing a chit and redeeming the chit for a closed-loop retail prepaid card through, e.g., a traditional payment network.

To purchase a chit card 110, according to an embodiment of the present invention, as illustrated by FIG. 1, FIG. 5, and FIGS. 9-12, for example, the chit purchaser 710 can tender payment for the chit card 110 to a merchant 714 via a point-of-sale or point-of-transaction terminal 504 at the retail establishment storefront and in turn, the merchant 714 can send an activation message to a prepaid card provider 718 via a communications network 600 to activate the chit card 110. The activation message can, for example, include the chit identification mechanism 130 that is printed on the chit card 110. For example, the merchant computer may transmit a decrypted version of the chit identification mechanism through a traditional financial services network, which operates to set transaction rules, facilitate transactions, settles funds between parties, engages in risk mitigation etc. Examples of financial services networks are e.g., MasterCard®, Visa®, American Express®, or Discover® network and can be configured as one or more computers each having a processor and memory coupled to the processor to store operating instructions therein, which can be configured in the form of a server. At the payment network, the chit identification mechanism may be decrypted so that an issuer, or financial institution operating the prepaid card provider network, can be identified using an issuer identification number, or IIN, that may be part of the chit identification mechanism, Hereby, the chit identification mechanism is routed to the appropriate issuer or financial institution operating as the prepaid card provider. The prepaid card provider 718, responsive to receiving the activation message, can activate the chit card 760 by, for example, activating the one of a plurality of chit data files 568 stored in the storage medium 560 of a prepaid card provider computer 510 that is associated with the chit identification mechanism 130 included in the chit activation message. The prepaid card provider 718 can also, for example, store a chit activation code 135 responsive to the activation of the chit card 110 and the chit redemption value 160 included in the chit activation message in the one of the plurality of chit data files 568 associated with the chit identification mechanism and stored in the storage medium 560 of the prepaid card provider computer 510. The chit activation code 135, for example, can be any series of alpha-numeric characters, ASCII characters, or UNICODE characters that indicates that a chit card 110 has been activated according to an embodiment of the present invention. Additionally, the prepaid card provider 718 can transmit to the merchant 714 via the communications network 600 the chit activation code 135 responsive to the activation of the chit card 110.

According to an embodiment of the present invention, the merchant 714 then can receive and record 750 the chit activation code 135 and the chit purchaser 710 can leave the retail establishment storefront with an activated chit card 740.

Additionally, to increase the security of chit cards 110 and to beneficially reduce fraudulent redemption chit cards 110, the chit purchaser 710 can, in addition to tendering payment for the chit card 110 to a merchant 714, can provide personal information to be associated with the chit card 110. The term personal information, as used throughout, can refer to, but is not limited to, name, address, phone number, zip code, social security number, area code, personal password, eye color, biometric readings, or any other information that can be used to identify the chit purchaser 710 or the chit user 712. The personal information collected from the chit purchaser 710 during the chit purchase can be used, for example, to verify the ownership of a chit card prior to redemption of the chit for a user-designed closed-loop retail prepaid card. For example, according to an embodiment of the present invention, a chit purchaser 710 can purchase a chit card 110 and at the time of purchase provide a zip code to be associated with the chit card. When the chit purchaser 710 or chit user 712 redeems the chit card for a user-designed closed-loop retail prepaid card, the chit purchaser 710 or the chit user 712 can be, for example, required to provide the zip code associated with the chit card in order to verify the identify of the chit purchaser 710 or the chit user 712 at the time of redemption. This step of verification of identity beneficially reduces the possibility of fraudulent redemption of chit cards 110. Additionally, chit cards 110 can use a partial authentication mechanism, whereby the chit card has two chit card identification mechanisms (one on the packaging and one on the chit card), and both chit card identification mechanisms must be entered in particular sequence for the chit card to be fully activated.

Figure 11:
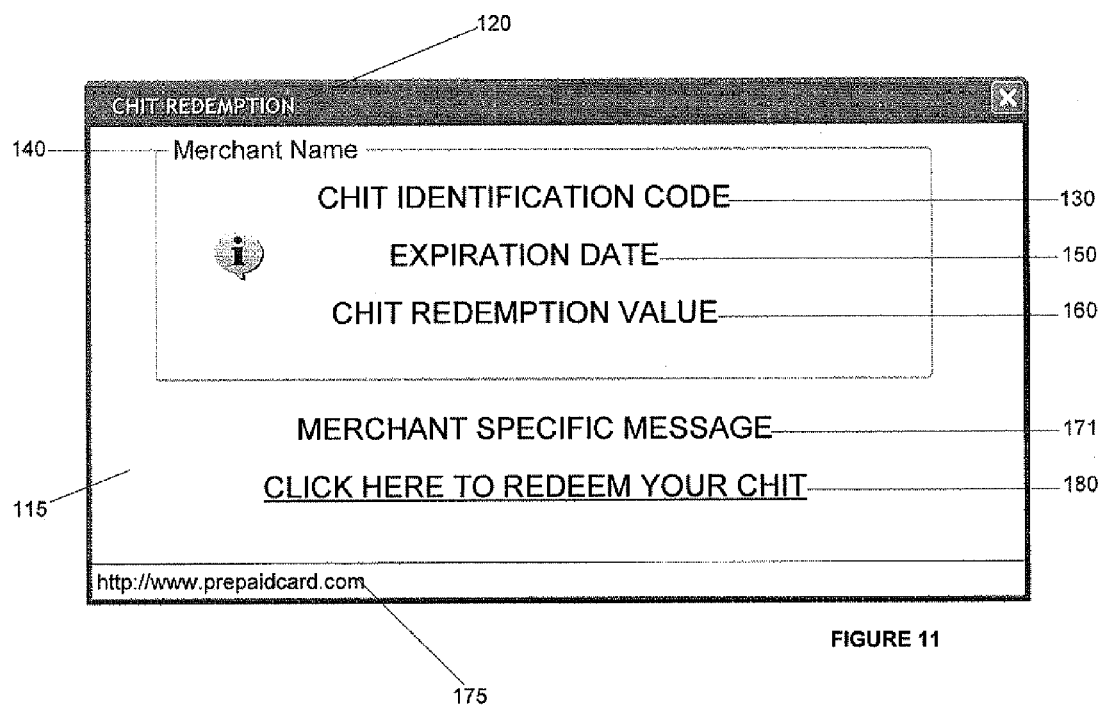
FIG. 11 is a schematic diagram of an exemplary electronic Internet website chit to be delivered to the chit purchaser via a user interface device of a computer, including a chit identification mechanism, a chit expiration date, a chit redemption value, one or more merchant specific messages, and an Internet website link to a chit redemption Internet website according to an embodiment of the present invention.

According to another embodiment of the present invention, as illustrated in FIGS. 1, 5, 11, and 12, alternatively a chit can be purchased by a chit purchaser 710 over the Internet at a merchant Internet website 175 hosted by a retail establishment and accessible through an Internet browser 596 via a communications network 600. Specifically, FIG. 11 is a schematic diagram of an exemplary electronic Internet website chit 115 designed to be delivered to the chit purchaser 710 via a graphical user interface device of a computer according to an embodiment of the present invention. The electronic Internet website chit 115 is designed to be displayed to a chit purchaser 710 via the graphical user interface 590 device of the remote chit user computer 506 and subsequently printed by the chit purchaser 710 using a personal printer device according to an embodiment of the present invention. The electronic Internet website chit 115 can include content and features similar to that of a chit card 110, for example, a title of the electronic Internet website chit 120, a merchant name associated with the electronic Internet website chit 140, a chit identification mechanism 130, an expiration date 150, a chit redemption value 160, and one or more merchant specific messages 171. In addition to the content and features similar to those included on chit card 110, the electronic Internet website chit 115 further can include a chit redemption Internet website link 180. The chit redemption Internet website link 180 can link to a chit redemption Internet website address 178 and can be displayed, for example, on the electronic Internet website chit 115 in either URL form or in plain text form with a phrase such as "click here to redeem your chit." The electronic Internet website chit 115 can also include, for example a link to the merchant Internet website 175 associated with electronic Internet website chit. Like the chit redemption Internet website link 180, the link to the merchant Internet website can be displayed, for example, on the electronic Internet website chit 115 in either URL form or in plain text with a phrase such as "click here to go to the merchant Internet website."

Figure 12:
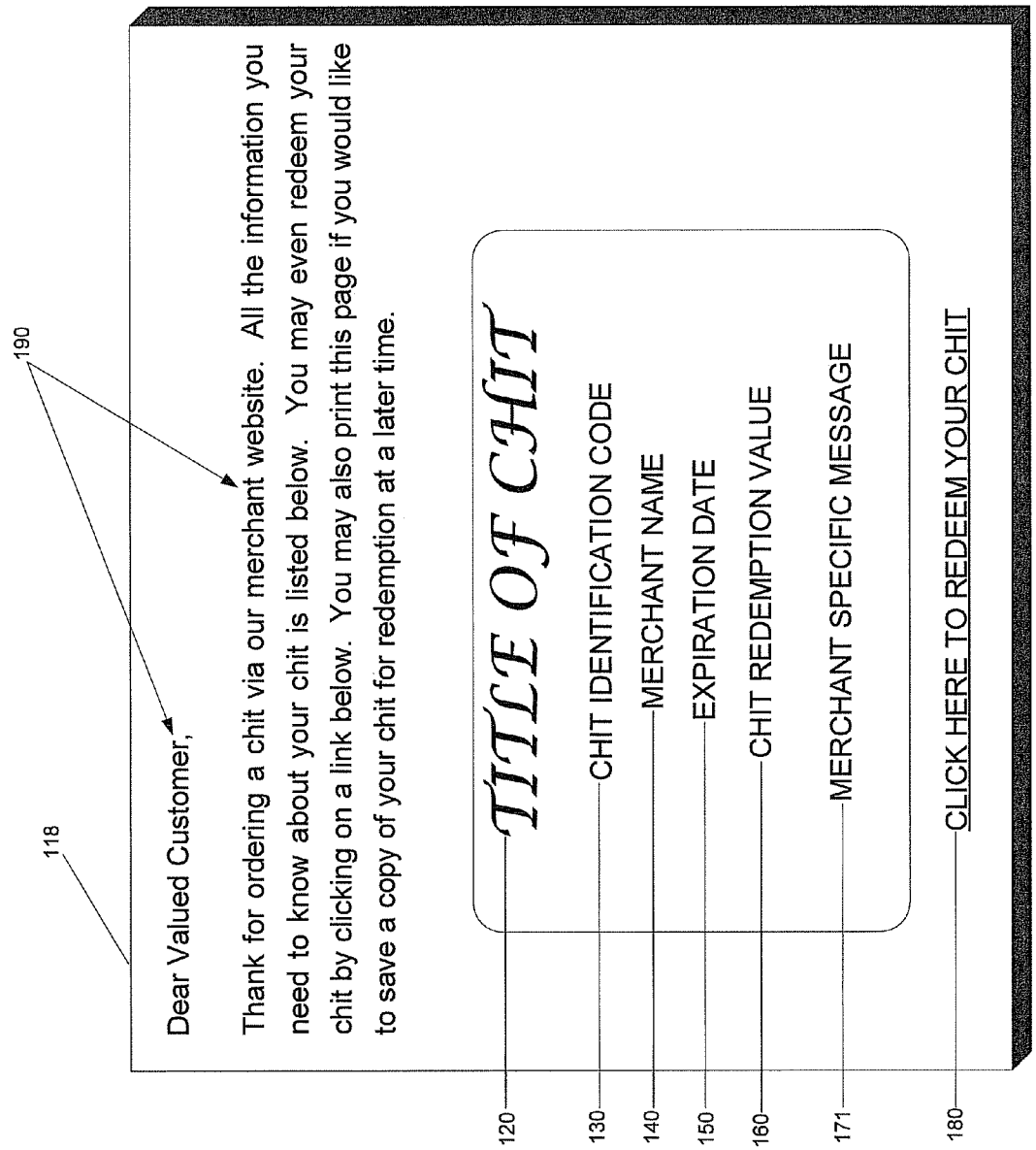
FIG. 12 is a schematic diagram of an exemplary an electronic mail chit to be delivered to a chit purchaser via electronic mail through a communications network, including a welcome message, a chit identification mechanism, a merchant name, an expiration date, a chit redemption value, one or more merchant specific messages, and an Internet website link to a chit redemption Internet website according to an embodiment of the present invention.

A chit can also be delivered to a chit purchaser as, for example, an electronic mail chit or email chit 118. More specifically, FIG. 12 is a schematic diagram of an email chit 118 delivered to a chit purchaser via electronic mail through a communications network 300. For example, a chit purchaser 710 can provide an electronic mail address to a merchant 714 during a chit purchase transaction. Subsequent to the chit purchase, the chit can be delivered in an electronic mail form to the chit purchaser's electronic mail address. The email chit 118 can include content and features similar to that of a chit card 110, for example, a title of the email chit 120, a merchant name associated with the email chit 140, a chit identification mechanism 130, an expiration date 150, a chit redemption value 160, and one or more merchant specific messages 171. The email chit can also include, in addition to the features and content of a chit card 110, a chit redemption Internet website address 178 and a chit redemption Internet website link 180. The chit redemption Internet website link 180 can link to a chit redemption Internet website address 178 and can be displayed, for example, on the electronic Internet website chit 115 in either URL form or in plain text form with a phrase such as "click here to redeem your chit." Additionally, the email chit 118 can also include, for example, chit purchaser message 190 and a link to the merchant Internet website 175 associated with the email chit 118. The chit purchaser message 190 can include, for example, a salutation to the chit purchaser 710 and a short message thanking the chit purchaser 710 for the purchase of the email chit 118 and directing the chit purchaser 710 as to the method chit redemption. Moreover, like the chit redemption Internet website link 180, the link to the merchant Internet website can be displayed, for example, on the electronic Internet website chit 115 in either URL form or in plain text with a phrase such as "click here to go to the merchant Internet website."

A chit can also be printed directly on a receipt provided by a merchant 714 to a chit purchaser 710 responsive to the purchase and activation of a chit. Rather than providing the chit purchaser 710 with a chit card and rather than delivering the chit to the chit purchaser 710 in the form of an electronic mail message, the merchant can, for instance, print the chit directly on the receipt confirming and recording the transaction resulting in the purchase of the chit. The receipt, can be, for example, printed using a thermal receipt printer on thermal receipt tape. Alternatively, the receipt can be printed, for instance, on any other type of receipt paper and using any other type of receipt printer as known and understood by those skilled in the art. The chit printed directly on the chit purchase transaction receipt can include content and features similar to that of a chit card 110, for example, a title of the email chit 120, a merchant name associated with the email chit 140, a chit identification mechanism 130, an expiration date 150, a chit redemption value 160, and a merchant specific message 171. Additionally, the chit printed directly on the chit purchase transaction receipt can also include, for example, a chit purchaser message 190. The chit purchaser message 190 can include, for example, a salutation to the chit purchaser 710 and a short message thanking the chit purchaser 710 for the purchase of the chit 118 and directing the chit purchaser 710 as to the method chit redemption.

Figure 6:
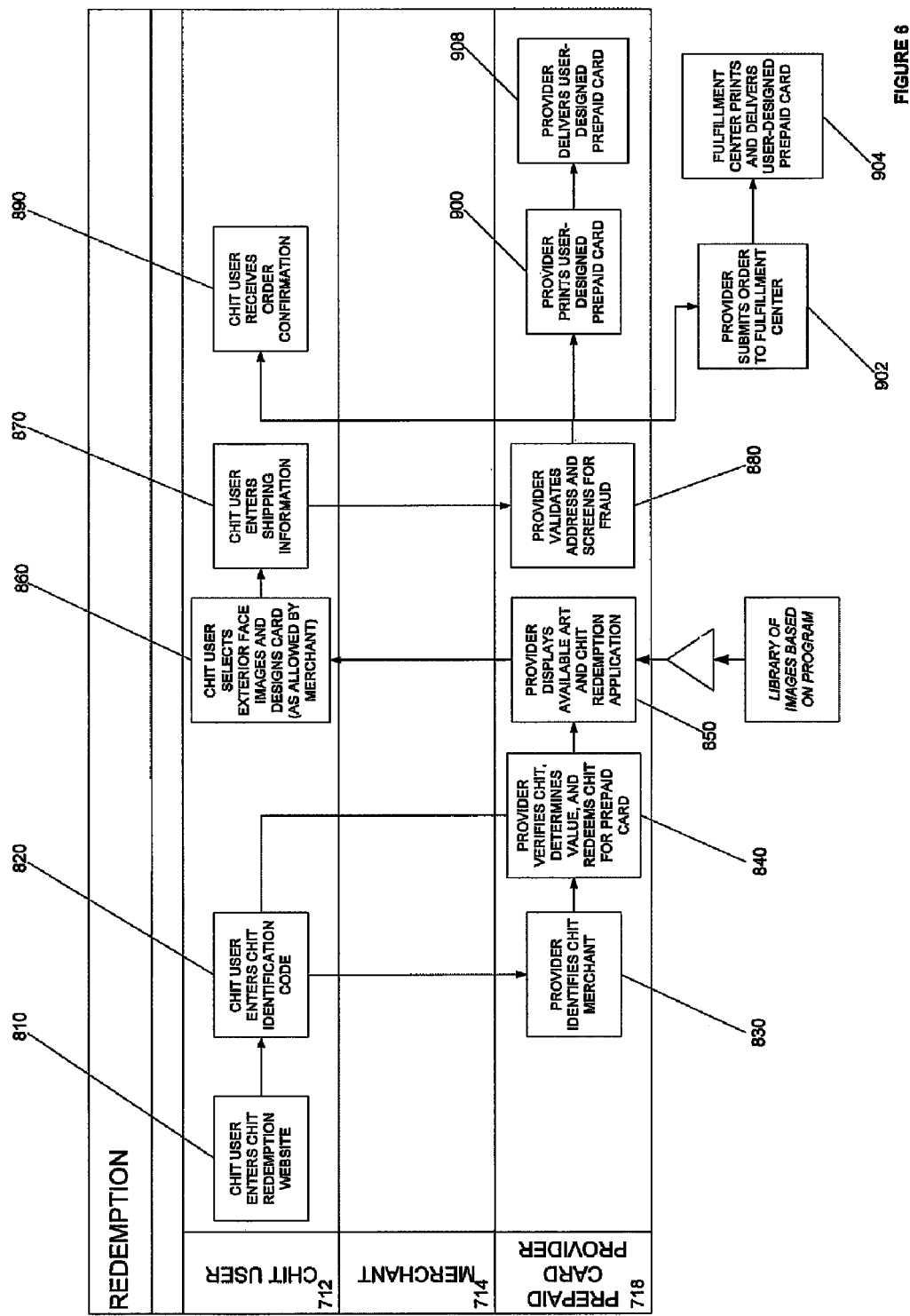
FIG. 6 is a schematic block diagram illustrating steps or operations facilitating the redemption of a chit, design of the external face of a closed-loop retail prepaid card, and delivery of the user-designed closed-loop retail prepaid card to the card recipient according to an embodiment of the present invention.

According to an embodiment of the present invention, the chit user 712 can redeem a chit, in the form of a chit card 110, an electronic Internet website chit 115, or an electronic mail chit 118, for a user-designed closed-loop retail prepaid card. More specifically, FIG. 6 is a schematic block diagram illustrating steps or operations facilitating the redemption of a chit, particularly, a chit card, the design of the external face of a closed-loop retail prepaid card, and the delivery of the user-designed closed-loop retail prepaid card to the card recipient according to an embodiment of the present invention. The term chit user 712 as used throughout refers to either the chit purchaser 710 or to any other person in possession of the chit and authorized to redeem the chit. For example, a chit purchaser 710 may purchase a chit and subsequently choose to transfer ownership of the chit to another person, such as for a birthday gift. The recipient of the chit, in this example, is a chit user 712.

As illustrated in FIG. 6, a chit user 712 can enter the chit redemption Internet website address into an Internet browser 810 to access a chit redemption Internet website via a communications network. Specifically, with reference to FIG. 1, FIG. 3, FIG. 4, and FIGS. 7 through 10, the chit user 712 in possession of a chit card 110 can follow instructions included in the merchant specific message 171 to redeem the chit card 110, including instructions directing the chit user 712 to open the Internet browser 596 on a chit user computer 506 and input into the Internet browser 596 the URL representing the chit redemption Internet website address 178. After the Internet browser 596 loads the chit redemption Internet website 584, the chit user 712 can then input 820 the chit identification mechanism 130 printed on the chit card 110 into the graphical user interface of the chit redemption Internet website 584, and the chit identification mechanism 130 is subsequently transmitted to a prepaid card provider computer 510. Responsive to receiving the chit identification mechanism 130 from the chit user 712 through the chit redemption Internet website via the communications network, the prepaid card provider 718 can, for example, identify 830 the merchant 714 associated with the chit identification mechanism 130, verify 840 that the chit card 110 is valid, and determine the value of the chit card 110. A chit card 110 is valid, according to an embodiment of the present invention, if the chit identification mechanism 130 associated with and printed on the chit card 110 is stored in, or otherwise associated with, one of the plurality of chit data files 568 stored in the storage medium 560 of the prepaid card provider computer 510.

According to an embodiment of the present invention, the prepaid card provider 718, responsive to verifying the chit card 840, redeems the chit card 110 for a closed-loop retail prepaid card 10 with a user-designed external face. For example, the prepaid card provider 718 can indicate that the chit card 110 has been redeemed for a closed-loop retail prepaid card 10 by storing a chit redemption code 910 in the one of the plurality of chit data files 568 associated with the chit identification mechanism 130 received from the chit user 712 through the chit redemption Internet website 854 via the communications network 600. The chit redemption code 910, for example can be any series of alpha-numeric characters, ASCII characters, or UNICODE characters that indicates that a chit card 110 has been redeemed according to an embodiment of the present invention. Secondly, the prepaid card provider 718, for example, can associate the one of the plurality of chit data files 568 associated with the chit identification mechanism 130 with one of a plurality of closed-loop retail prepaid card data files 566 identified by a retail prepaid card number 920 and stored in the storage medium 560 of the prepaid card provider computer 510. The prepaid card provider 718 can then, for example, seed the closed-loop retail prepaid card 10 with a value equivalent to that of the chit redemption value 160 by storing the chit redemption value 160 in the associated one of the plurality of closed-loop retail prepaid card data files 566. The prepaid card provider 718 can then, for example, store the retail prepaid card number 920 that identifies the closed-loop retail prepaid card in the one of the plurality of chit data files associated with the chit identification mechanism to thereby create a record of the chit card redemption.

Beneficially, according to an embodiment of the present invention, the prepaid card provider 718 can, for example, facilitate the design of the external face of the closed-loop retail prepaid card 850, 860. More specifically, the prepaid card provider 718 can display 850 on the chit redemption Internet website 584 one or more of a plurality of closed-loop retail prepaid card external face images 40 stored in the storage medium 560 of the prepaid card provider computer 510. The chit user 712 can then, for instance, select one or more of the plurality of closed-loop retail prepaid card external face images 40 to be printed on the external face 15 of the closed-loop retail prepaid card 10. Beneficially, the displayed one or more of the plurality of closed-loop retail prepaid card external face images 40, for example, can be provided or otherwise selected by the merchant 714 associated with the redeemed chit card 110, and accordingly, the displayed one or more of the plurality of closed-loop retail prepaid card external face images 40 can, for example, differ based on the merchant 714 associated with the redeemed chit card 110. For instance, according to an embodiment of the present invention, a plurality of merchants 714 can join or subscribe to the retail prepaid card service provided by embodiments of this invention. During the signup process for the retail prepaid card service, each merchant can beneficially input merchant specific instructions 170, including, for example, instructions particularly directed to the design of the external face of the retail prepaid card. Specifically, each merchant can input a plurality of closed-loop retail prepaid card external face images 40 that can subsequently be selected by a chit user 860 and printed on a purchased retail prepaid card 900. Additionally, each merchant 714 can specify, as a part of the merchant specific instructions 170, the allowed placement 44, the allowed size 46, and the number 42 of user-selected closed-loop retail prepaid card external face images 40 on the closed-loop retail prepaid card 10. Each merchant 714 can also, beneficially, update the associated merchant specific instructions 170 at any time. Therefore, embodiments of the present invention beneficially provide merchants 714 with the ability to tailor the extent to which chit card users 712 can design 860 the external face 15 of the closed-loop retail prepaid card 10 with respect to the closed-loop retail prepaid card external face images 40 printed on the external face 15 of the card 10.

Additionally, the prepaid card provider 718 can prompt the chit user 712 through the chit redemption Internet website 584 to input one or more lines of text 70 to be printed on the closed-loop retail prepaid card 10. The term, line of text, as used throughout, refers to the alpha-numeric ASCII characters that span a set line distance 77 across the widest dimension of a closed-loop retail prepaid card. A default line distance 77 for each line or text, for example, can be set, or alternatively, each merchant 714 can set a line distance 77 for the closed-loop retail prepaid cards associated with that merchant 714. Additionally, the number of lines of text 76 that may be inputted by the chit user as well as the size 78, font 79, and placement 74 of the lines of user inputted text 70 can, for example, differ depending on the merchant 714 associated with the chit card 10 that is redeemed by the chit user 712 for the closed-loop retail prepaid card 10. Specifically, each merchant subscriber 714 of the retail prepaid card service as provided by embodiments of the present invention can provide merchant specific instructions 170, including, for example instructions setting the number 76, placement 74, size 78, font 79 and line distance 77 of lines of user inputted text. For instance, a merchant 714 can provide instructions that allow a chit user 712 to input two lines of user inputted text 70 to be printed on the closed-loop retail prepaid card 10 in the bottom left-hand corner of the card in size 10 Times New Roman font. Therefore, embodiments of the present invention beneficially provide merchants 714 with the ability to tailor the extent to which chit card users 712 can design 860 the external face 15 of the closed-loop retail prepaid card 10 with respect to the one or more lines of user inputted text 70 printed on the external face 15 of the card 10.

Beneficially, the one or more lines of user inputted text 70 can include, for example, personal information. The term personal information, as used throughout, refers to, for example, non-private, non-security-related personal information of the chit user 712 or a closed-loop retail prepaid card user that can be used to personalize the external face 15 of the closed-loop retail prepaid card 10. For instance, personal information can include, a first name, a last name, a middle name or middle initial, a personal greeting, a personal saying, a personal motto, a personal proverb, or any other personalized statement. According to an embodiment of the present invention, for example, a chit user can input into one of the one or more lines of user inputted text 70 the name of the closed-loop retail prepaid card user whom the chit user 712 intends to receive the closed-loop customized retail card 10. The chit user 712 can also input into another line of user inputted text, a personal greeting to the closed-loop retail prepaid card user. For instance, the chit user 712 can input the phrase "Happy Birthday!" to wish the closed-loop retail prepaid card user a happy birthday. Additionally, the chit user 712 can input into one of the one or more lines of user-inputted text 70 personal information about himself or herself. For instance, the chit user 712 can input into one of the one or more lines of user inputted text 70 his or her name. For instance, in an exemplary case, the chit user 712 can also be, the closed-loop retail prepaid card user.

According to an embodiment of the present invention, the prepaid card provider 718 can facilitate the user-directed design of the closed-loop retail prepaid card 860 by associating the one or more the plurality of closed-loop retail prepaid card external face images 40 selected by the chit user 712 and the one or more lines of user inputted text 70 with the one of the plurality of closed-loop retail prepaid card data files 566 stored in the storage medium 560 of the prepaid card provider computer 510 and associated with the chit data file 568 identified by the chit identification mechanism 130 inputted by the chit user 712. In other words, the prepaid card provider 718 can facilitate the user-directed design of the closed-loop retail prepaid card 860 by saving the chit user's design preferences in the closed-loop retail prepaid card data file 566 associated the chit data file 568 identified by the chit identification mechanism 130 inputted by the chit user 712.

Additionally, according to an embodiment of the present invention, the prepaid card provider 718 can, for example, print 900 and deliver 908 the user-designed closed-loop retail prepaid card 10 to a closed-loop retail prepaid card user at a location defined by delivery information 280 provided by the chit user 712. More specifically, the prepaid card provider 718 can receive delivery information 280, including at least a mailing name and a postal mailing address, from the chit user 712 through chit redemption Internet website 584 accessible through the Internet browser 596 via the communications network 600. The mailing name can for example, be either a personal name or a business name. The postal mailing address can, for example, include a street number, a street name, an apartment number, a city name, a state name, a country name, and a zip code. After receiving the closed-loop retail card design input and the delivery information 280 from the chit user 712, the chit provider, for example, can store the user-selected one or more of the plurality of closed-loop retail prepaid card external face images 40, the one or more lines of user inputted text 70, the merchant name 140, the merchant specific instructions 170, and the delivery information 280 in the associated one of the plurality of closed-loop retail prepaid card data files 566 stored in the storage medium 560 of the prepaid card provider computer 510.

Next, according to an embodiment of the present invention, the prepaid card provider 718 can print 900 the user-designed closed-loop retail prepaid card 10. Specifically, the prepaid card provider 718 can print 900 on a closed-loop retail prepaid card 10 the merchant name 140, the retail prepaid card number 920, the selected one or more of the plurality of closed-loop retail prepaid card external face images 40, and the one or more lines of user inputted text 70 stored in the associated one of the plurality of closed-loop retail prepaid card data files 566. Prior to the step of printing 900, the closed-loop retail prepaid card 10 can be, for example, a blank card or a partially printed card. The step of printing 900, for example, can be done directly by the retail prepaid card provider 718 or alternatively, the prepaid card provider 718 may use a printing order fulfillment center to print 902, 904 the user-designed closed-loop retail prepaid card 10. Following the step of printing 900, the prepaid card provider 718 can, for example, deliver 908 the closed-loop retail prepaid card 10 to a closed-loop retail prepaid card user at a location defined by the delivery information 280 stored in the associated one of the plurality of closed-loop retail prepaid card data files 566. Alternatively, according to an embodiment of the present invention, subsequent to printing 900 the closed-loop retail prepaid card 10, the printing order fulfillment center can deliver 904 the closed-loop retail prepaid card 10 to a closed-loop retail prepaid card 10 user at a location defined by the delivery information 280 stored in the associated one of the plurality of closed-loop retail prepaid card data files 566. To use the printing order fulfillment center to print and deliver 904 the user-designed closed-loop retail prepaid card 10, the prepaid card provider 718 can, for example, transmit via the communications network 600, the associated one of the plurality of closed-loop retail prepaid card data files 566 to the printing order fulfillment center. Prior to printing and delivering the card 900, 902, 904, the chit user 712 can, for example, receive a communication confirming the redemption of the chit card 890 for the user-designed closed-loop retail prepaid card 10. Beneficially, the prepaid card provider computer can be, for example, operated and controlled by a banking institution.

After the closed-loop retail prepaid card is delivered to the closed-loop retail prepaid card user, according to the delivery information, the retail prepaid card user can, for example, use the closed-loop retail prepaid card at a retail establishment through the financial services network. As known and understood by those skilled in the art, financial services networks, e.g., Automated Clearing House (ACH) network, is the name of an electronic network for financial transactions in the United States and is regulated by the Federal Reserve. For example, according to embodiments of the present invention, the ACH network can be used to process transactions at a retail establishment using a closed-loop retail prepaid card. More particularly, the ACH Network can be used to process transactions involving payment received from a closed-loop retail prepaid card where the prepaid card provider is a banking institution.

FIGS. 7 and 8 are schematic diagrams each illustrating an exemplary user-designed closed-loop retail prepaid card 10 according to an embodiment of the present invention. As illustrated in FIG. 7, a user-designed closed-loop retail prepaid card 10 can, for example, have printed on it a merchant name 140, a closed-loop retail prepaid card title 20, a retail prepaid card number 920, a closed-loop retail prepaid card user name 60, one or more of a plurality of closed-loop retail prepaid card external face images 40, and one or more lines of user inputted text 70. Specifically, FIG. 7 illustrates an exemplary user-designed closed-loop retail prepaid card 10, according to an embodiment of the present invention, with two of the plurality of closed-loop retail prepaid card images 40 printed in the top-left and bottom-right corners of the card respectively and with two lines of user inputted text 70 printed in the lower-left corner of the card. FIG. 8 illustrates an exemplary user-designed closed-loop retail prepaid card 10, according to an embodiment of the present invention, with one of the plurality of closed-loop retail prepaid card external face images 40 printed largely in the center of the card as a background image and with two lines of user inputted text 70 printed in the lower-left corner of the card.

Each retail card as illustrated in FIGS. 7 and 8 according to embodiments of the present invention are shown printed in accordance with user inputted closed-loop retail prepaid card design information in addition to the merchant specific instructions 170 of the merchant associated with the particular closed-loop retail prepaid card 10. For instance, the closed-loop retail prepaid card 10 illustrated in FIG. 7 reflects merchant specific instructions 170 allowing the chit user 712 to select two of the plurality of closed-loop retail prepaid card external face images 40. The closed-loop retail prepaid card 10 illustrated in FIG. 7 also reflects, for example, merchant specific instructions 170 specifying the location of printed images, particularly that one closed-loop prepaid card external face image 40 is to be printed in the top-left corner of the card and the other in the bottom-right corner of the card. Moreover, FIG. 7 reflects, for instance, merchant specific instructions 170 directing that the user inputted text 70 be printed in block characters in the bottom-left corner of the card. Similarly, the closed-loop retail prepaid card 10 illustrated in FIG. 8, according to an embodiment of the present invention, reflects, for example, merchant specific instructions 170 directing that the user-selected closed-loop retail prepaid card external face image 40 be printed in the center of the card as a background image and that the two lines of user inputted text 70 be printed in the bottom-left corner of the card in lower-case characters.

According to an embodiment of the present invention, the chit redemption Internet website 584 can include, for example, a graphical user interface consisting of a series of graphical Internet web pages to direct the chit user 712 through the process of redeeming a chit for a closed-loop retail prepaid card 10. Specifically, FIG. 13 is a schematic diagram of an exemplary graphical user interface of a chit redemption Internet website 584 introductions and instructions webpage 202 according to an embodiment of the present invention. The introductions and instructions webpage 202 can include, for example, a webpage title 210, a webpage heading 220, an introduction and instructions section 230, chit redemption and closed-loop retail prepaid card design instructions 232, a display of the plurality of closed-loop retail prepaid card external face images 40 available for selection by the chit user 712 according to the merchant specific instructions 170 associated with the chit 234, user inputted text line instructions 236, a preview of an exemplary user-designed closed-loop prepaid card 238, a link 178 to the merchant's website 175, and one or more user interface buttons 260. The chit redemption and closed-loop retail prepaid card design instructions 232 can, for instance, thank the chit user 712 for the purchase of a chit and instruct the chit user 712 as to the redemption process, particularly the chit verification process 840 and the closed-loop prepaid retail card design process 850, 860, 870. Based on the chit redemption Internet website address 178 entered into the Internet browser 596 by the chit user 712, the chit redemption Internet website

584 can, for example, display information specific to the merchant 714 associated with the particular chit redemption Internet website address 178. For instance, a chit redemption Internet website address 178 associated with Merchant A, when entered into an Internet browser 596, can result in the display of a chit redemption Internet website 584 specifically tailored to the business needs and preferences of Merchant A. Particularly, a chit redemption Internet website 584 tailored to Merchant A can include, for example, a display of the plurality of closed-loop retail prepaid card external face images 40 selected by the merchant 714 for use on closed-loop retail prepaid cards 10 associated with Merchant A and instructions regarding the allowable size 78, position 74, font 79, and text line distance 77 of user inputted text 70 to be printed 900 on closed-loop retail prepaid cards 10 associated with Merchant A.

FIG. 14 is a schematic diagram of an exemplary graphical user interface of a chit redemption Internet website 584 chit redemption webpage 204 according to an embodiment of the present invention. The chit redemption webpage 204 can include, for example, a webpage title 210, a webpage heading 220, a chit verification section 240, chit user instructions 242 instructing the chit user 712 as to how to redeem a chit, an input field 250 to input the chit identification mechanism 130 associated with the chit for redemption, a link 178 to the merchant Internet website 175 associated with the chit, and one or more user interface buttons 260. The chit user 712 can input the chit identification mechanism 130 associated with the chit in the chit user's possession in the input field 250 and subsequently click one of the one or more user interface buttons 260 to submit the chit identification mechanism 130 to the prepaid card provider 718 for verification 840. FIG. 15 is a schematic diagram of an exemplary graphical user interface of a chit redemption Internet website 584 external card face design webpage 206 according to an embodiment of the present invention. The external card face design webpage 206, as illustrated in FIG. 15, for example, can be subsequently presented to the chit user 712 after the chit identification mechanism 130 is verified 840 by the prepaid card provider 718.

The external card face design webpage 206 can include, for example, a webpage title 210, a webpage heading 220, a prepaid card external face design section 270, design instructions 450, a link 178 to the merchant Internet website 175 associated with the chit, and one or more user interface buttons 260. More specifically, the prepaid card external face design section 270 can include, for example, a closed-loop retail prepaid card external face image selection tool 410, a closed-loop retail prepaid card external face image placement tool 420, and a user inputted text tool 440. The closed-loop retail prepaid card external face image selection tool 420 can, for instance, prompt the chit user 712 to select one of the plurality of closed-loop retail prepaid card external face images 40 displayed on the external card face design webpage 206. The plurality of closed-loop retail prepaid card external face images 40 are displayed based on the merchant specific instructions 170 provided by the merchant 714 associated with the chit card to be redeemed for the closed-loop retail prepaid card 10. Each merchant 714, for instance, can select different closed-loop retail prepaid external face images 40 to be displayed on the external card face design webpage 206. The closed-loop retail prepaid card external face image placement tool 420 can, for example, prompt the chit user 712 to select the placement 430 of the selected one or more of the plurality of closed-loop retail prepaid card external face images 40. For instance, the chit user 712 can select to position a single closed-loop retail prepaid card external face image 40 in the center of the closed-loop retail prepaid card 10 as a background image. The user inputted text tool 440 can include, for example, one or more text input fields 72, one text input field 72 for each line of user-inputted text 70 to be printed on the closed-loop retail prepaid card 10 as provided by the merchant specific instructions 170. After the chit user 712 has completed the design of the closed-loop retail prepaid card 10, the chit user 712 can click on one of the one or more user interface buttons 206 to submit the design to the chit provider for subsequent printing and delivery.

Figure 16:
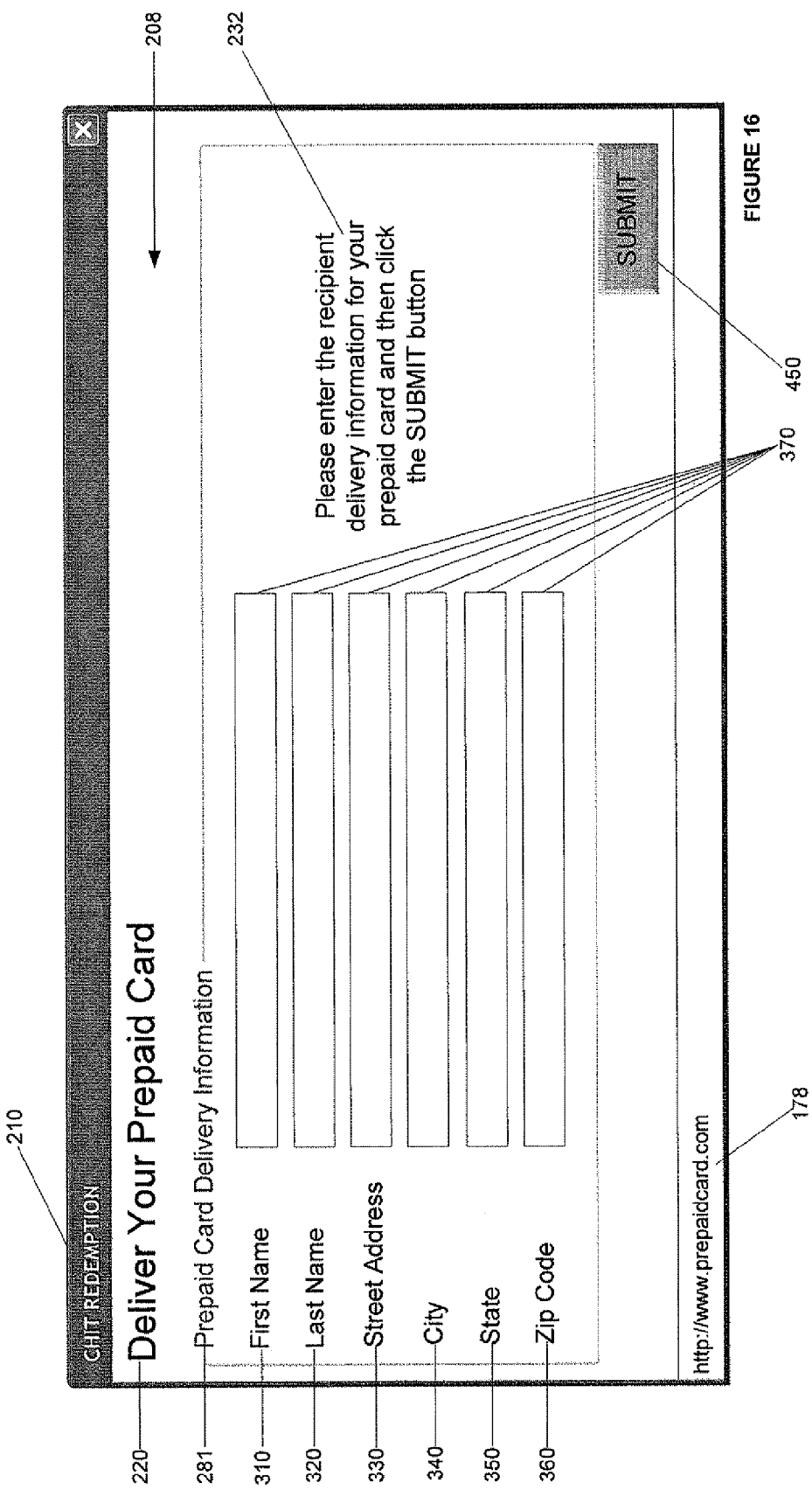
FIG. 16 is a schematic diagram of an exemplary graphical user interface of a chit redemption Internet web site delivery information webpage according to an embodiment of the present invention.

FIG. 16 is a schematic diagram of an exemplary graphical user interface of a chit redemption Internet website 584 delivery information webpage 208 according to an embodiment of the present invention. The delivery information webpage 208 can include, for example, a webpage title 210, a webpage heading 220, a delivery information section 281, delivery instructions 232, a link 178 to the merchant Internet website 175 associated with the chit, and one or more user interface buttons 450. The delivery information section 281, for instance, can further include prompts and corresponding delivery information input fields 370 for a chit user 712 to enter a first name 310, last name 320, street address 330, city 340, state 350, and zip code 360 for the intended recipient of the user-designed closed-loop retail prepaid card 10. The intended recipient of the user-designed closed-loop retail prepaid card 10 can, for example, be the chit user 712, or any other person of the chit user's determination. After the chit user 712 has completed entering the delivery information 280 into the delivery information input fields 370, the chit user 712 can click the on one of the one or more user interface buttons 450 to submit the delivery information 280 to the prepaid card provider 718 and complete the chit redemption process. According to embodiments of the present invention, the one or more user interface buttons 260, 450 can include, for example, a "NEXT" button 260, a "BACK" button, and a "SUBMIT" 450 button.

Figure 2:
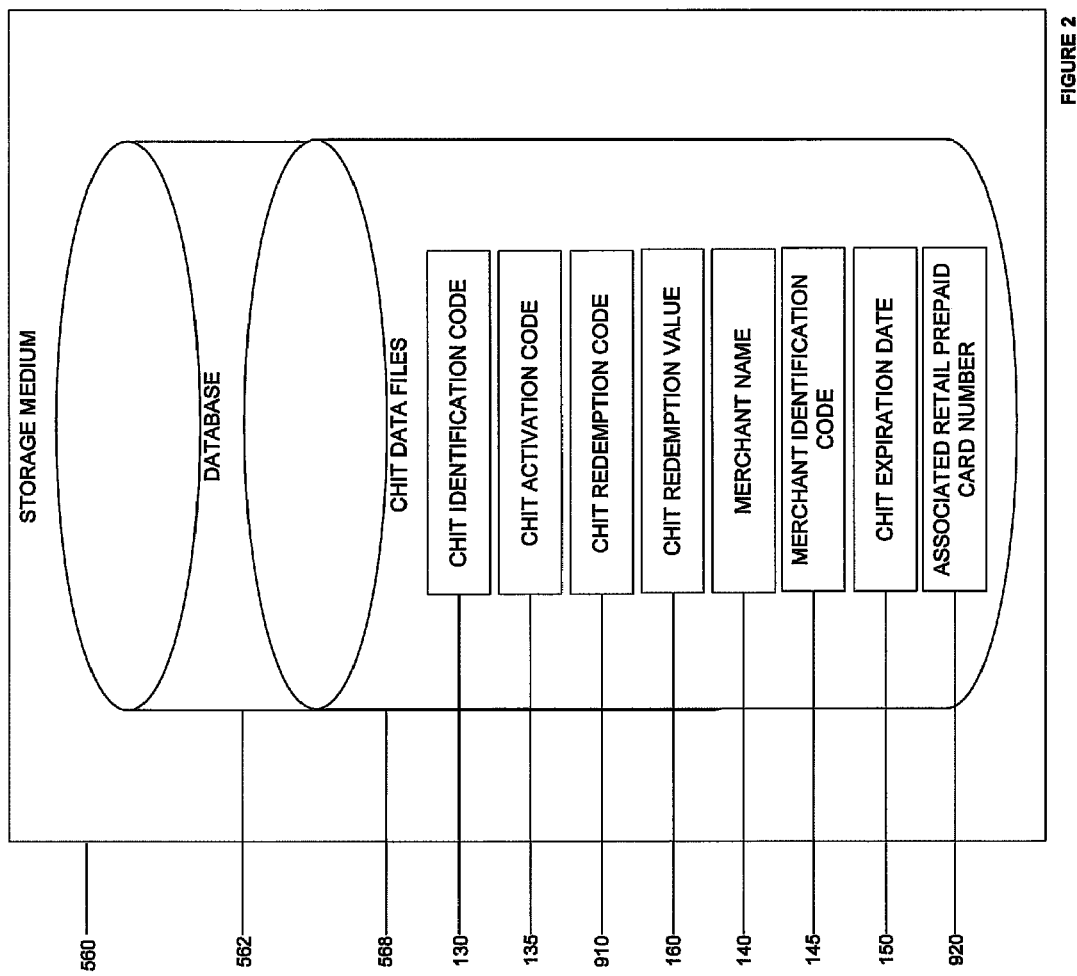
FIG. 2 is a schematic block diagram illustrating an exemplary database construction of a chit data file for a computer-implemented system to issue a closed-loop retail prepaid card including a user-designed external face using a chit according to an embodiment of the present invention.
Figure 3:
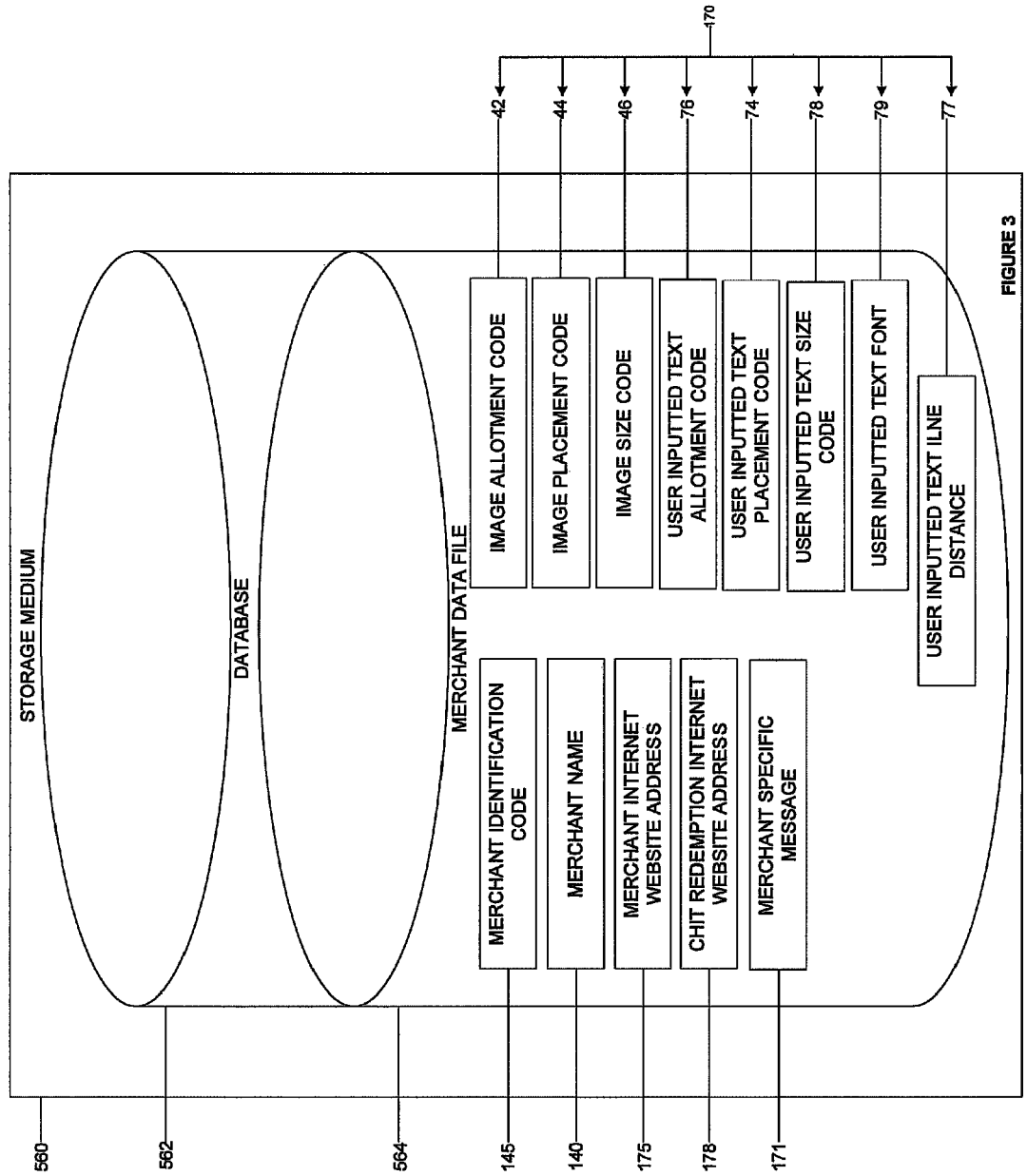
FIG. 3 is a schematic block diagram illustrating an exemplary database construction of a merchant data file for a computer-implemented system to issue a closed-loop retail prepaid card including a user-designed external face using a chit according to an embodiment of the present invention.
Figure 4:
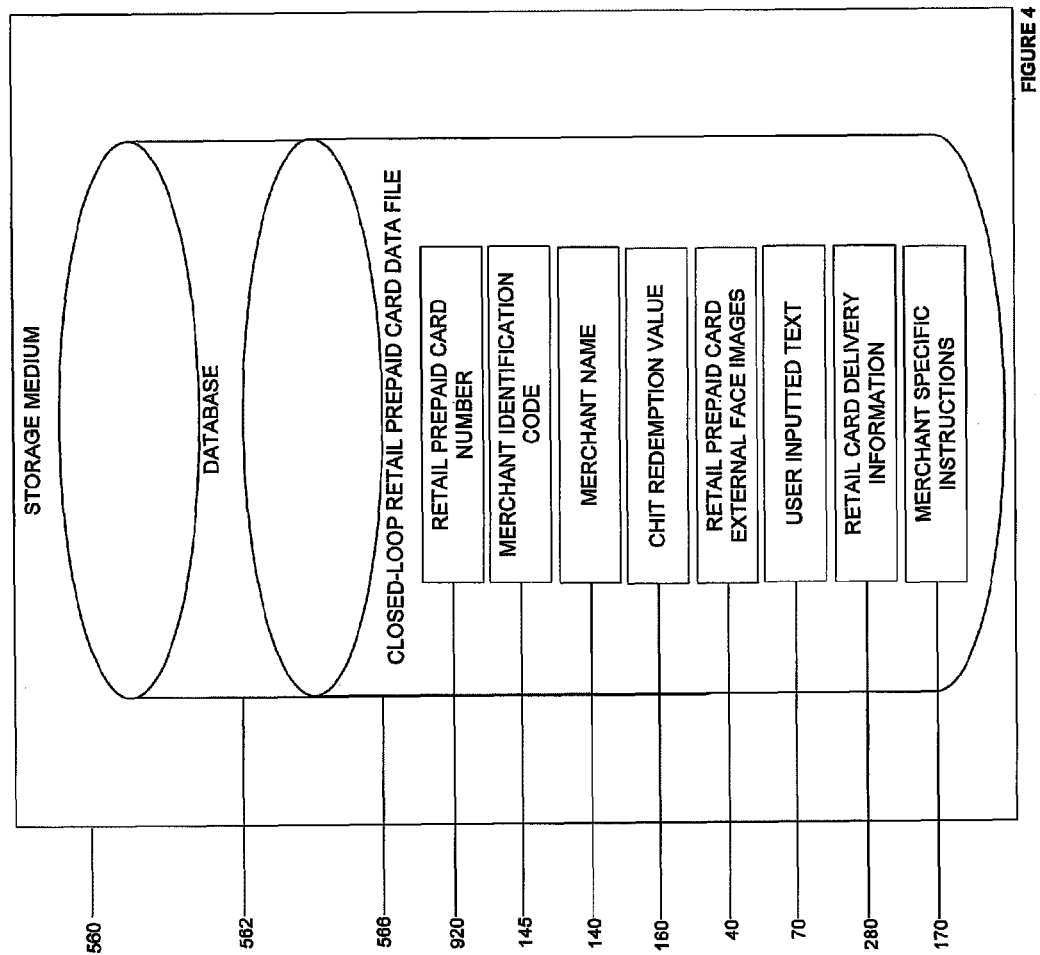
FIG. 4 is a schematic block diagram illustrating an exemplary database construction of a closed-loop retail prepaid card data file for a computer-implemented system to issue a closed-loop retail prepaid card including a user-designed external face using a chit according to an embodiment of the present invention.

Additionally, exemplary embodiments of the present invention advantageously provide systems, computer program product, and related computer implemented methods to issue a closed-loop retail prepaid card including a user-designed external face 15 using a chit. For instance, FIGS. 1 through 4, and FIGS. 7 through 10 illustrate an exemplary system, according to an embodiment of the present invention, to issue a closed-loop retail prepaid card 10 including a user-designed external face 15 using a chit. Specifically, FIG. 1 is a schematic block diagram illustrating an exemplary system architecture of a computer-implemented system to issue a closed-loop retail prepaid card 10 including a user-designed external face 15 using a chit according to an embodiment of the present invention. FIG. 2 is a schematic block diagram illustrating an exemplary database construction of a chit data file 15 for a computer-implemented system to issue a closed-loop retail prepaid card 10 including a user-designed external face 15 using a chit according to an embodiment of the present invention. FIG. 3 is a schematic block diagram illustrating an exemplary database construction of a merchant data file 564 for a computer-implemented system to issue a closed-loop retail prepaid card 10 including a user-designed external face 15 using a chit according to an embodiment of the present invention. FIG. 4 is a schematic block diagram illustrating an exemplary database construction of a closed-loop retail prepaid card data file 566 for a computer-implemented system to issue a closed-loop retail prepaid card 10 including a user-designed external face 15 using a chit according to an embodiment of the present invention.

As illustrated in FIGS. 1 through 4, with reference to FIGS. 7 through 10, an exemplary system, according to an embodiment of the present invention, to issue a closed-loop retail prepaid card 10 including a user-designed external face 15 using a chit can comprise, for example, a prepaid card provider computer 510, a merchant computer 502, a point-of-sale or point-of-transaction terminal 504, a chit user computer 506, and a communications network 600. Particularly, according to this example, the prepaid card provider computer 510 can be positioned remote from and in communication with the merchant computer 502 and the chit user computer 506 via a communications network 600. The prepaid card provider computer 510, may, for example, have a processor 520, a computer readable storage medium 560, a memory element 540, and at least one database stored in the computer readable storage medium 560. Examples of computer readable storage medium include, but are not limited to, hard disk drives, solid state disk drives, hard disk RAIDs, direct attached storage devices, network attached storage devices accessible via the communications network 600, a storage area network accessible via the communications network 600, floppy disks, CD-R/RWs, DVD-RAMs, DVD-R/RWs, DVD+R/RWs, and flash drives.

The prepaid card provider computer 510 can, for example, create a plurality of chit data files 568, receive from the merchant computer 502 a chit identification mechanism 130 and a chit redemption value 160, verify and activate responsive to receiving the chit identification mechanism 130 and the chit redemption value 160 one of the plurality of chit data files 568 stored in the first database 568 and associated with the chit identification mechanism 130, store the chit redemption value 160 in the chit data file 568 associated with the chit identification mechanism 130, and facilitate through an Internet website 584 accessible via the communications network 600 the graphical design by a user of the external face 15 of a closed-loop retail prepaid card 10 and the issuance of the externally user-designed closed-loop retail prepaid card 10 in an amount equal to the chit redemption value 160. According to this exemplary embodiment of the present invention, the at least one database, for example, can including first 568, second 564, third 40, and fourth 566 databases. The first database 1001 can include, for example, a plurality of chit data files 568 stored therein. The second database 1002 can include, for example, a plurality of merchant data files 564 stored therein. The third database 1003 can include, for example, a plurality of closed-loop retail prepaid card external face images 40 and a plurality of associated merchant identification codes 145 stored therein. The fourth database 1004 can include, for example, a plurality of closed-loop retail prepaid card data files 566 stored therein where each closed-loop retail prepaid card data file 566, for example, can include at least a retail prepaid card number 920 and a merchant identification code 145. A merchant identification code 145, for example, can be any series of alpha-numeric characters, ASCII characters, or UNICODE characters that uniquely identifies a merchant 714 according to an embodiment of the present invention.

Furthermore, according to this exemplary embodiment of the present invention, the merchant computer 502, for example, can be placed in communication with a point-of-sale terminal 504 and can be placed remote from and in communication with the prepaid card provider computer 510 via the communications network 600. The merchant computer 502, for example, can have a processor 520, a memory element 540, a computer readable storage medium 560, at least one database 563 stored in the computer readable storage medium 560, a user interface device 590, and a computer readable program product 552 readable by the merchant computer 502 and stored in the memory element 540 thereof. The at least one database 563 can, for example, store a plurality of chit activation codes 135.

The computer readable program product 552 stored on the merchant computer 502 can, according to an exemplary embodiment of the present invention, include a financial transaction module 592 and a chit activation module 594. The financial transaction module 592 can, for example, receive from the point-of-sale terminal 504 the chit redemption value 160 and personal financial information, verify the personal financial information, approve the purchase of the chit, and transmit the chit purchase confirmation code to the point-of-sale terminal 504 responsive to the purchase of the chit. Likewise, the chit activation module 594 can be, for example, transmit via the communications network 600 to the prepaid card provider computer 510 the chit identification mechanism 130 and the chit redemption value 160 to activate a chit, receive from the prepaid card provider computer 510 via the communications network 600 the chit activation codes 135 responsive to activation of the chit and associated with the chit identification mechanism 130, and store the chit activation codes 135 in the at least one database 563 stored on the merchant computer 502.

A computer-implemented system according to an exemplary embodiment of the present invention can also include a point-of-sale terminal 504 remote from and in communication the merchant computer 502 having at least a processor 520 and a user interface device 590 to receive from a chit purchaser 710 a chit redemption value 160 and personal financial information, to transmit the chit redemption value 160 and personal financial information to the merchant computer 502 to thereby purchase a chit, and to receive a chit purchase confirmation code responsive to the purchase of the chit from the merchant computer 502. Additionally, the point-of-sale terminal 504 can include a keypad for entering in alphanumeric symbols, a barcode scanner, and a magnetic strip reader/slot. Alternative embodiments of the point-of-sale terminal 504 can include an RFID interface or a contact memory button reader. The point-of-sale terminal 504 can further include various software and hardware for interfacing with the merchant computer 502 and the communications network 600 as known and understood by those skilled in the art.

Additionally, the system according to this exemplary embodiment of the present invention can further include a chit user computer 506 positioned remote from the merchant computer 502 and remote from and in communication with the prepaid card provider computer 510 through the Internet website 584 via the communications network 600. The chit user computer 506, for example, can include a processor 520, a memory element 540, and a user interface device 590. The chit user computer 506 can, for instance, transmit through the Internet website 584 via the communications network 600 a chit identification mechanism 130 to the prepaid card provider computer 510, design through the Internet website 584 via the communications network 600 the graphical appearance of the external face 15 of the closed-loop retail prepaid card 10 associated with the chit identification mechanism 130, and transmit through the Internet website 584 via the communications network 600 delivery information 280 to facilitate the delivery of the externally designed closed-loop retail prepaid card 10 associated with the chit identification mechanism 130 in an amount equal to the chit redemption value 160. Moreover, the communications network 600 can be, for example, in communication with the prepaid card provider computer 510, the merchant computer 502, and the chit user computer 506.

In an embodiment according to the present invention, the chit user computer 506 can be, for example, an electronic kiosk computer positioned remote from the merchant computer 502 and remote from and in communication with the prepaid card provider computer 510 via the communications network 600. The electronic kiosk computer, for example, can include a processor, a memory element, a user interface device, and a printer. According to exemplary embodiments of the present invention, the kiosk computer can be operated and controlled by a merchant 714 or a prepaid card provider 718. The electronic kiosk computer 506 can, for instance, transmit via the communications network 600 a chit identification mechanism 130 to the prepaid card provider computer 510, design, via the communications network 600, the graphical appearance of the external face 15 of the closed-loop retail prepaid card 10 associated with the chit identification mechanism 130, and transmit, via the communications network 600, delivery information 280 to facilitate the delivery of the externally designed closed-loop retail prepaid card 10 associated with the chit identification mechanism 130 in an amount equal to the chit redemption value 160. In embodiments of the present invention where an electronic kiosk computer is used, the delivery information 280 can include, for instance, data indicating that the electronic kiosk computer is the delivery location for the closed-loop retail prepaid card 10. According to embodiments of the present invention, the electronic kiosk can be, for example, of similar construction and operation to kiosks used by airlines to purchase tickets and print boarding passes at an airport.

Additionally, the system according to this exemplary embodiment of the present invention can further include a chit user computer 506 positioned remote from the merchant computer 502 and remote from and in communication with the prepaid card provider computer 510 through the Internet website 584 via the communications network 600. The chit user computer 506, for example, can include a processor 520, a memory element 540, and a user interface device 590.

As shown by FIG. 1, each of the prepaid card provider computer 510, POS/POT 504, merchant computer 502, and chit user computer 506 are connected by communications network 600. Communications network 600 may be a local area network (LAN), wide area network (WAN), a telephone network, or any combination thereof. For example, prepaid card provider computer 530 and Merchant computer 502 may be privately networked to allow for better security, faster communication, and better data synchronization. Communications network 600 may be a secure financial services network used in conjunction with a WAN, wherein the financial services network connects the merchant computer 502 and prepaid card provider computer 510, with prepaid card provider computer 510 being part of an issuer computer system [not shown], and a chit user computer 506 is connected to the prepaid processor computer 510 through the WAN. Accordingly, though not all such configurations are depicted, all are within the scope of the disclosure.

Each of the computers described above include any combination of a processor 520, an I/O device 530, memory element 550 and storage medium 560, as required by the function of the computer. Even though the elements are given similar notations, each device for each one of the prepaid card provider computer 510, POS/POT 504, merchant computer 502, and chit user computer 506 may be different from a similar device in another of the prepaid card provider computer 510, POS/POT 504, merchant computer 502, and chit user computer 506. I/O devices 530 connect, via the network, the prepaid card provider computer 510, POS/POT 504, merchant computer 502, and chit user computer 506, and each can be, but is not limited to, a network card/controller connected by a PCI bus to the motherboard, or hardware built into the motherboard to connect the various computers to the network. As can be seen, the I/O device 530 is connected to the processor 520. Processors 520 are the "brains" of the prepaid card provider computer 510, POS/POT 504, merchant computer 502, and chit user computer 506. In the case of the pre-paid card provider computer 510, processor 520 executes program product 550 and works in conjunction with the I/O device 530 to direct data to memory element 540 and storage medium 560 and to send data from memory element 540 and storage medium 560 to the communications network 600. In this way, files created and data that is stored in the prepaid card provider computer 510 can be received, i.e., merchant identification code and chit identification, redemption codes, etc., and transferred, i.e., account confirmation codes, closed-loop retail prepaid card image, etc., in the process steps described herein. As for the merchant computer 502, processor 520 executes program product 550 and works in conjunction with the I/O device 530 to direct data to memory element 540 and storage medium 560 and to send data from memory element 540 and storage medium 560 to the communications network 600. In this way, files created and data that is stored in the merchant computer 502 can be received, i.e., payment information, authorization codes, internet selections, user data such as name, social security number, etc., and transferred, i.e., merchant identification data, chit identification, user data, etc., in the process steps described herein. As one skilled in the art will appreciate, processors 520 can be any commercially available processor, or plurality of processors, adapted for use in a computer or an application server, e.g., Intel® Celeron processors, Intel® Xeon® multicore processors, Intel® micro-architecture Nehalem, AMD Opteron™ multicore processors, etc.

Note, the prepaid card provider computer 510, the merchant computer 502, and the chit user computer 506 shown schematically in FIG. 1 each represents a computer or computer cluster, servers, server farms, etc., and are not limited to any individual physical computer. Moreover, the prepaid card provider computer 510 and the merchant computer 502 may be configured a networked computer system comprising, e.g. application servers, database servers, web servers, work stations and the like. In such a configuration, though not explicitly depicted as such in the drawings, the networked computers and computers servers comprising either the prepaid card provider computer 510 or the merchant computer 502 may be connected using a LAN or WAN connection. In such configurations, computers and servers from different portions of e.g., stores, departments, etc., merchant may be networked to create one merchant computer 502; or computers and servers from different, e.g., divisions, locations, and departments of the prepaid card provider may be networked to create one prepaid card provider computer 510. In addition, the number of computers along with associated storage capacity and their architecture and configuration can be increased based on usage, demand, and capacity requirements for the system, e.g., hard drives, servers, and workstation can be added to any of the above-mentioned computers or computer networks. Also note, the memory elements 540 and storage medium 560, though depicted as separate elements, may be the same element, e.g., both the program products and databases are stored in the same memory device. Memory element 540 and storage medium 560 for each computer, server, or networked computer system can include volatile and nonvolatile memory known to those skilled in the art including, for example, non volatile memory such as hard disks, flash memory, optical disks, and the like, and volatile memory, such as SRAM, DRAM, SDRAM, etc., as required and described in other locations herein, to implement the systems and features of the invention. As one skilled in the art will appreciate, though memory element 540 and storage medium 560 may be on, e.g., the motherboard, of the computer, memory element 540 and storage medium 560 may also be a separate components or device, e.g., FLASH memory, connected to any of the aforementioned computers or servers. Note additionally, the computer readable program product 552 stored in the memory element 540 of the merchant computer 502 can be in the form of microcode, programs, routines, and symbolic languages that provide a specific set or sets of ordered operations that control the functioning of the hardware and direct its operation, as known and understood by those skilled in the art. Databases 560 may be relational databases, programmed using, e.g., Visual Basis, SQL, ACCESS, or the like, to have data written therein and accessible to users and various computer systems in the network. The computer readable program product 552, according to an embodiment of the present invention, for example, need not reside in its entirety in volatile memory, but can be selectively loaded, as necessary, according to various methodologies as known and understood by those skilled in the art.

Furthermore, an exemplary embodiment of a computer-implemented system according to the present invention can also include a computer readable program product 550 readable by the prepaid card provider computer 510 and stored in the memory element 540 of the prepaid card provider computer 510. The computer readable program product 550 readable by the prepaid card provider computer 510 can, for example, include two main component parts, a chit initialization and purchase module 570, and a closed-loop retail prepaid card design and issuance module 580. The chit initialization and purchase module 570 can include, for example, a chit creator 572, a chit deliverer 576, and a chit activator 574. The closed-loop retail prepaid card design and issuance module 580 can, for example, include an Internet website 584, a chit verifier 582, a chit redeemer 586, a closed-loop retail prepaid card external face designer 588, and a closed-loop retail prepaid card deliverer 589. Additionally, the computer readable program product 550 stored in the memory element 540 of the prepaid card provider computer 510 can be in the form of microcode, programs, routines, and symbolic languages that provide a specific set or sets of ordered operations that control the functioning of the hardware and direct its operation, as known and understood by those skilled in the art. The computer readable program product 552, according to an embodiment of the present invention, for example, need not reside in its entirety in volatile memory, but can be selectively loaded, as necessary, according to various methodologies as known and understood by those skilled in the art.

The chit initialization and purchase module 570, for example, can include a chit creator 572 to receive from the merchant computer 502 via the communications network 600 a merchant name 140, a merchant Internet website 175, one or more merchant specific messages 171 including a chit redemption Internet website address 178, a chit redemption Internet website link, a plurality of closed-loop retail prepaid card external face images 40, and merchant specific instructions 170. The merchant specific instructions 140 can, for example, include an image allotment code 42, an image placement code 44, an image size code 46, a user inputted text placement code 74, a user inputted text allotment code 76, a user inputted text size code 78, a user inputted text font code 79, and a user inputted text line distance code 77.

The image allotment code 42, for example, can be any series of alpha-numeric characters, ASCII characters, or UNICODE characters that indicates the quantity of the one or more of the plurality of closed-loop retail prepaid card external face images 40 that the chit user 712 may select to be printed on the external face 15 of a user-designed closed-loop retail prepaid card 10. The image placement code 44, for example, can be any series of alphanumeric characters, ASCII characters, or UNICODE characters that indicates the merchant specified placement of the user-selected one or more of the plurality of closed-loop retail prepaid card external face images 40. The image size code 46, for example, can be any series of alphanumeric characters, ASCII characters, or UNICODE characters that indicates the merchant specified size of the user-selected one or more of the plurality of closed-loop retail prepaid card external face images 40. The user inputted text placement code 74, for example, can be any series of alphanumeric characters, ASCII characters, or UNICODE characters that indicates the merchant specified placement of the one or more lines of user inputted text 70. The user inputted text allotment code 76, for example, can be any series of alpha-numeric characters, ASCII characters, or UNICODE characters that indicates the merchant specified number of lines of user inputted text 70 that may be provided by the chit user 712 to be printed on the external face 15 of a closed-loop retail prepaid card 10. The user inputted text size code 78, for example, can be any series of alphanumeric characters, ASCII characters, or UNICODE characters that indicates the merchant specified size of the one or more lines of user inputted text 70. The user inputted text font code 79, for example, can be any series of alphanumeric characters, ASCII characters, or UNICODE characters that indicates the one or more merchant specified fonts of the one or more lines of user-inputted text 70. The user inputted text placement code 74, for example, can be any series of alphanumeric characters, ASCII characters, or UNICODE characters that indicates the merchant specified placement of the one or more lines of user inputted text 70. The user inputted text line distance code 74, for example, can be any series of alphanumeric characters, ASCII characters, or UNICODE characters that indicates the merchant specified horizontal distance or size of each of the one or more lines of user-inputted text 70.

Secondly, the chit creator 572 can, for example, associate the merchant name 140, the merchant Internet website 175, the one or more merchant specific messages 171, the plurality of closed-loop retail prepaid card external face images 40, and the merchant specific instructions 170 with a merchant identification code 145. Thirdly, the chit creator 572 can create and associate a merchant data file 564 with the merchant identification code 145 and store the merchant data file 564 in the second database 1002. Fourthly, the chit creator 572 can, for example, store in the merchant data file 564 the merchant identification code 145, the merchant name 140, the merchant Internet website 175, the one or more merchant specific messages 171, and the merchant specific instructions 170. Fifthly, the chit creator 572 can, for example, store the plurality of closed-loop retail prepaid card external face images 40 and the associated merchant identification code 145 in the third database 1003. Sixthly, the chit creator 572 can, for example, create the plurality of chit data files 568 to be associated with the merchant identification code 145 where each of the plurality of chit data files 568 is associated with a chit card 110 and the chit identification mechanism 130 associated with each of the plurality of chit data files 568 is printed on the chit card 110 and is used to identify the chit card 110. And lastly, the chit creator 572 can, for example, store the plurality of chit data files 568 in the first database 1001 where each chit data files 568 includes a plurality of data fields to store a chit identification mechanism 130, a chit activation codes 135, a chit redemption code 910, a chit redemption value 160, a merchant name 140, a merchant identification code 145, a chit expiration date 150, and an associated retail prepaid card number 920. As one skilled in the art will appreciate, all of the databases described above may be implemented as separate databases, or as one or more database with each of the components above representing separate tables, columns or fields in the database.

The chit initialization and purchase module 570, according to an embodiment of the present invention, can also include a chit deliverer 576 to print on each of a plurality of chit cards 110 the merchant name 140 and the one or more merchant specific messages 171 stored in the merchant data file 564 associated with the merchant identification code 145 stored in the chit data file 568 associated with the chit identification mechanism 130 that identifies the chit card 110, and to deliver the plurality of chit cards 110 to the merchant identified by the merchant identification code 145 stored in the chit data file 568 and associated with the chit identification mechanism 130 that identifies the chit card 110. Additionally, the chit initialization and purchase module 570 can further include, for example, a chit activator 574 to receive from the merchant computer 502 via the communications network 600 a chit identification mechanism 130 and a chit redemption value 160, together indicating that the chit has been purchased via the point-of-sale terminal 504; to activate one of the plurality of chit data files 568 associated with the chit identification mechanism 130 received from the merchant computer 502 via the communications network 600 responsive to the purchase of the chit card via the point-of-sale terminal 504; to store a chit activation code 135 responsive to the activation of the chit card and the chit redemption value 160 in the one of the plurality of chit data files 568 associated with the chit identification mechanism 130; and to transmit to the merchant computer 502 via the communications network 600 the chit activation code 135 responsive to the activation of the chit and associated with the chit identification mechanism 130.

The closed-loop retail prepaid card design and issuance module 580 can include, for example, an Internet website 584 accessible via the communications network 600 through the chit user computer 506 to provide a graphical user interface to verify the activation of a chit card 110 by receiving through the graphical user interface the chit identification mechanism 130 printed on the chit card 110; to redeem the chit for a closed-loop retail prepaid card 10 associated with the chit identification mechanism 130 and responsive to the chit redemption; to graphically design the external face 15 of the closed-loop retail prepaid card 10; and to facilitate delivery of the closed-loop retail prepaid card by collecting chit delivery data. Additionally, the closed-loop retail prepaid card design and issuance module 580 can include, for example, a chit verifier 582 to receive a chit identification mechanism 130 from the chit user computer 506 through the Internet website 584 accessible via the communications network 600 and to verify that the chit identification mechanism 130 received from the chit user computer 506 through the Internet website 584 is associated with one of the plurality of chit data files 568 and that the associated one of the plurality of chit data files 568 includes a chit activation codes 135.

According to an embodiment of the present invention, a closed-loop retail prepaid card design and issuance module 580 can also include, for example, a chit redeemer 586. The chit redeemer 586 can, for example, store responsive to the verification, a chit redemption code 910 in the one of the plurality of chit data files 568 associated with the chit identification mechanism 130 received from the chit user computer 506 through the Internet website 584. Secondly, the chit redeemer 586 can, for example, associate the one of the plurality of chit data files 568 identified by the chit identification mechanism 130 received from the chit user computer 506 through the Internet website 584 with one of the plurality of closed-loop retail prepaid card data files 566 identified by a retail prepaid card number 920 and stored in the fourth database 1004. Thirdly, the chit redeemer 586 can, for example, store in the associated one of the plurality of closed-loop retail prepaid card data files 566 the chit redemption value 160 and the merchant identification code 145 stored in the one of the plurality of chit data files 568 associated with the chit identification mechanism 130 to thereby activate the associated one of the plurality of closed-loop retail prepaid card data files 566. Lastly, the chit redeemer 586 can, for example, store the retail prepaid card number 920 stored in the associated one of the plurality of closed-loop retail prepaid card data files 566 in the one of the plurality of chit data files 568 associated with the chit identification mechanism 130 received from the chit user computer 506.

The closed-loop retail prepaid card design and issuance module 580, according to an exemplary embodiment of the present invention, can include, for example, a closed-loop retail prepaid card external face designer 588. The closed-loop retail prepaid card external face designer 588 can, for instance, display on the Internet website 584 accessible to the chit user computer 506 via the communications network 600 one or more of the plurality of closed-loop retail prepaid card external face images 40 stored in the third database 1003 and associated with the merchant identification code 145 stored in the one of the plurality of chit data files 568 associated with the chit identification mechanism 130 received from the chit user computer 506 through the Internet website 584. Secondly, the closed-loop retail prepaid card external face designer 588 can, for instance, receive a selection of one or more of the plurality of closed-loop retail prepaid card external face images 40 from the chit user computer 506 through the Internet website 584. Thirdly, the closed-loop retail prepaid card external face designer 588 can, for example, receive one or more lines of user inputted text 70 from the chit user computer 506 through the Internet website 584. Fourthly, the closed-loop retail prepaid card external face designer 588 can associate the selected one or more of the plurality of closed-loop retail prepaid card external face images 40 and the one or more lines of user inputted text 70 with the associated one of the plurality of closed-loop retail prepaid card data files 566 stored in the fourth database 1004. Fifthly, the closed-loop retail prepaid card external face designer 588 can, for example, receive delivery information 280, including at least a name and a postal mailing address, from the chit user computer 506 through the Internet website 584. And lastly, the closed-loop retail prepaid card external face designer 588 can, for instance, store the selected one or more of the plurality of closed-loop retail prepaid card external face images 40, the one or more lines of user inputted text 70, and the delivery information 280 in the associated one of the plurality of closed-loop retail prepaid card data files 566.

Moreover, the closed-loop retail prepaid card design and issuance module 580, according to an embodiment of the present invention, can include a closed-loop retail prepaid card deliverer 589 to print on a closed-loop retail prepaid card the merchant name 140, the retail prepaid card number 920, the selected one or more of the plurality of closed-loop retail prepaid card external face images 40, and the one or more lines of user inputted text 70 stored in the associated one of the plurality of closed-loop retail prepaid card data files 566, and to deliver the closed-loop retail prepaid card 10 to a closed-loop retail prepaid card user at a location defined by the delivery information 280 stored in the associated one of the plurality of closed-loop retail prepaid card data files 566. According to an embodiment of the present invention, the number of, placement of, and size of the selected one or more of the closed-loop retail prepaid card external face images 40 is determined by the merchant specific instructions 170 stored in the merchant data file 564 associated with the merchant identification code 145 stored in the associated one of the plurality of closed-loop retail prepaid card data files 566. Likewise, for example, the number of, and placement of, size of, and font of the one or more lines of user inputted text 70 is determined by the merchant specific instructions 170 stored in the merchant data file 564 associated with the merchant identification code 145 stored in the associated one of the plurality of closed-loop retail prepaid card data files 566. Additionally, according to an embodiment of the present invention, the Internet website 584 can be accessible, for example, via the communications network 600.

Furthermore, in exemplary embodiments of the present invention where the chit user computer 506 is an electronic kiosk computer, the closed-loop retail prepaid card deliverer 589 can be further configured to transmit the associated one of the plurality of closed-loop retail prepaid card data files 566 to the electronic kiosk computer via the communications network 600. Additionally, the closed-loop retail prepaid card deliverer 589 can be configured, for example, to print on a closed-loop prepaid card 10 the merchant name 140, the retail prepaid card number 920, the selected one or more of the plurality of closed-loop retail prepaid card external face images 40, and the one or more lines of user inputted text 70 stored in the associated one of the plurality of closed-loop retail prepaid card data files 566 using the electronic kiosk computer printer.

It is important to note that while embodiments of the present invention have been described in the context of a fully functional system, those skilled in the art will appreciate that the mechanism of at least portions of the present invention or aspects thereof are capable of being distributed in the form of a computer readable program product stored in a tangible computer medium and a computer readable medium of instructions in a variety of forms for execution on a processor, processors, or the like, and that the present invention applies equally regardless of the particular type of signal bearing media used to actually carry out the distribution. Note, the computer readable program product can be in the form of microcode, programs, routines, and symbolic languages that provide a specific set or sets of ordered operations that control the functioning of the hardware and direct its operation, as known and understood by those skilled in the art. Examples of computer readable media include but are not limited to: non-volatile hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, HD-DVDs, mini disks, laser disks, Blu-ray disks, and other newer types of memories, and transmission type media such as digital and analog communication links.

An example of an embodiment of a computer readable program product 550 stored in a tangible computer medium to issue a closed-loop retail prepaid card 10 including a user-designed external face 15 using a chit can include, for example, instructions that when executed by a computer cause the computer to perform the operations of initializing a plurality of chit data files 568 and facilitating the purchase of a chit, verifying a chit identification mechanism 130 and redeeming the associated one of the plurality of chit data files 568, and issuing a user-designed closed-loop retail prepaid card 10.

The operation of initializing a plurality of chit data files 568 and facilitating the purchase of a chit can further include, for example, instructions that when executed by a computer cause the computer to perform the operations of receiving from a remote merchant computer 502 via a communications network 600 a merchant name 140, a merchant Internet website 175, one or more merchant specific messages 171 including a chit redemption Internet website address, a plurality of closed-loop retail prepaid card external face images 40, and merchant specific instructions 170 including an image allotment code 42, an image placement code 44, an image size code 46, a user inputted text placement code 74, a user inputted text allotment code 76, a user inputted text size code 78, a user inputted text font code 79, and a user inputted text line distance code 77; associating the data received from the remote merchant computer 502 with a merchant identification code 145; creating and associating a merchant data file 564 with the merchant identification code 145; storing the merchant data file 564 in a database; storing the plurality of closed-loop retail prepaid card external face images 40 and the associated merchant identification code 145 in a database and storing the other data received from the remote merchant computer 502 in the merchant data file 564. The operation of initializing a plurality of chit data files 568 and facilitating the purchase of a chit can further include, for example, instructions that when executed by a computer cause the computer to perform the operation of creating a plurality of chit data files 568 to be associated with the merchant identification code 145 where each of the plurality of chit data files 568 is associated with a chit card 110 and the chit identification mechanism 130 associated with each of the plurality of chit data files 568 is printed on the chit card 110 and is used to identify the chit card 110; storing the plurality of chit data files 568 in a database; and printing on each of a plurality of chit cards 110 the merchant name 140 and the one or more merchant specific messages 171 stored in the merchant data file 564 associated with the merchant identification code 145 stored in the chit data file 568 associated with the chit identification mechanism 130 that identifies the chit card 110. According to an embodiment of the present invention, for example, each of the plurality of chit data files 568 can include a plurality of data fields to store a chit identification mechanism 130, a chit activation codes 135, a chit redemption code 910, a chit redemption value 160, a merchant name 140, a merchant identification code 145, a chit expiration date 150, and an associated retail prepaid card number 920.

The operation of initializing a plurality of chit data files 568 and facilitating the purchase of a chit can further include, for example, instructions that when executed by a computer cause the computer to perform the operations of receiving from the remote merchant computer 502 via the communications network 600 a chit identification mechanism 130 and a chit redemption value 160, together indicating that the chit has been purchased via the point-of-sale terminal 504; activating one of the plurality of chit data files 568 associated with the chit identification mechanism 130 received from the remote merchant computer 502 via the communications network 600 responsive to the purchase of the chit; storing a chit activation codes 135 responsive to the activation of the chit and the chit redemption value 160 in the one of the plurality of chit data files 568 associated with the chit identification mechanism 130; and transmitting to the remote merchant computer 502 via the communications network 600 the chit activation codes 135 responsive to the activation of the chit and associated with the chit identification mechanism 130.

The operation of verifying a chit identification mechanism 130 and redeeming the associated one of the plurality of chit data files 568 can include, for example, instructions that when executed by a computer cause the computer to perform the operations of receiving a chit identification mechanism 130 from a remote chit user computer 506 through the Internet website 584; verifying that the chit identification mechanism 130 received from the remote chit user computer 506 through the Internet website 584 is associated with one of the plurality of chit data files 568 and that the associated one of the plurality of chit data files 568 includes a chit activation codes 135; and storing, responsive to the verification, a chit redemption code 910 in the one of the plurality of chit data files 568 associated with the chit identification mechanism 130 received from the remote chit user computer 506 through the Internet website 584. The operation of verifying a chit identification mechanism 130 and redeeming the associated one of the plurality of chit data files 568 can also include, for example, instructions that when executed by a computer cause the computer to perform the operations of associating the one of the plurality of chit data files 568 associated with the chit identification mechanism 130 received from the remote chit user computer 506 through the Internet website 584 with one of the plurality of closed-loop retail prepaid card data files 566 identified by a retail prepaid card number 920; storing in the associated one of the plurality of closed-loop retail prepaid card data files 566 the chit redemption value 160 and the merchant identification code 145 stored in the one of the plurality of chit data files 568 associated with the chit identification mechanism 130; and storing the retail prepaid card number 920 stored in the associated one of the plurality of closed-loop retail prepaid card data files 566 in the one of the plurality of chit data files 568 associated with the chit identification mechanism 130 received from the remote chit user computer 506. According to an embodiment of the present invention, the computer readable instruction that causes the operation of storing the chit redemption value 160 and the merchant identification code 145 in the associated one of the plurality of closed-loop retail prepaid card data files 566 can, for example, signify the activation of the associated one of the plurality of closed-loop retail prepaid card data files 566.

Additionally, the operation of issuing a user-designed closed-loop retail prepaid card 10 can include, for example, instructions that when executed by a computer cause the computer to perform the operation of displaying on the Internet website 584 one or more of the plurality of closed-loop retail prepaid card external face 15 images associated with the merchant identification code 145 stored in the one of the plurality of chit data files 568 associated with the chit identification mechanism 130 received from the remote chit user computer 506 through the Internet website 584. According to this exemplary embodiment of the present invention, the operation of issuing a user-designed closed-loop retail prepaid card can also include, for example, instructions that when executed by a computer cause the computer to perform the operations of receiving a selection of one or more of the plurality of closed-loop retail prepaid card external face images 40 from the remote chit user computer 506 through the Internet website 584; receiving one or more lines of user inputted text 70 from the remote chit user computer 506 through the Internet website 584; associating the selected one or more of the plurality of closed-loop retail prepaid card external face images 40 and the one or more lines of user inputted text 70 with the associated one of the plurality of closed-loop retail prepaid card data files 566; receiving delivery information 280, including at least a name and a postal mailing address, from the remote chit user computer 506 through the Internet website 584; and storing the selected one or more of the plurality of closed-loop retail prepaid card external face images 40, the one or more lines of user inputted text 70, and the delivery information 280 in the associated one of the plurality of closed-loop retail prepaid card data files 566; and printing on a closed-loop retail prepaid card 10 the merchant name 140, the retail prepaid card number 920, the selected one or more of the plurality of closed-loop retail prepaid card external face images 40, and the one or more lines of user inputted text 70 stored in the associated one of the plurality of closed-loop retail prepaid card data files 566.

According to an embodiment of the present invention, for example, the operation of issuing a user-designed closed-loop retail prepaid card 10 can further include instructions that when executed by the computer cause the computer to perform the operation of printing the mailing name and postal mailing address received from the remote chit user computer 506 through the Internet website on the exterior of a postal envelope for delivery to a closed-loop retail prepaid card user. The mailing name can include, for example, a first name, a last name, a middle name or middle initial, and the mailing address can include, for example, a street address, an apartment number, a city, a state, a country, and a zip code. Beneficially, the operation of printing the mailing name and postal mailing address on the exterior of a postal envelope facilitates the delivery of the closed-loop retail prepaid card 10 by the prepaid card provider 718 to the closed-loop retail prepaid card user. After the postal envelope is printed with the mailing name and postal mailing address, the prepaid card provider 718 can, for example, place the user-designed closed-loop retail prepaid card 10 in the postal envelope and place the postal envelope in the mail. The term postal envelope, as used throughout, includes for example, United States Postal Service envelopes, United Parcel Service envelopes, Federal Express envelopes, and DHL envelopes.

Each of the embodiments described above can be used in conjunction with a traditional financial services network, e.g., MasterCard®, Visa®, American Express®, or Discover® network, etc., through either traditional or partial authentication messaging. As such, the merchant computer, including the POS/POT terminal receives a payment to initiate the activation of the chit, and, the merchant computer accepts the order facilitates communication of the order; a payment network identifies an issuer associated with the order; an issuer processor computer for processing the order in conjunction with the prepaid card provider computer. As one skilled in the art will appreciate, the merchant computer, communications network, and pre-paid card provider computer may thereby comprise components of a traditional financial network that enables credit transactions with a merchant, e.g., consumer credit card and debit card systems, and as such, the system can process payment information in addition to and in conjunction with the order.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A computer-implemented system for providing a closed-loop retail prepaid card by offering for sale a chit, the computer implemented system comprising:

a prepaid card provider computer having at least a processor, a non-transitory computer readable storage medium, and at least one database stored in the non-transitory computer readable storage medium, the at least one database including a plurality of chit data files, a plurality of merchant data files, a plurality of closed-loop retail prepaid card external face images, a plurality of associated merchant identification codes, and a plurality of closed-loop retail prepaid card data files, each retail card data file including at least a retail prepaid card number and a merchant identification code;

a communications network in communication with the prepaid card provider computer, a remote merchant computer and a remote chit user computer; and the non-transitory computer readable storage medium storing instructions operable on the prepaid card provider computer, the stored instructions configured to perform a process of allowing a user to design an external face of the closed-loop retail prepaid card and a process issuing the closed-loop prepaid card using a chit, the computer implemented system performing the steps of:

creating the chit at the prepaid card provider upon receipt from the merchant computer via the communications network of a merchant name and a purchased chit value;

associating with the chit a plurality of closed-loop retail prepaid card external face images upon input of said plurality of closed-loop retail prepaid card external face images by a user, the plurality of closed-loop retail prepaid card external face images selected from a plurality of available merchant controlled closed-loop retail prepaid card external face images;

associating by the prepaid card provider the merchant name and the plurality of selected closed-loop retail prepaid card external face images with a merchant identification code, upon a user redeeming the chit by the prepaid card provider, creating a gift card using the selected retail prepaid card external face images, the merchant identification code and the merchant name; and associating the gift card with the purchased chit value, the chit comprising an identification mechanism representing a financial commitment to issue a retail prepaid card in an amount associated with a value paid for the chit.

2. A computer-implemented system as defined in claim 1, wherein the prepaid card provider computer is configured to receive from the merchant computer via the communications network one or more merchant specific messages, to associate the one or more merchant specific messages with a merchant identification code, and to store the one or more merchant specific messages in the database.

3. A computer-implemented system as defined in claim 2, wherein the chit is a chit card identified by a chit identification mechanism printed on the chit card; and the non-transitory computer readable storage medium is readable by the prepaid card provider computer, includes a memory element of the prepaid card provider computer, and further includes a chit deliverer configured to print on each of a plurality of chit cards the merchant name and the one or more merchant specific messages stored in the database.

4. A computer-implemented system as defined in claim 2, wherein the chit is an electronic mail chit identified by a chit identification mechanism included in the electronic mail chit;

the non-transitory computer readable storage medium is readable by the prepaid card provider computer, includes a memory element of the prepaid card provider computer, and further includes a chit deliverer configured to, responsive to purchase and activation of the electronic mail chit, deliver the electronic mail chit to an electronic mail address of a chit purchaser via an electronic mail message through the communications network;

the electronic mail chit includes at least the merchant name and the one or more merchant specific messages stored in the database.

5. A computer-implemented system as defined in claim 2, wherein the non-transitory computer readable storage medium is readable by the prepaid card provider computer, includes a memory element of the prepaid card provider computer, and further includes a chit deliverer configured to, responsive to the purchase and activation of the chit, print the chit on a receipt confirming and recording the transaction resulting in the purchase and activation of the chit; and the chit includes at least the merchant name and the one or more merchant specific messages stored in the database.

6. A computer-implemented system as defined in claim 1, wherein the computer-implemented system further includes a closed-loop retail prepaid card printer to print on a closed-loop retail prepaid card the merchant name, a retail prepaid card number, and a selected one or more of the plurality of the closed-loop retail prepaid card external face images;

the non-transitory computer readable storage medium is readable by the prepaid card provider computer, includes a memory element of the prepaid card provider computer, and further includes a closed-loop retail prepaid card deliverer configured to deliver the closed-loop retail prepaid card to a closed-loop retail prepaid card user at a location selected by the user.

7. A computer-implemented system configured to issue a closed-loop retail prepaid card including a user-designed external face using a chit, the chit being defined by an identification mechanism representing a financial commitment to issue a closed-loop retail prepaid card in an amount associated with a value paid for the chit the system comprising:

a prepaid card provider computer remote from and in communication with a merchant computer and a chit user computer via a communications network having at least a processor, a computer readable storage medium, a memory element, and at least one database stored in the computer readable storage medium, the at least one database including first, second, third, and fourth databases, the first database including a plurality of chit data files stored therein, the second database including a plurality of merchant data files stored therein, the third database including a plurality of closed-loop retail prepaid card external face images and a plurality of associated merchant identification codes stored therein, and the fourth database including a plurality of closed-loop retail prepaid card data files stored therein, each retail card data file including at least a retail prepaid card number and a merchant identification code, the prepaid card provider computer being configured to create a plurality of chit data files, configured to receive from the merchant computer a chit identification mechanism and a chit redemption value, configured to verify and activate responsive to receiving the chit identification mechanism and the chit redemption value one of the plurality of chit data files stored in the first database and associated with the chit identification mechanism, configured to store the chit redemption value in the chit data file associated with the chit identification mechanism, and configured to facilitate through an Internet website accessible via the communications network the graphical design of the external face of a closed-loop retail prepaid card and the issuance of the externally designed closed-loop retail prepaid card in an amount equal to the chit redemption value;

the merchant computer in communication with a point-of-sale terminal and remote from and in communication with the prepaid card provider computer via the communications network having at least a processor, a memory element, a computer readable storage medium, at least one database stored in the computer readable storage medium, the at least one database being configured to store a plurality of chit activation codes, a user interface device, and a non-transitory computer readable storage medium readable by the merchant computer, stored in the memory element thereof, and storing:
  a financial transaction module configured to receive from the point-of-sale terminal the chit redemption value and personal financial information, configured to verify the personal financial information, configured to approve the purchase of the chit, and configured to transmit the chit purchase confirmation code to the point-of-sale terminal responsive to the purchase of the chit, and
  a chit activation module configured to transmit via the communications network to the prepaid card provider computer the chit identification mechanism and the chit redemption value corresponding to the purchase configured to activate a chit, configured to receive from the prepaid card provider computer via the communications network the chit activation code responsive to activation of the chit and associated with the chit identification mechanism, and configured to store the chit activation code in the at least one database;

a point-of-sale terminal remote from and in communication the merchant computer having at least a processor and a user interface device, the point-of-sale terminal being configured to receive from a chit purchaser a chit redemption value and personal financial information, configured to transmit the chit redemption value and personal financial information to the merchant computer to thereby purchase a chit, and configured to receive a chit purchase confirmation code responsive to the purchase of the chit from the merchant computer the chit user computer remote from the merchant computer and remote from and in communication with the prepaid card provider computer through the Internet website via the communications network having at least a processor, a memory element, and a user interface device, the chit user computer being configured to transmit through the Internet website via the communications network a chit identification mechanism to the prepaid card provider computer, configured to design through the Internet website via the communications network the graphical appearance of the external face of the closed-loop retail prepaid card associated with the chit identification mechanism, and configured to transmit through the Internet website via the communications network delivery information configured to facilitate the delivery of the externally designed closed-loop retail prepaid card associated with the chit identification mechanism in an amount equal to the chit redemption value;

the communications network in communication with the prepaid card provider computer, the merchant computer, and the chit user computer; and another non-transitory computer readable medium readable by the prepaid card provider computer, stored in the memory element of the prepaid card provider computer, and storing:
  a chit initialization and purchase module, including:
    a chit creator
      to receive from the merchant computer via the communications network a merchant name, a merchant Internet website, one or more merchant specific messages including a chit redemption Internet website address, a plurality of closed-loop retail prepaid card external face images, and merchant specific instructions including an image allotment code, an image placement code, an image size code, a user inputted text placement code, a user inputted text allotment code, a user inputted text size code, a user inputted text font code, and a user inputted text line distance code,
      to associate the merchant name, the merchant Internet website, the one or more merchant specific messages, the plurality of closed-loop retail prepaid card external face images, and the merchant specific instructions with a merchant identification code,
      to create and associate a merchant data file with the merchant identification code and store the merchant data file in the second database,
      to store in the merchant data file the merchant identification code, the merchant name, the merchant Internet website, the one or more merchant specific messages, and the merchant specific instructions,
      to store the plurality of closed-loop retail prepaid card external face images and the associated merchant identification code in the third database,
      to create the plurality of chit data files configured to be associated with the merchant identification code where each of the plurality of chit data files is associated with a chit card and the chit identification mechanism associated with each of the plurality of chit data files is printed on the chit card and is used to identify the chit card, and
      to store the plurality of chit data files in the first database where each chit data files includes a plurality of data fields configured to store a chit identification mechanism, a chit activation code, a chit redemption code, a chit redemption value, a merchant name, a merchant identification code, a chit expiration date, and an associated retail card prepaid number,
    a chit deliverer
      to print on each of a plurality of chit cards the merchant name and the one or more merchant specific messages stored in the merchant data file associated with the merchant identification code stored in the chit data file associated with the chit identification mechanism that identifies the chit card, and to deliver the plurality of chit cards to the merchant identified by the merchant identification code stored in the chit data file and associated with the chit identification mechanism that identifies the chit card a chit activator to receive from the merchant computer via the communications network a chit identification mechanism and a chit redemption value, together indicating that the chit card has been purchased via the point-of-sale terminal, to activate one of the plurality of chit data files associated with the chit identification mechanism received from the merchant computer via the communications network responsive to the purchase of the chit via the point-of-sale terminal, to store a chit activation code responsive to the activation of the chit and the chit redemption value in the one of the plurality of chit data files associated with the chit identification mechanism, and to transmit to the merchant computer via the communications network the chit activation code responsive to the activation of the chit and associated with the chit identification mechanism, and a closed-loop retail prepaid card design and issuance module, including:

the Internet website accessible via the communications network through the chit user computer, the Internet website being configured to provide a graphical user interface configured to verify the activation of a chit card by receiving through the graphical user interface the chit identification mechanism printed on the chit card, configured to redeem the chit card for a closed-loop retail prepaid card associated with the chit identification mechanism and responsive to the chit redemption, configured to graphically design the external face of the closed-loop retail prepaid card, and configured to facilitate delivery of the closed-loop retail prepaid card by collecting chit delivery data, a chit verifier configured to receive a chit identification mechanism from the chit user computer through the Internet website accessible via the communications network and configured to verify that the chit identification mechanism received from the chit user computer through the Internet website is associated with one of the plurality of chit data files and that the associated one of the plurality of chit data files includes a chit activation code, a chit redeemer configured to store, responsive to the verification, a chit redemption code in the one of the plurality of chit data files associated with the chit identification mechanism received from the chit user computer through the Internet website, configured to associate the one of the plurality of chit data files identified by the chit identification mechanism received from the chit user computer through the Internet website with one of the plurality of closed-loop retail prepaid card data files identified by a retail prepaid card number and stored in the fourth database, configured to store in the associated one of the plurality of closed-loop retail prepaid card data files the chit redemption value and the merchant identification code stored in the one of the plurality of chit data files associated with the chit identification mechanism to thereby activate the associated one of the plurality of closed-loop retail prepaid card data files, and configured to store the retail prepaid card number stored in the associated one of the plurality of closed-loop retail prepaid card data files in the one of the plurality of chit data files associated with the chit identification mechanism received from the chit user computer, a closed-loop retail prepaid card external face designer configured to display on the Internet website accessible to the chit user computer via the communications network one or more of the plurality of closed-loop retail prepaid card external face images stored in the third database and associated with the merchant identification code stored in the one of the plurality of chit data files associated with the chit identification mechanism received from the chit user computer through the Internet website accessible via the communications network, configured to receive a selection of one or more of the plurality of closed-loop retail prepaid card external face images from the chit user computer through the Internet website accessible via the communications network, configured to receive one or more lines of user inputted text from the chit user computer through the Internet website accessible via the communications network, configured to associate the selected one or more of the plurality of closed-loop retail prepaid card external face images and the one or more lines of user inputted text with the associated one of the plurality of closed-loop retail prepaid card data files stored in the fourth database, configured to receive delivery information from the chit user computer through the Internet website accessible via the communications network, and configured to store the selected one or more of the plurality of closed-loop retail prepaid card external face images, the one or more lines of user inputted text, and the delivery information in the associated one of the plurality of closed-loop retail prepaid card data files, and a closed-loop retail prepaid card deliverer configured to print on a closed-loop retail prepaid card the merchant name, the retail prepaid card number, the selected one or more of the plurality of closed-loop retail prepaid card external face images, and the one or more lines of user inputted text stored in the associated one of the plurality of closed-loop retail prepaid card data files, and configured to deliver the closed-loop retail prepaid card to a closed-loop retail prepaid card user at a location defined by the delivery information stored in the associated one of the plurality of closed-loop retail prepaid card data files, wherein the number of, placement of, and size of the selected one or more of the closed-loop retail prepaid card external face images is determined by the merchant specific instructions stored in the merchant data file associated with the merchant identification code stored in the associated one of the plurality of closed-loop retail prepaid card data files, and the number of, and placement of, size of, and font of the one or more lines of user inputted text is determined by the merchant specific instructions stored in the merchant data file associated with the merchant identification code stored in the associated one of the plurality of closed-loop retail prepaid card data files, the chit comprising an identification mechanism representing a financial commitment to issue a retail prepaid card in an amount associated with a value paid for the chit.

8. A computer-implemented system as defined in claim 7, wherein the prepaid card provider computer is operated and controlled by a banking institution.

9. A computer-implemented system as defined in claim 7, wherein the merchant computer is operated and controlled by one of a grocery store, a discount store, a department store, a gas station, a franchise store, a restaurant, a salon, an electronics store, a big box store, a superstore, a megastore, a supercenter, an airline, or any other business establishment, including a retail establishment, that offers for sale products or services.

10. A computer-implemented system as defined in claim 9, wherein the at least one of the one or more lines of user inputted received from the chit user computer through the Internet website accessible via the communications network includes personal information of a chit user or the closed-loop retail prepaid card user; and personal information includes one or more of a first name, a last name, a middle name or middle initial, a personal greeting, a personal saying, a personal motto, a personal proverb, or any other personalized statement.

11. A computer-implemented system as defined in claim 10, wherein the chit user computer is an electronic kiosk computer;

the electronic kiosk computer further includes a printer and is further configured to be in communication with the prepaid retail prepaid card computer via the communications network;

delivery information includes data indicating that the electronic kiosk computer is the delivery location for the closed-loop retail prepaid card; and the closed-loop retail prepaid card deliverer is further configured to transmit the associated one of the plurality of closed-loop retail prepaid card data files to the electronic kiosk computer via the communications network and to print on a closed-loop retail prepaid card the merchant name, the retail prepaid card number, the selected one or more of the plurality of closed-loop retail prepaid card external face images, and the one or more lines of user inputted text stored in the associated one of the plurality of closed-loop retail prepaid card data files using the electronic kiosk computer printer.

12. A non-transitory computer readable medium including a tangible computer medium and including instructions that when executed by a computer cause the computer to perform the operations of:

initializing a plurality of chit data files configured to facilitate the purchase of a chit, the chit being defined by an identification mechanism representing a financial commitment to issue a closed-loop retail prepaid card in an amount associated with a value paid for the chit, including:

receiving from a remote merchant computer via a communications network a merchant name, a merchant Internet website, one or more merchant specific messages including a chit redemption Internet website address, a plurality of closed-loop retail prepaid card external face images, and merchant specific instructions including an image allotment code, an image placement code, an image size code, a user inputted text placement code, a user inputted text allotment code, a user inputted text size code, a user inputted text font code, and a user inputted text line distance code, associating the merchant name, the merchant Internet website, the one or more merchant specific messages, the plurality of closed-loop retail prepaid card external face images, and the merchant specific instructions with a merchant identification code, creating a merchant data file;

associating the merchant data file with the merchant identification code;

storing the merchant data file in a database, storing in the merchant data file the merchant identification code, the merchant name, the merchant Internet website, the one or more merchant specific messages, and the merchant specific instructions, storing the plurality of closed-loop retail prepaid card external face images and the associated merchant identification code in a database, creating a plurality of chit data files configured to be associated with the merchant identification code where each of the plurality of chit data files is associated with a chit card and the chit identification mechanism associated with each of the plurality of chit data files is printed on the chit card and is used to identify the chit card, storing the plurality of chit data files in a database where each of the plurality of chit data files includes a plurality of data fields to store a chit identification mechanism, a chit activation code, a chit redemption code, a chit redemption value, a merchant name, a merchant identification code, a chit expiration date, and an associated retail card prepaid number, printing on each of a plurality of chit cards the merchant name and the one or more merchant specific messages stored in the merchant data file associated with the merchant identification code stored in the chit data file associated with the chit identification mechanism that identifies the chit card, receiving from the remote merchant computer via the communications network a chit identification mechanism and a chit redemption value, together indicating that the chit card has been purchased, activating one of the plurality of chit data files associated with the chit identification mechanism received from the remote merchant computer via the communications network responsive to the purchase of the chit, the chit having the redemption value corresponding to an amount of the purchase, storing a chit activation code responsive to the activation of the chit and the chit redemption value in the one of the plurality of chit data files associated with the chit identification mechanism, and transmitting to the remote merchant computer via the communications network the chit activation code responsive to the activation of the chit and associated with the chit identification mechanism, verifying a chit identification mechanism, including:
receiving a chit identification mechanism from a remote chit user computer through an Internet website accessible via the communications network,
verifying that the chit identification mechanism received from the remote chit user computer through the Internet website is associated with one of the plurality of chit data files and that the associated one of the plurality of chit data files includes a chit activation code, activating the associated one of the plurality of chit data files responsive to the verification of the chit identification mechanism, including
storing, responsive to the verification, a chit redemption code in the one of the plurality of chit data files associated with the chit identification mechanism received from the remote chit user computer through the Internet website,
associating the one of the plurality of chit data files identified by the chit identification mechanism received from the remote chit user computer through the Internet website with one of the plurality of closed-loop retail prepaid card data files identified by a retail prepaid card number,
storing in the associated one of the plurality of closed-loop retail prepaid card data files the chit redemption value and the merchant identification code stored in the one of the plurality of chit data files associated with the chit identification mechanism configured to thereby activate the associated one of the plurality of closed-loop retail prepaid card data files, and
storing the retail prepaid card number stored in the associated one of the plurality of closed-loop retail prepaid card data files in the one of the plurality of chit data files associated with the chit identification mechanism received from the remote chit user computer, and issuing a user-designed closed-loop retail prepaid card, including
displaying on the Internet website accessible via the communications network one or more of the plurality of closed-loop retail prepaid card external face images associated with the merchant identification code stored in the one of the plurality of chit data files associated with the chit identification mechanism received from the remote chit user computer through the Internet website accessible via the communications network, receiving a selection of one or more of the plurality of closed-loop retail prepaid card external face images from the remote chit user computer through the Internet website accessible via the communications network,
receiving one or more lines of user inputted text from the remote chit user computer through the Internet website accessible via the communications network,
associating the selected one or more of the plurality of closed-loop retail prepaid card external face images and the one or more lines of user inputted text with the associated one of the plurality of closed-loop retail prepaid card data files,
receiving delivery information, including at least a mailing name and a postal mailing address, from the remote chit user computer through the Internet website accessible via the communications network,
storing the selected one or more of the plurality of closed-loop retail prepaid card external face images, the one or more lines of user inputted text, and the delivery information in the associated one of the plurality of closed-loop retail prepaid card data files, and
printing on a closed-loop retail prepaid card the merchant name, the retail prepaid card number, the selected one or more of the plurality of closed-loop retail prepaid card external face images, and the one or more lines of user inputted text stored in the associated one of the plurality of closed-loop retail prepaid card data files, wherein
the number of, placement of, and size of the selected one or more of the closed-loop retail prepaid card external face images is determined by the merchant specific instructions stored in the merchant data file associated with the merchant identification code stored in the associated one of the plurality of closed-loop retail prepaid card data files, and
the number of, and placement of, size of, and font of the one or more lines of user inputted text is determined by the merchant specific instructions stored in the merchant data file associated with the merchant identification code stored in the associated one of the plurality of closed-loop retail prepaid card data files, and wherein the chit comprises an identification mechanism representing a financial commitment to issue a retail prepaid card in an amount associated with a value paid for the chit.

13. A non-transitory computer readable medium as defined in claim 12, wherein the operation of issuing a user-designed closed-loop retail prepaid card further includes instructions that when executed by the computer cause the computer to perform the operation of printing the mailing name and postal mailing address received from the remote chit user computer through the Internet website on the exterior of a postal envelope for delivery to a closed-loop retail prepaid card user.

14. A non-transitory computer readable medium as defined in claim 12, wherein the closed-loop retail prepaid card is used by a closed-loop retail prepaid card user at a retail establishment in exchange for products or services through the Automated Clearing House network.

15. A non-transitory computer readable medium as defined in claim 13, wherein the remote merchant computer is operated and controlled by one of a grocery store, a discount store, a department store, a gas station, a franchise store, a restaurant, a salon, an electronics store, a big box store, a superstore, a megastore, a supercenter, an airline, or any other business establishment, including a retail establishment, that offers for sale products or services.

16. A non-transitory computer readable medium as defined in claim 15, wherein
the at least one of the one or more lines of user inputted received from the remote chit user through the Internet website accessible via the communications network includes personal information of a chit user or the closed-loop retail prepaid card user; and
personal information includes one or more of a first name, a last name, a middle name or middle initial, a personal greeting, a personal saying, a personal motto, a personal proverb, or any other personalized statement.

* * * * *